United States Patent [19]
Mori et al.

[11] Patent Number: 6,002,797
[45] Date of Patent: Dec. 14, 1999

[54] APPARATUS FOR DETECTING POSITION OF FEATURING REGION OF PICTURE, SUCH AS SUBTITLE OR IMAGELESS PART

[75] Inventors: Takayuki Mori, Yokohama; Nobufumi Nakagaki; Yumi Bando, both of Tokyo; Shinobu Torikoshi, Yokohama; Sunao Suzuki, Chigasaki; Toshinori Murata, Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/493,104

[22] Filed: Jun. 21, 1995

[30] Foreign Application Priority Data

Jun. 22, 1994 [JP] Japan ................................. 6-140537
Jun. 22, 1994 [JP] Japan ................................. 6-140538

[51] Int. Cl.$^6$ ........................................... G06K 9/34
[52] U.S. Cl. ........................... 382/173; 382/199; 348/564; 348/589
[58] Field of Search .................................... 348/468, 556, 348/563, 558, 561, 564, 913, 589; 382/173, 180, 199, 176

[56] References Cited

U.S. PATENT DOCUMENTS

| | | |
|---|---|---|
| 4,953,025 | 8/1990 | Saitoh et al. ............................ 348/445 |
| 5,087,976 | 2/1992 | Oda et al. ................................. 348/25 |
| 5,289,282 | 2/1994 | Tsuji et al. . |
| 5,337,164 | 8/1994 | Yabe et al. ............................... 358/487 |
| 5,386,236 | 1/1995 | Hong ....................................... 348/445 |
| 5,546,131 | 8/1996 | Terry ....................................... 348/564 |
| 5,581,304 | 12/1996 | Wang ....................................... 348/558 |
| 5,748,257 | 5/1998 | Kawabata et al. ....................... 348/615 |

FOREIGN PATENT DOCUMENTS

| | | |
|---|---|---|
| 3-154478 | 7/1991 | Japan . |
| 4-321387 | 11/1992 | Japan . |
| 5-161089 | 6/1993 | Japan . |

*Primary Examiner*—Jon Chang
*Attorney, Agent, or Firm*—Beall Law Offices

[57] ABSTRACT

A boundary position detection apparatus in which the position of an imageless part (containing no meaningful image information) lying at the upper part or/and the lower part of a picture is precisely detected from a video signal. A line decision circuit decides whether each of lines constituting the picture belongs to an image part (containing meaningful image information) or to the imageless part. A boundary decision circuit decides the boundary between the image part and the imageless part. A time integration circuit integrates the detected boundary positions temporally, and determines a final boundary position. A detection control circuit finds an image-part region from the final position, detects the average luminance of the region and controls the integrating time interval of the time integration circuit with the average luminance.

16 Claims, 37 Drawing Sheets

F I G. 2
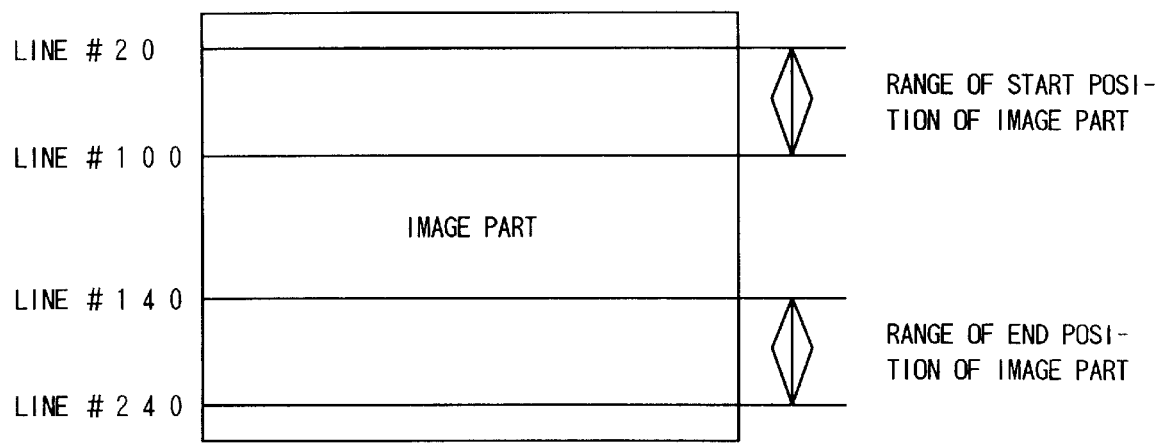

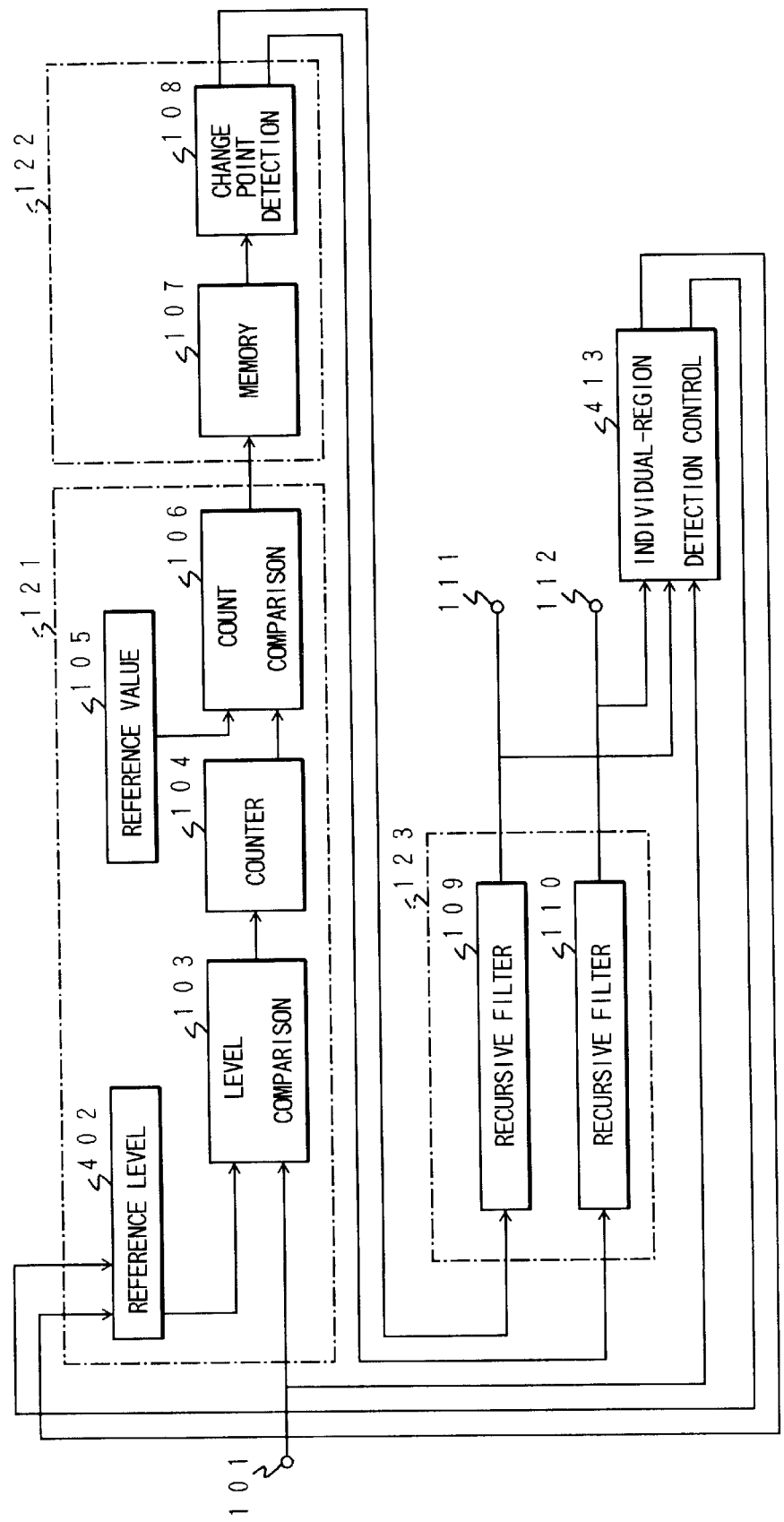
F I G. 7

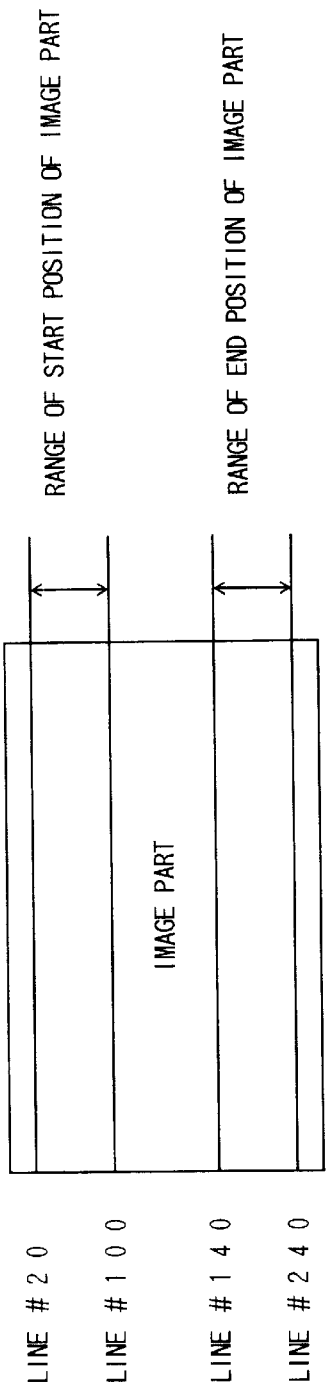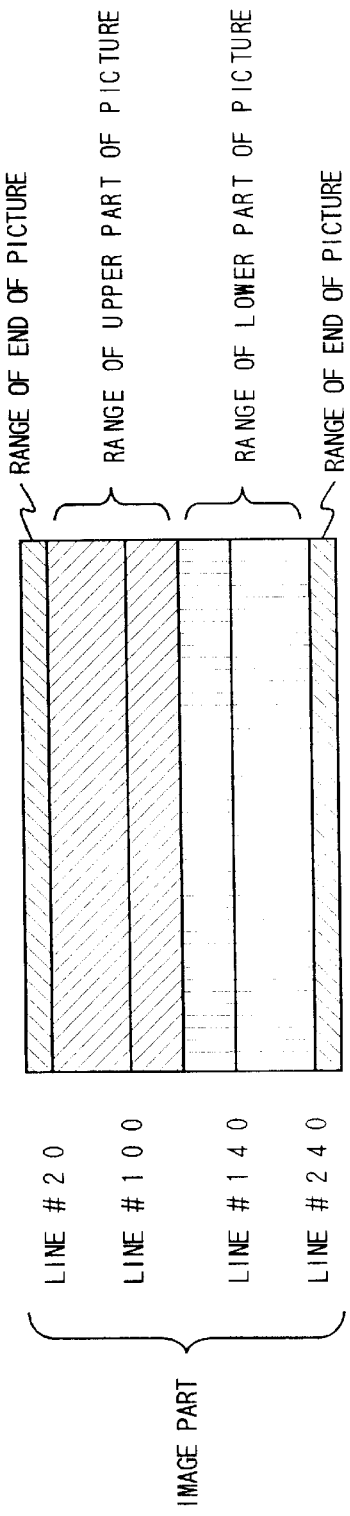

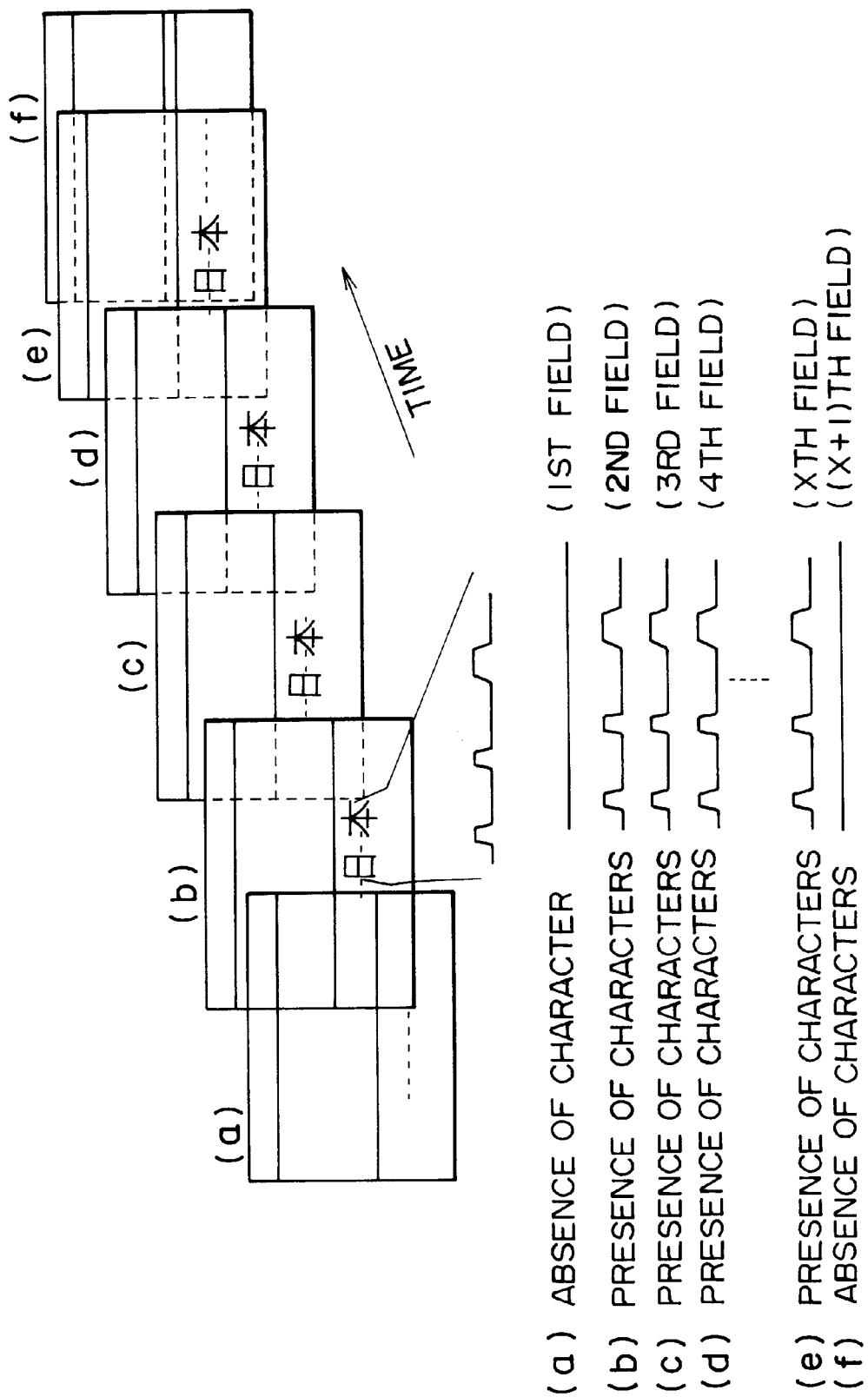

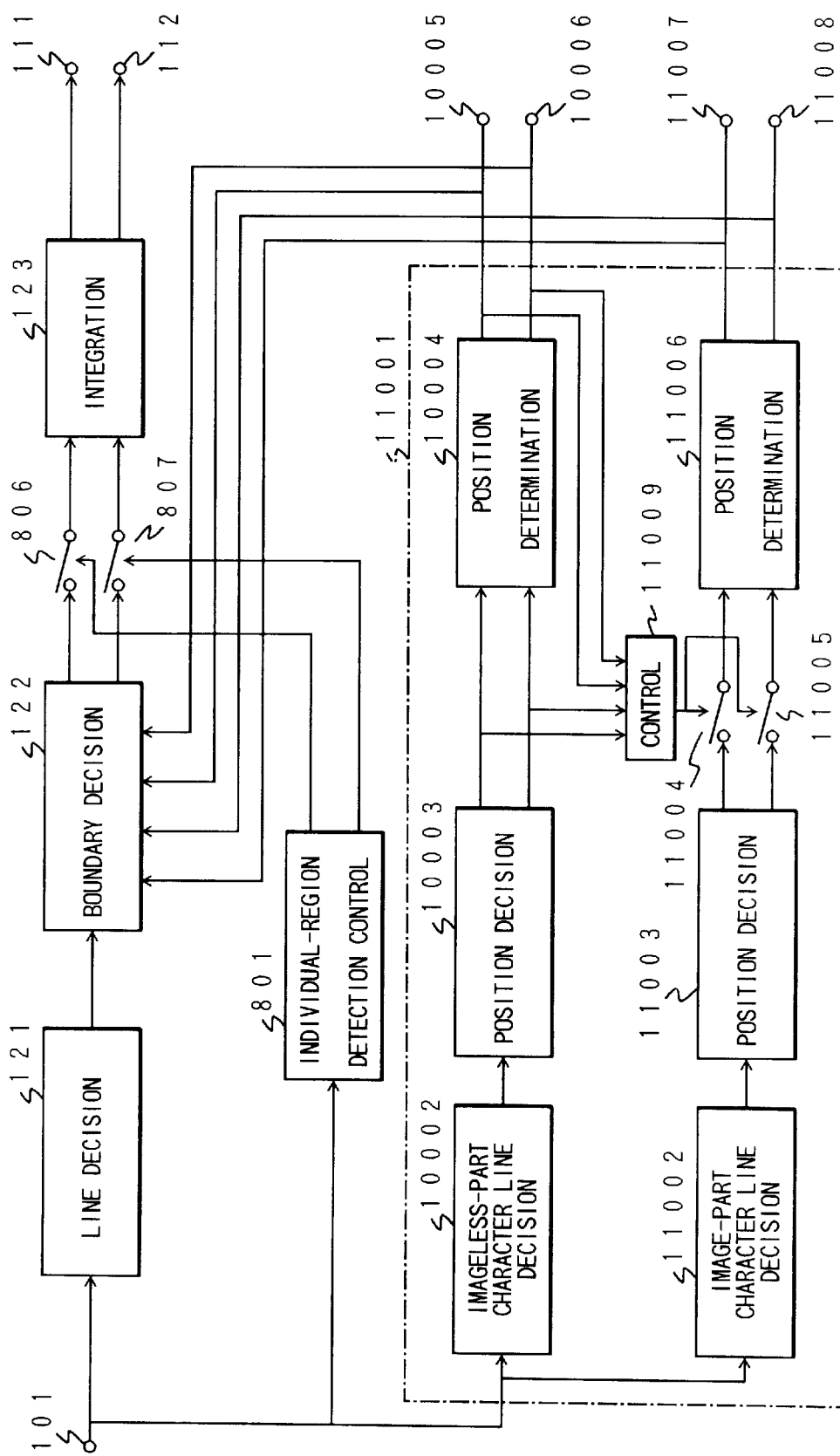

ENLARGEMENT RAITO 1.7

ENLARGEMENT RAITO 1.4

F I G. 1 8
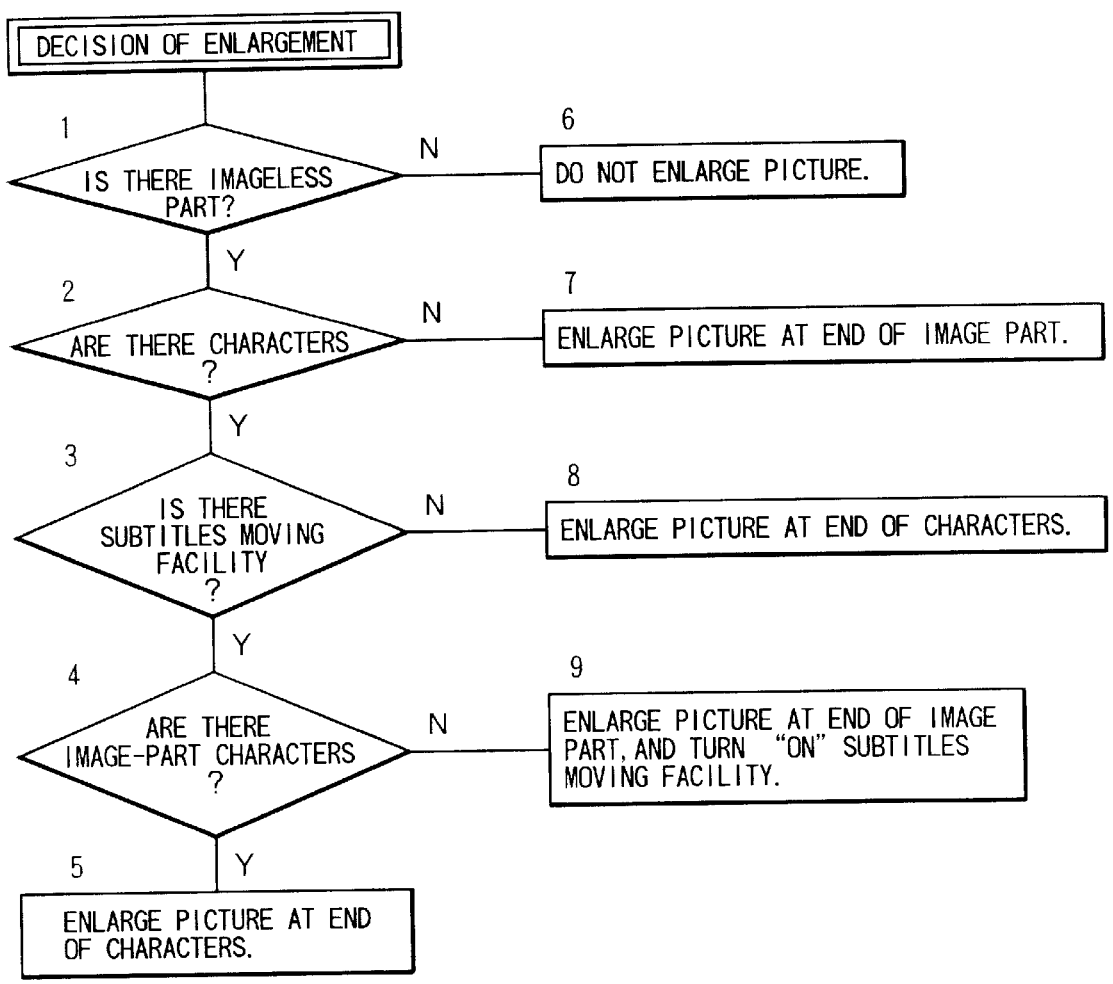

F I G. 34
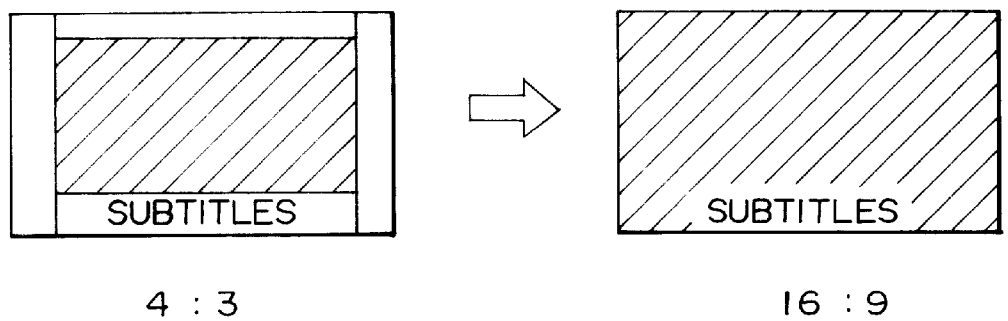
F I G. 35A
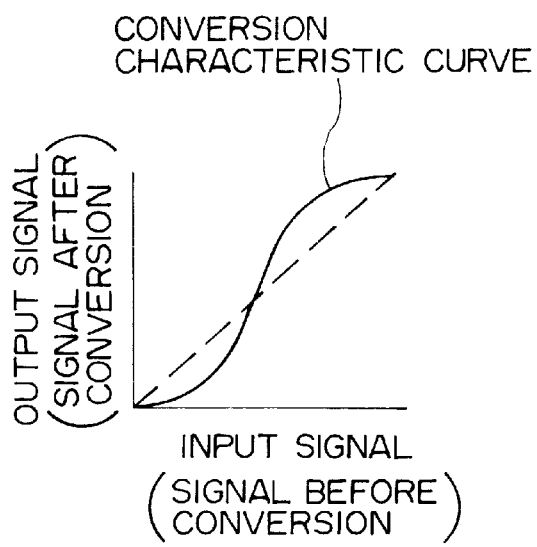
F I G. 35B
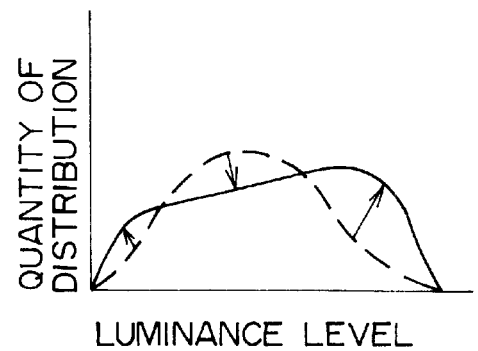

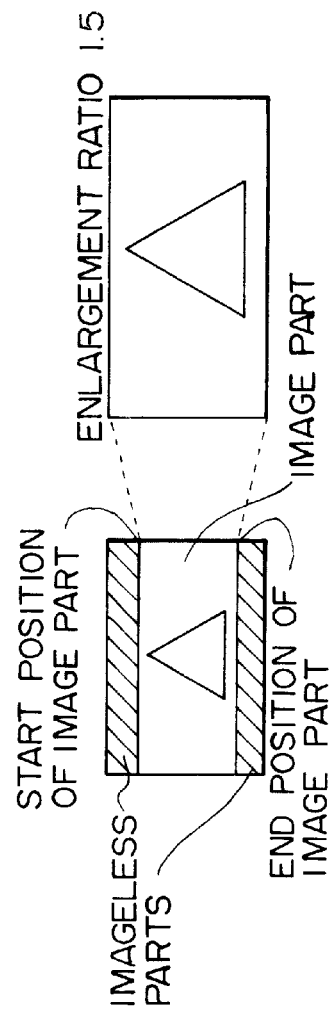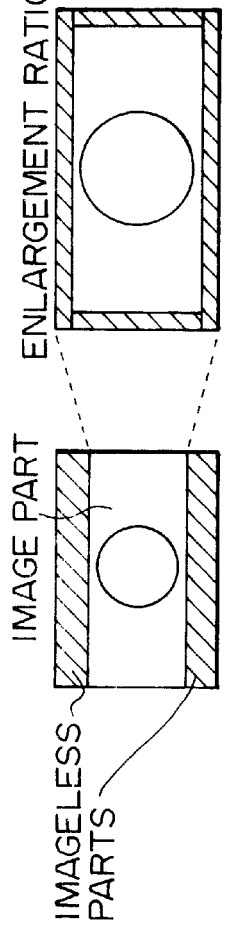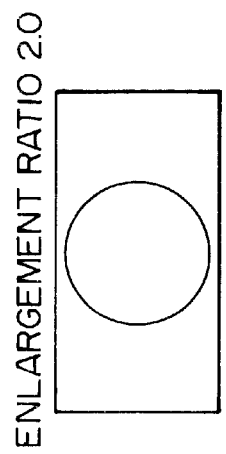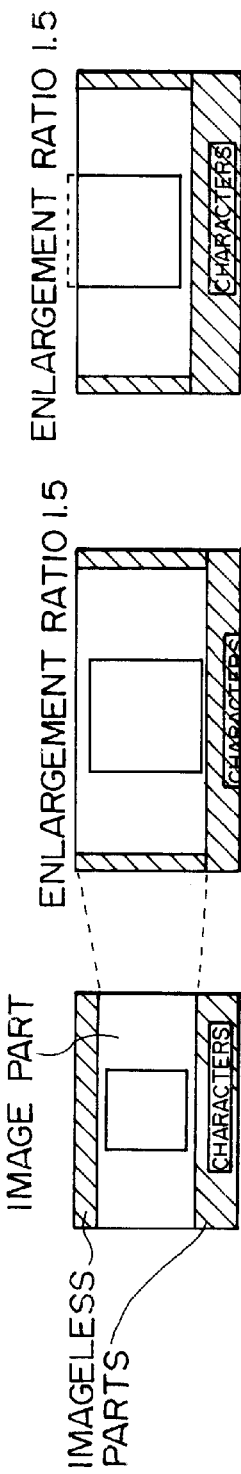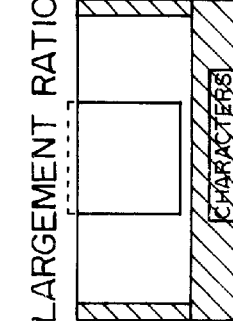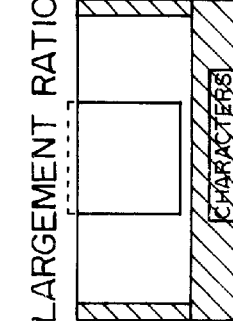

| A | B | C |
|---|---|---|
| D | E | F |

APPARATUS FOR DETECTING POSITION OF FEATURING REGION OF PICTURE, SUCH AS SUBTITLE OR IMAGELESS PART

BACKGROUND OF THE INVENTION

1. Field of the Invention

The present invention relates broadly to video signal processing. More particularly, it relates to technology for automatically detecting the position of the featuring part of a picture, such as an imageless part, in a television signal processing system.

2. Description of the Related Art

Conventional television receivers have screens which are endowed with an aspect ratio of 4:3. "High-vision" TV receivers, "wide" TV receivers, etc. whose screens are laterally longer owing to an aspect ratio of 16:9, are recently available as products. Such television receivers having the screen aspect ratio of 16:9 display laterally longer pictures as compared with the conventional television receivers having the screen aspect ratio of 4:3, and therefore bring forth the merit that the feeling of ambience is enhanced.

In a case where pictures based on video signals conforming to the ordinary aspect ratio of 4:3 are to be displayed by the television receivers having the screen aspect ratio of 16:9, various display examples are considered as stated below.

FIGS. 37A–37C and FIGS. 38A–38H are explanatory diagrams showing the examples in which the pictures based on the video signals conforming to the aspect ratio of 4:3 are displayed by the television receivers which have the screen aspect ratio of 16:9.

FIG. 37A illustrates the picture which is based on the video signal of the aspect ratio of 4:3. In case of displaying the full vertical direction of the picture as shown in FIG. 37B, imageless parts containing no image information appear on the right and left sides of the screen of the 16:9 TV receiver. On the other hand, in case of displaying the full lateral direction of the picture as shown in FIG. 37C (in case of enlarging the video signal and then displaying the enlarged video signal), several upper and lower lines of the 4:3 picture in the vertical direction thereof are missing.

Besides, FIGS. 38A, 38C and 38F illustrate the different pictures which are based on the video signals of the aspect ratio of 4:3, while FIGS. 38B, 38D, 38E, 38G and 38H illustrate the display examples, respectively. There are a large number of articles of movie (or motion picture) software in which the picture based on the video signal of the aspect ratio of 4:3 has imageless parts above and below an image part (containing image information) as shown in FIG. 38A, 38C or 38F. Especially the picture which contains characters at the lower part thereof as shown in FIG. 38F, is often found in the movie software.

By way of example, in a case where the picture based on the video signal of the aspect ratio of 4:3 is as shown in FIG. 38A, the image part can be displayed on the whole screen of the 16:9 TV receiver by setting an enlargement ratio of 1.5 as shown in FIG. 38B. However, in a case where the picture shown in FIG. 38A has changed-over to the picture having the imageless part of large area as shown in FIG. 38C or FIG. 38F, the enlargement ratio left intact incurs the situation of FIG. 38D where imageless parts are displayed at the upper and lower parts of the screen or the situation of FIG. 38G where the characters are partly lacked. Accordingly, the picture shown in FIG. 38C needs to be displayed by increasing the enlargement ratio as shown in FIG. 38E, and the picture shown in FIG. 38F by shifting its vertical position as shown in FIG. 38H.

It is very complicated, however, to set the enlargement ratio or the central position of the picture on each occasion for the purpose of attaining the optimum display for each of the various video signals as stated above. Therefore, if the enlargement ratio and the central position of the picture can be automatically set, the handling of the software based on the video signal of the aspect ratio of 4:3 becomes very convenient. The enlargement ratio and the central position of the picture may be determined from the detected values of the boundary positions between the image part and imageless parts of the picture in the vertical direction thereof, in other words, the No. of the start line of the image part of the picture (the start position of the image part in the vertical direction) and the No. of the end line of the image part (the end position of the image part in the vertical direction). Since, however, the video signal changes every moment, the correct boundary positions need to be detected every moment.

An example of prior-art apparatuses relevant to the above is a subtitles-region detection apparatus disclosed in the official gazette of Japanese Patent Application Laid-open No. 321387/1992 wherein only the part of the characters is extracted from the picture of the aspect ratio of 4:3 having the imageless parts at its upper and lower parts and containing the characters (i. e., subtitles) at its lower part as shown in FIG. 38F, and wherein the extracted part is inserted in another position of the picture so as to be displayed.

In the prior-art example, the end position of the image part as shown in FIG. 38F is detected, and the subtitles are moved by utilizing the detected position as the reference of the movement.

The arrangement of the essential portions of the prior-art example is illustrated in FIG. 39. The operation of detecting the image-part end position will be explained in conjunction with FIG. 38F. The prior-art apparatus comprises an input terminal 201, an integration circuit 202, a comparator 203, a counter 204 and an output terminal 205.

Referring to FIG. 39, a video signal is supplied to the input terminal 201. The integration circuit 202 computes and delivers the average level of each line of the video signal. The comparator 203 compares the output of the integration circuit 202 with a fixed value, and it delivers a low ('L') level on condition that the former is smaller than the latter in the comparison. The counter 204 counts the number of successive lines affording the 'L' level as the outputs of the comparator 203. On condition that the counted number has reached a predetermined value, the first one of the successive lines having afforded the 'L' level is judged to indicate the image-part end position (as seen from FIG. 38F), which is delivered from the output terminal 205.

Meanwhile, in the field of television receivers, attempts have heretofore been made to better a video signal in points of luminance and tint in accordance with the content of a picture. A recent example is a method wherein the picture displayed on the screen of the TV receiver is divided into predetermined regions, and the picture qualities of the respective regions are adjusted independently of one another in accordance with the input video signal, thereby intending to attain a good picture quality at all times. Such a method of adjusting the picture quality of the television receiver is a technique disclosed in the official gazette of Japanese Patent Application Laid-open No. 154478/1991.

FIG. 40 is a block diagram showing a picture quality adjustment apparatus for the television receiver in the prior art. Referring to the figure, numeral 3001 designates an automatic picture-quality adjustment device, which subjects the video signal to the adjustment of the picture quality. An antenna 3002 receives video signals. A tuner 3003 selects a desired channel for reception, from among the received signals. A video intermediate-frequency (VIF) circuit 3004 detects the intermediate frequency of the selected video signal. In the adjustment device 3001, a level conversion circuit 3005 converts the level of the video signal. An analog-to-digital (A/D) converter 3006 converts the analog signal into a digital value. A microcomputer 3007 includes a level detector 3008 which detects the signal level on the basis of the digital signal, a controller 3009 regulates the gain of the level conversion circuit 3005 on the basis of the level detected by the level detector 3008, and a sampling signal generator 3010 which supplies a sampling signal to the A/D converter 3006. Numeral 3011 indicates a picture tube which images the video signal.

Next, the operation of the TV receiver shown in FIG. 40 will be explained. The video signal is supplied to the automatic picture-quality adjustment device 3001 through the antenna 3002, tuner 3003 and VIF circuit 3004.

The automatic picture-quality adjustment device 3001 subjects the supplied video signal to the picture quality adjustment involving brightness, contract, color densities, tint, etc., and supplies the adjusted video signal to the picture tube 3011.

Herein, the automatic picture-quality adjustment device 3001 operates as stated below.

The video signal delivered from the VIF circuit 3004 is sampled by the A/D converter 3006 in accordance with the sampling signal delivered from the sampling signal generator 3010, and the sampled data are supplied to the level detector 3008. Then, the level detector 3008 accepts the sampled data for, e.g., one frame and detects the signal level. The detected result for one frame is stored in a memory (not shown).

The controller 3009 sequentially reads out the data of the signal levels corresponding to the six domains A, B, C, D, E and F of a picture displayed on the screen of the picture tube 3011 as shown in FIG. 41, from among the data stored in the memory. Subsequently, it sets the conversion parameter of the level conversion circuit 3005 in order that each domain may be reproduced with the optimum picture quality conforming to the signal level. The conversion parameters of the six domains thus set are delivered as the control signals of the level conversion circuit 3005.

The level conversion circuit 3005 adjusts the picture qualities of the six domains A–F independently of one another in accordance with the conversion parameters supplied from the controller 3009, with respect to the input video signal supplied from the VIF circuit 3004. It supplies the signals of the adjusted picture qualities to the picture tube 3011.

Owing to the above operation, the picture qualities of the respective domains A–F displayed on the screen can be adjusted independently of one another.

SUMMARY OF THE INVENTION

With the subtitles-region detection apparatus being the prior-art example stated before (Japanese Patent Application Laid-open No. 321387/1992), only the end position of the image part is detected without detecting the start position thereof. Therefore, the boundary position (between the image part and the lower imageless part as shown in FIG. 38F) cannot be precisely detected.

Moreover, with the prior-art apparatus, erroneous detection is caused by some pictures of the supplied video signal. By way of example, in case of a dark picture whose average luminance is low, the distinction between the image part and the imageless part is difficult, and the detection of the correct image-part end position is sometimes impossible. Besides, in case of a picture which includes a black lateral band as in white and black lateral stripes, the head position of the black lateral band can be erroneously detected as the image-part end position.

Besides, in a case where a video signal affording a so-called "letter box picture" which has imageless regions at the upper and lower parts of the picture has been supplied as an input, it is essentially desirable to divide the picture into an image region and the imageless regions and to adjust the picture qualities of the individual regions independently of one another. With the prior-art example for the picture quality adjustment (Japanese Patent Application Laid-open No. 154478/1991), however, the domains whose picture qualities can be adjusted independently of one another are previously determined, respectively, and they are not held in correspondence with the sorts of pictures, such as the letter box picture, and the changes of the pictures. It is therefore impossible to adjust the picture qualities in the image region and the imageless regions independently of one another. Moreover, in a case where the predetermined domains do not coincide with the image and imageless regions, a rather unnatural picture is sometimes reproduced by making the picture quality adjustment stated before.

The present invention therefore has for its object to solve the problems of the prior-art examples, and to provide a boundary position detection apparatus in which boundary positions can be precisely detected in any picture having imageless parts at the upper and lower parts thereof, in turn, to automatically perform the settings of the optimum enlargement ratio and position of a display picture and the picture quality adjustments of individual domains through the detection of the boundary positions.

Other objects of the present invention are to detect a subtitles region containing subtitles information, from within a video signal containing the subtitles information, and to edit the detected subtitles region.

In order to accomplish such objects, the present invention consists in, for example, a boundary position detection apparatus comprising line decision means for detecting which of an image part and an imageless part in a picture a line belongs to, boundary detection means for detecting a boundary position between the image part and the imageless part in a vertical direction of the picture, time integration means for temporally integrating the boundary positions obtained by the boundary detection means, over several fields, and detection control means for detecting an average luminance of the image part and controlling an integrating time interval in the time integration means with the detected luminance value.

In the detection apparatus, the line decision means decides whether the line belongs to the image region or to the imageless region. The boundary detection means detects the boundary position between the image part and the imageless part in the vertical direction, and delivers the No. of the line of the detected position. The time integration means determines the final boundary position by temporally integrating the boundary positions obtained by the boundary detection means, over the several fields. The detection control means detects the average luminance of the image region, and controls the integrating time interval in the time integration means by the use of the detected luminance value. Thus, influence ascribable to erroneous detection can be mitigated, so that the boundary position between the image part and the imageless part in the vertical direction can be precisely detected in case of any video signal affording, e.g., a dark picture of small signal amplitudes.

BRIEF DESCRIPTION OF THE DRAWINGS

FIG. 2 is an explanatory diagram showing the range of the start position of an image part and that of the end position of the image part;

FIG. 7 is a block diagram showing a boundary position detection apparatus which is the third embodiment of the present invention;

FIGS. 9A and 9B are diagrams for explaining the detection ranges of average luminances which are evaluated in the embodiment depicted in FIG. 8;

FIG. 13 is a diagram for explaining the operation of detecting the position of characters in an imageless part in the embodiment depicted in FIG. 11;

FIG. 14 is a block diagram showing a boundary position detection apparatus which is the seventh embodiment of the present invention;

FIG. 18 is a processing flow chart showing an example in which a picture based on a video signal conforming to an aspect ratio of 4:3 is automatically enlarged and displayed by a television receiver having a screen aspect ratio of 16:9;

FIG. 34 is an explanatory diagram showing the situation of a subtitles control;

FIGS. 35A and 35B are graphical diagrams for explaining a nonlinear curve in accordance with which an input signal is converted;

FIGS. 38A thru 38H are diagrams showing examples in which pictures based on video signals conforming to the aspect ratio of 4:3 are displayed by the television receiver having the screen aspect ratio of 16:9;

DESCRIPTION OF THE PREFERRED EMBODIMENTS

Now, the present invention will be described in detail in connection with embodiments.

The first embodiment of the present invention will be described.

Figure 1:
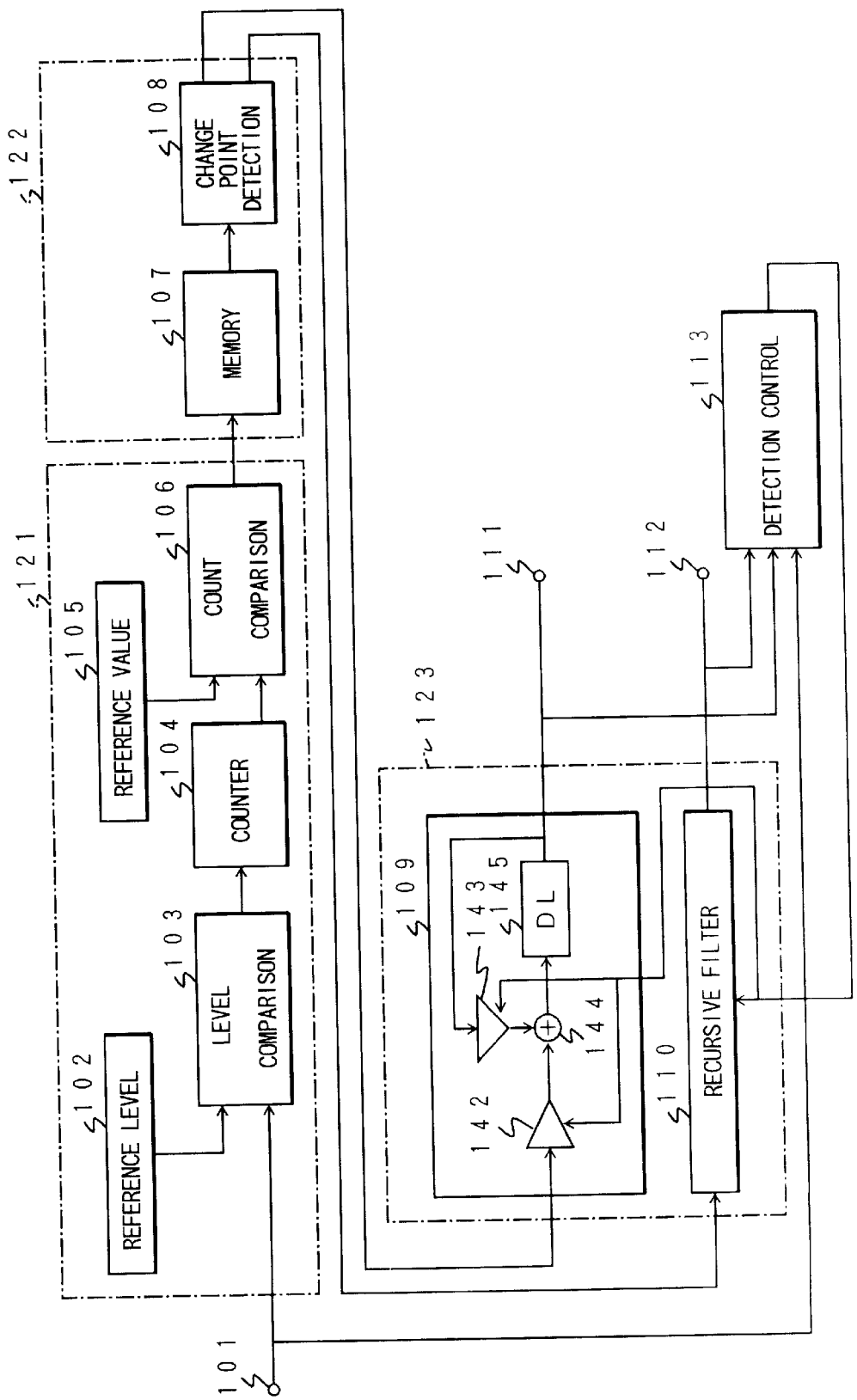
FIG. 1 is a block diagram showing a boundary position detection apparatus which is an embodiment of the present invention.

FIG. 1 is a block diagram showing a boundary position detection apparatus which is the first embodiment of the present invention. Referring to the figure, the embodiment comprises an input terminal 101, a reference level setting circuit 102, a level comparison circuit 103, a counter 104, a reference value setting circuit 105, a count comparison circuit 106, a memory circuit 107, a change point detection circuit 108, recursive filters 109 and 110, output terminals 111 and 112, and a detection control circuit 113. Numeral 121 designates a line decision circuit, numeral 122 a boundary decision circuit, and numeral 123 a time integration circuit. The recursive filter 109 includes coefficient multipliers 142 and 143, an adder 144, and a delay circuit 145.

The circuit arrangement of the embodiment shown in FIG. 1 operates as stated below. A video signal is supplied via the input terminal 101. The line decision circuit 121 decides whether the video signal belongs to an image part or to an imageless part, every line, and it delivers the decided result to the boundary decision circuit 122. Then, the boundary decision circuit 122 detects the boundaries between the imageless parts and the image part on the basis of the line decision results delivered from the line decision circuit 121, and it delivers the detected boundaries as the tentative start position of the image part and the tentative end position thereof. Subsequently, the time integration circuit 123 integrates the boundary detection results delivered from the boundary decision circuit 122 and the boundary detection results of the past several fields, so as to compute the average levels thereof. The computed results are respectively delivered as the final start position of the image part from the output terminal 111, and as the final end position of the image part from the output terminal 112. Owing to such integration, detection errors ascribable to noise etc. can be reduced.

In addition, the outputs (the final start position of the image part and the final end position thereof) of the time integration circuit 123 are supplied to the detection control circuit 113. Then, the detection control circuit 113 determines the region of the image part from the supplied final image-part start and end positions, and it evaluates the average luminance of the image part of the video signal supplied via the input terminal 101. Further, the detection control circuit 113 supplies the time integration circuit 123 with a control signal which depends upon the average luminance. In compliance with the control signal supplied from the detection control circuit 113, the time integration circuit 123 changes the integrating time interval thereof. More specifically, when the average luminance of the region of the image part is high, the detection control circuit 113 delivers the control signal which shortens the integrating time interval of the time integration circuit 123. Thus, the responsibility of the boundary position detection apparatus can be quickened. To the contrary, when the average luminance of the region of the image part is low, erroneous detection is liable to occur, and hence, the detection control circuit 113 delivers the control signal which lengthens the integrating time interval. In this way, the detection apparatus can be prevented from delivering erroneous positions as the final start and end positions of the image part.

As stated above, after the region of the image part has been determined using the detected boundary positions, the average luminance of the image part is detected, and the integrating time interval of the time integration circuit 123 is changed in accordance with the detected average luminance, whereby the erroneous detection of the boundary positions in the case of a supplied signal of low luminance can be mitigated.

Next, the practicable construction and operation of the line decision circuit 121 will be explained in detail with reference to FIG. 1. Here in this embodiment, the line decision circuit 121 is constructed of the reference level setting circuit 102, level comparison circuit 103, counter 104, reference value setting circuit 105 and count comparison circuit 106. Among them, the reference level setting circuit 102 sets a reference level for distinguishing the image part from the imageless part, at a certain fixed value, for example, 10 (IRE), and it delivers the set reference level to the level comparison circuit 103. Incidentally, the reason why the reference level is set at 10 (IRE) will be explained later.

The level comparison circuit 103 checks if the signal levels of the video signal successively supplied as digital data are lower than the reference level delivered from the reference level setting circuit 102. It delivers a high ('H') level in case of the signal level lower than the reference level, or a low ('L') level in case of the signal level not lower than the reference level, every predetermined sampling period, thereby deciding whether or not the digital data belongs to the imageless part.

The counter 104 counts the number of the 'H' pulses delivered from the level comparison circuit 103, every line, and it delivers the counted result every line. Incidentally, the count value of the counter 104 is reset during the horizontal flyback period of the video signal.

The count comparison circuit 106 makes the comparison between a reference value delivered from the reference value setting circuit 105 and the count value of each line delivered from the counter 104. It delivers an 'H' level in case of the count value larger than the reference value, or an 'L' level in case of the count value smaller than the reference value, every line, thereby deciding whether or not the digital data belongs to the imageless part. Here, the reference value which is set by the reference value setting circuit 105 is a criterion which serves to determine whether or not the pertinent line belongs to the imageless part, in dependency on the total number of the digital data belonging to the imageless part. By way of example, the reference value is set at 90 (%) of the total count number of the digital data of each line.

Next, the practicable construction and operation of the boundary decision circuit 122 will be explained in detail with reference to FIG. 1. Here in this embodiment, the boundary decision circuit 122 is constructed of the memory circuit 107 and the change point detection circuit 108.

The memory circuit 107 of the boundary decision circuit 122 is a circuit which stores therein the decided results delivered from the count comparison circuit 106 of the line decision circuit 121. More specifically, the comparison results of the respective lines are successively stored in the memory circuit 107 for, at least, one field. By way of example, the first line of each field can be judged using the vertical flyback signal of the video signal.

The change point detection circuit 108 detects whether or not the pertinent line is the boundary in the vertical direction of a picture expressed by the video signal, every line on the basis of the decided results of the respective lines stored in the memory circuit 107.

Here, an example of the detecting operation of the detection circuit 108 will be explained. The decided results concerning ten successive lines are read out of the memory circuit 107 while being shifted one line sequentially from the line which follows the vertical sync signal of the video signal. Assuming that eight lines belonging to the image part have appeared among the ten lines read out, the change point detection circuit 108 determines the head line of the eight lines as the boundary. Accordingly, it decides the part of the picture preceding the head line, as the imageless part, and the part thereof including the head line et seq., as the image part. Also, assuming that eight lines belonging to the imageless part have thereafter appeared among the ten lines read out, the change point detection circuit 108 determines the head line of the eight lines as the boundary. Accordingly, it decides the part of the picture preceding the head line, as the image part, and the part thereof including the head line et seq., as the imageless part.

Next, another example of the detecting operation will be explained. The decided results concerning five successive lines are read out of the memory circuit 107 while being shifted one line sequentially from the line which follows the vertical sync signal of the video signal. Assuming that five lines belonging to the image part have appeared in succession among the five lines read out, the change point detection circuit 108 determines the head line of the five lines as the boundary. Accordingly, it decides the part of the picture preceding the head line, as the imageless part, and the part thereof including the head line et seq., as the image part. Also, assuming that five lines belonging to the imageless part have thereafter appeared in succession among the five lines read out, the change point detection circuit 108 determines the head line of the five lines as the boundary. Accordingly, it decides the part of the picture preceding the head line, as the image part, and the part thereof including the head line et seq., as the imageless part. Decision errors ascribable to noise etc. can be reduced by grasping only the change of successive data as in this example.

Incidentally, the numbers of lines, etc. mentioned here are mere examples to the last, and any desired numbers of lines can be applied without being restricted to the exemplified numbers.

Subsequently, the change point detection circuit 108 decides if the boundary positions (the start and end positions of the image part) in the vertical direction as detected in the above way are correct. In a case where the boundary positions have been decided correct, the detection circuit 108 delivers the start and end positions of the image part to the time integration circuit 123 as the tentative start and end positions of the image part, respectively. On the other hand, in a case where the boundary positions have not been decided correct, that is, where the erroneous detection has been decided, the detection circuit 108 delivers an erroneous detection signal to the time integration circuit 123. By the way, the delivery of the erroneous detection signal may well be replaced with the delivery of no output because of the erroneous detection, that of a signal indicating the absence of the imageless part, or that of "0" (zero). In the ensuing description, it shall be assumed to deliver "0" in the case where the erroneous detection has been decided.

There will now be explained the above decision on the correct positions. As shown in FIG. 2 by way of example, the range of the start position of the image part and the range of the end position of the image part are respectively set beforehand. When the detected boundary positions (the start and end positions of the image part) in the vertical direction lie within the respectively corresponding ranges, they are decided correct, and when they lie outside the ranges, the erroneous detection is decided. Incidentally, the ranges of the start and end positions of the image part may be set on the basis of the positions of the imageless parts in actual movie (or motion picture) software or the like, or they may be set so as to conform to the enlargement ratios of an enlarged-display apparatus. As indicated in FIG. 2 by way of example, the range of the image-part start position is set to cover line #20 thru line #100, and the range of the image-part end position is set to cover line #140 thru line #240. Herein, one field is assumed to consist of 262.5 lines.

Next, the practicable construction and operation of the time integration circuit 123 will be explained in detail with reference to FIG. 1. Here in this embodiment, the time integration circuit 123 is constructed of the two recursive filters 109 and 110. By the way, since the recursive filters 109 and 110 have the same internal circuit arrangements, the internal circuit arrangement of the recursive filter 110 is omitted from illustration in FIG. 1.

Since the recursive filters 109 and 110 operate similarly, only the operation of the recursive filter 109 will be explained.. The coefficient multiplier 142 multiplies the tentative image-part start position (namely, the line No.) delivered from the change point detection circuit 108, by k so as to deliver the multiplied result. On the other hand, the coefficient multiplier 143 multiplies the final image-part start position (namely, line No.) delivered from the delay circuit 145, by (1−k) so as to deliver the multiplied result. Subsequently, the adder 144 adds up the outputs of the coefficient multipliers 142 and 143 so as to deliver the resulting sum. The delay circuit 145 delays the output of the adder 144 in correspondence with one field, and delivers the resulting value to the output terminal 111 as the final image-part start position.

Further, the recursive filter 109 has the value k of the coefficient multipliers 142 and 143 controlled by the control signal delivered from the detection control circuit 113. More specifically, when the average luminance of the image part as evaluated by the detection control circuit 113 is high, the value k is made large, for example, 0.7. Thus, the load factor of the tentative image-part start position becomes large, the proportion in which the tentative image-part start position is delivered as the final image-part start position increases, and the integrating time interval shortens as stated before. To the contrary, when the average luminance of the image part is low, the value k is made small, for example, 0.3. Thus, the load factor of the tentative image-part start position becomes small, the proportion in which the tentative image-part start position is delivered as the final image-part start position decreases, and the integrating time interval lengthens as stated before.

By the way, in the case where the erroneous detection signals are delivered from the boundary decision circuit 122, they are prevented from entering the recursive filters 109 and 110, and they are prevented from affecting the outputs of the recursive filters 109 and 110.

As explained above, the values of the coefficients of the coefficient multipliers in the recursive filters 109 and 110 are controlled in accordance with the average luminance of the image part, whereby the erroneous detection of the boundary positions in the case of the supplied signal of low luminance can be mitigated.

Regarding the time integration circuit 123, a variety of other circuit arrangements can be considered. For example, it is also allowed to execute weighted additions by setting weighted ranges for the start position of the image part and the end position thereof.

Figure 3:
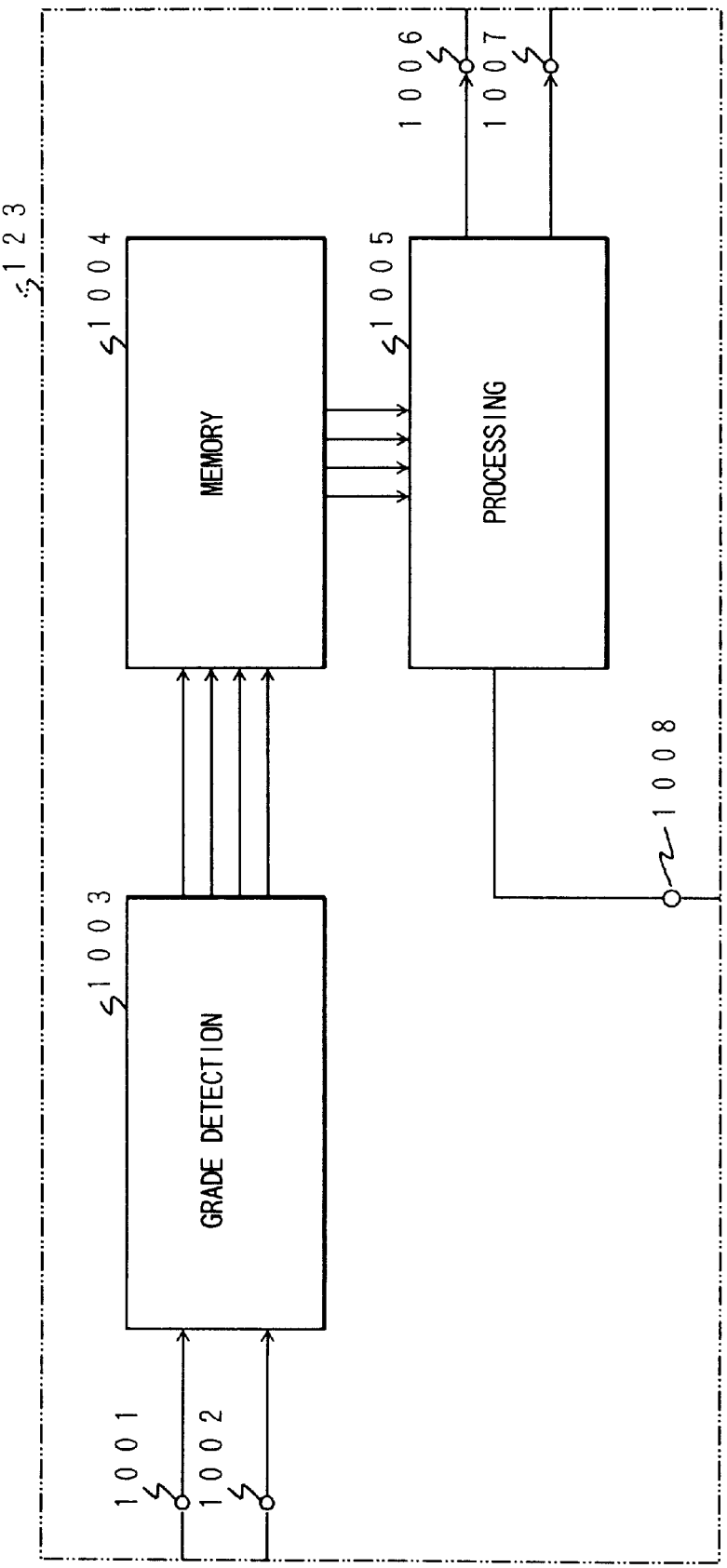
FIG. 3 is a block diagram showing another circuit arrangement for a time integrating circuit depicted in FIG. 1.

Accordingly, that circuit arrangement of the time integration circuit 123 which executes such weighted additions will be explained with reference to FIGS. 3 and 4. Referring to FIG. 3, the time integration circuit 123 includes input terminals 1001 and 1002 which are respectively supplied with the tentative image-part start position and tentative image-part end position delivered from the change point detection circuit 108 shown in FIG. 1, a grade detection circuit 1003, a memory circuit 1004, a processing circuit 1005, output terminals 1006 and 1007 from which the final image-part start position and final image-part end position are respectively delivered to the output terminals 111 and 112 shown in FIG. 1, and an input terminal 1008 which is supplied with the control signal delivered from the detection control circuit 113 shown in FIG. 1.

In operation, the tentative image-part start position and end position are respectively received by the input terminals 1001 and 1002. On the basis of the received tentative image-part start position and end position, the grade detection circuit 1003 detects grades or weights indicative of the certainties at which the tentative image-part start position and end position are existent, respectively. Besides, the grade detection circuit 1003 supplies the memory circuit 1004 with the received tentative image-part start position as well as the detected grade thereof, and the received tentative image-part end position as well as the detected grade thereof. Incidentally, the grade detection circuit 1003 can be implemented by a conversion table utilizing a ROM or the like.

Figure 4:
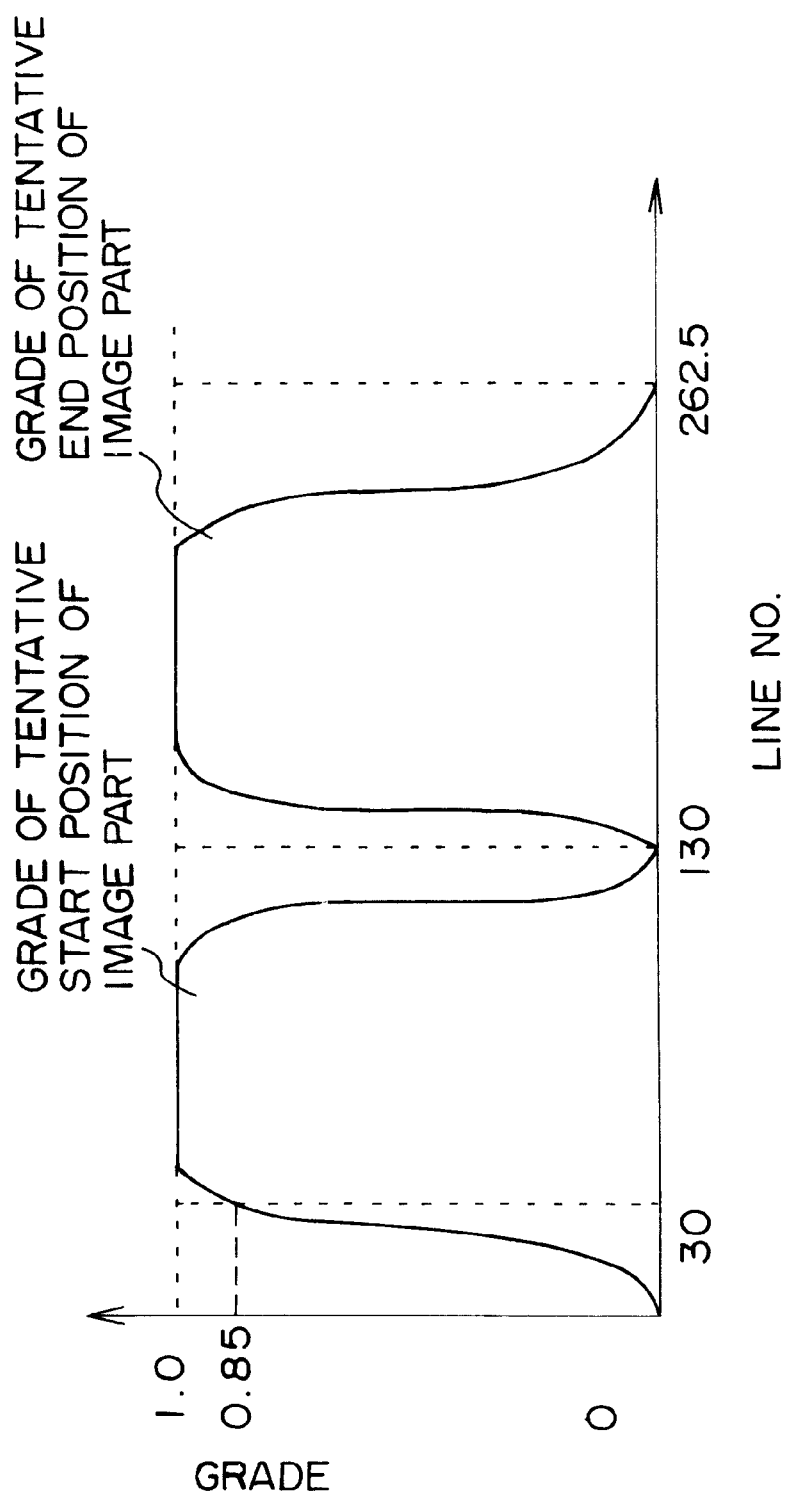
FIG. 4 is a graphical diagram showing a setting example of grades for a tentative image-part start position and a tentative image-part end position in the time integrating circuit depicted in FIG. 3.

FIG. 4 illustrates a setting example of the grades for the tentative start and end positions of the image part. In the figure, the axis of abscissas represents the line No., while the axis of ordinates represents the grades. Besides, a dentiform curve on the left side as viewed in the figure indicates the grade for the tentative image-part start position, while a dentiform curve on the right side indicates the grade for the tentative image-part end position. As shown in FIG. 4, in a case where the tentative image-part start position is line #30 by way of example, the grade on this occasion is 0.85.

Referring back to FIG. 3, the memory circuit 1004 stores therein the tentative image-part start position, tentative image-part end position and respectively corresponding grades delivered from the grade detection circuit 1003, successively every field, until the tentative image-part start positions, tentative image-part end positions and respectively corresponding grades for several fields in the past are stored therein. The memory circuit 1004 delivers the stored data for the several past fields, to the processing circuit 1005 in compliance with a request made by this processing circuit 1005.

The processing circuit 1005 reads out of the memory circuit 1004 the stored data in the total number of N (that is, the N tentative image-part start positions, the N tentative image-part end positions, the N grades of the start positions, and the N grades of the end positions) successively from the newest stored data, and it calculates weighted averages on the basis of the data.

Here, the weighted average of the data will be explained. Symbol $V_{st}0$ is let denote the tentative image-part start position at the current time, while symbol $G_{st}0$ is let denote the grade corresponding to the start position $V_{st}0$. The tentative image-part start position of the last field is denoted by symbol $V_{st}1$, and the corresponding grade by symbol $G_{st}1$. Further, the tentative image-part start position of the penultimate field is denoted by symbol $V_{st}2$, and the corresponding grade by symbol $G_{st}2$. The same applies thenceforth. In this case, the final image-part start position is concluded in accordance with the following formula (1):

$$\text{Final image-part start position} = \frac{\sum_{i=0}^{N} Gsti \times Vsti}{\sum_{i=0}^{N} Gsti} \quad (1)$$

The final image-part end position is similarly concluded from the tentative image-part end positions and the corresponding grades.

On this occasion, the processing circuit 1005 varies the integrating time interval in such a way that the total number N of the data for evaluating the weighted averages is changed in accordance with the control signal supplied from the detection control circuit 113 to the input terminal 1008.

As thus far explained, according to the circuit arrangement of the time integration circuit 123 shown in FIG. 3, the weighted additions are executed. Therefore, the tentative image-part start positions near the boundary of the image-part start position range shown in FIG. 2 and the tentative image-part end positions near the boundary of the image-part end position range become difficult of being delivered from the time integration circuit 123. Accordingly, the circuit arrangement of the time integration circuit 123 shown in FIG. 3 is effective in a case where the image-part start position range and the image-part end position range are indefinite. Incidentally, such a circuit arrangement can be implemented even by a microcomputer in which a memory circuit and a processing circuit are built.

Since the operation of the detection control circuit 113 has already been detailed, it shall not be tediously explained.

Figure 5:
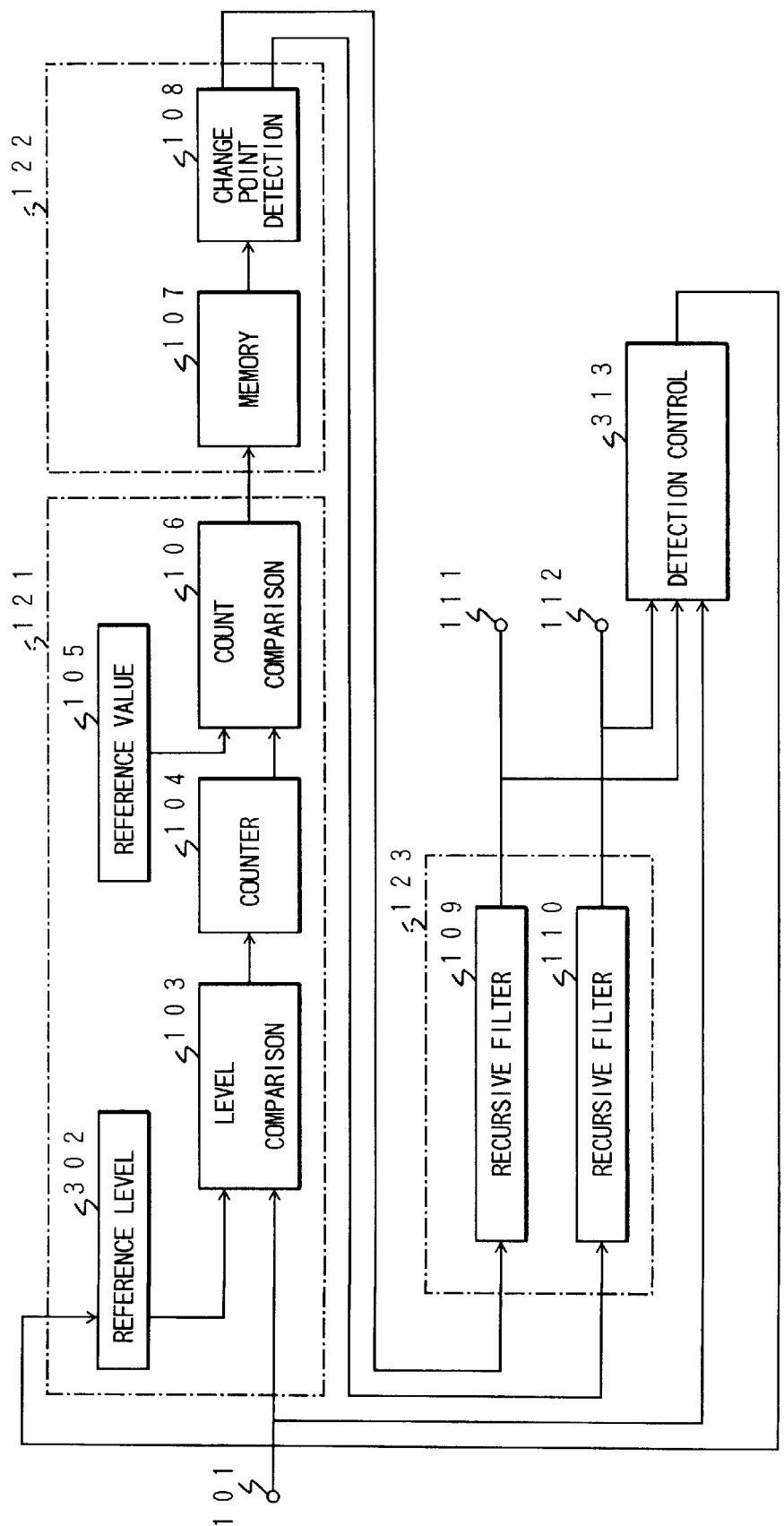
FIG. 5 is a block diagram showing a boundary position detection apparatus which is the second embodiment of the present invention.

Now, the second embodiment of the present invention will be described. FIG. 5 is a block diagram showing a boundary position detection apparatus which is the second embodiment of the present invention. In FIG. 5, identical reference numerals are respectively assigned to the same constituents as in FIG. 1. Besides, numeral 302 designates a reference level setting circuit, and numeral 313 a detection control circuit. Regarding circuit operations in the embodiment shown in FIG. 5, the same constituents as in FIG. 1 operate similarly, and the operations thereof shall be omitted from explanation. The detection control circuit 313 is supplied with the final image-part start position and final image-part end position delivered from the time integration circuit 123, so as to determine the region of the image part from the supplied final positions, and it evaluates the average luminance of the image part of the video signal supplied via the input terminal 101. Besides, the detection control circuit 313 generates a control signal for controlling the reference level setting circuit 302, in accordance with the average luminance of the image part, and it delivers the control signal to the reference level setting circuit 302.

The reference level setting circuit 302 sets a reference level for distinguishing the image part from the imageless part, in accordance with the control signal delivered from the detection control circuit 313. The reference level is set at a first fixed value when the average luminance of the image part is high, and at a second fixed value when the same is low. The set reference level is delivered to the level comparison circuit 103.

More specifically, when the average luminance of the image part is high, the first fixed value is, for example, 10 (IRE). The reason why, in this manner, the reference level is set at the high value (10 (IRE)) with an offset afforded relative to the level of 0 (zero) (IRE), is that the amplitude level of the imageless part included in the video signal is not always 0 (IRE), but that it sometimes has a high value (for example, 5 (IRE)).

Figure 6A:
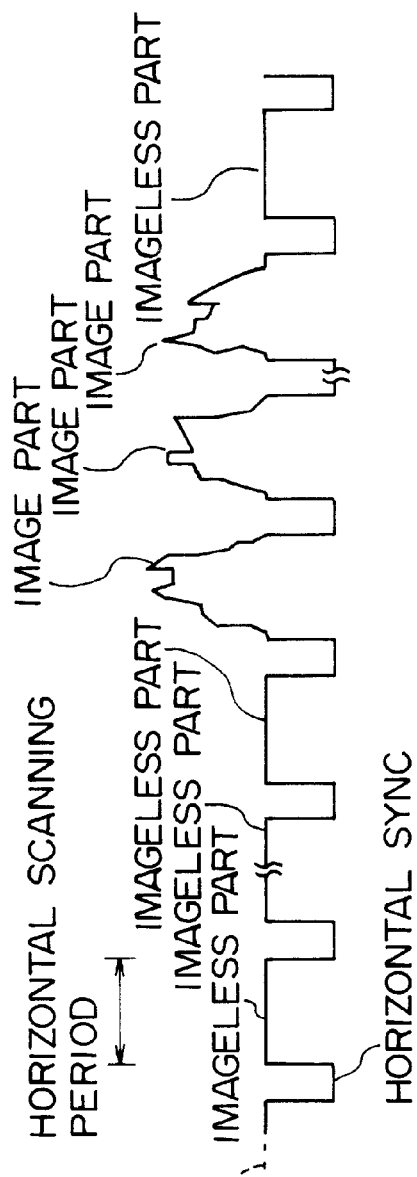
FIGS. 6A and 6B are waveform diagrams each showing the waveform of a video signal which is supplied via an input terminal depicted in FIG. 5.
Figure 6B:
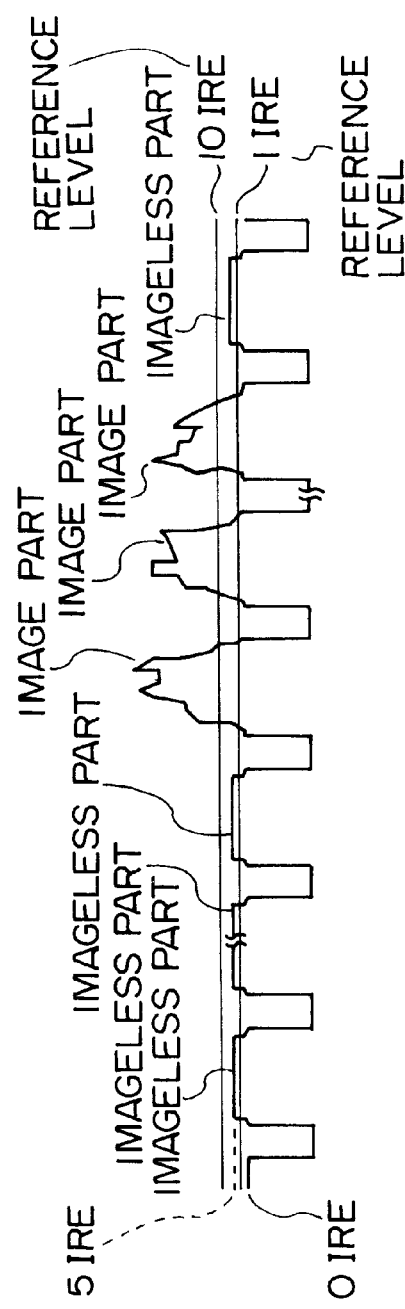

This situation will be explained with reference to FIGS. 6A and 6B. In a case where the video signal in which the imageless part has the amplitude level of 0 (IRE) is supplied as shown in FIG. 6A, the average luminance of the imageless part is 0 (IRE). Therefore, even when the reference level is set at 1 (IRE) by way of example, the imageless part can be detected. However, in a case where the scene or picture of the video signal has changed so as to include the imageless part whose amplitude level is 5 (IRE) as shown in FIG. 6B, the amplitude level of the imageless part becomes higher than the reference level (1 (IRE)), and hence, the imageless part is erroneously detected as the image part. Therefore, the reference level is set at the high value having the offset, that is, at 10 (IRE). Thus, it is permitted to precisely detect the imageless part even when the amplitude level of the imageless part has fluctuated to some extent.

On the other hand, when the average luminance of the image part is low, the reference level to be delivered to the level comparison circuit 103 is set at a value lower than the aforementioned level (namely, 10 (IRE)), for example, at 2 (IRE) as the second fixed value.

Owing to the above operation, in a dark scene expressed by the video signal, a control is performed so as to heighten the imageless-part detection accuracy of the line decision circuit 121, and the erroneous detection of the boundary position can be mitigated. Besides, in a bright scene expressed by the video signal, the imageless part thereof can be precisely detected even when its amplitude level has somewhat fluctuated.

Now, the third embodiment of the present invention will be described. FIG. 7 is a block diagram showing a boundary position detection apparatus which is the third embodiment of the present invention. In FIG. 7, identical reference numerals are respectively assigned to the same constituents as in FIG. 1. Besides, numeral 402 designates a reference level setting circuit, and numeral 413 an individual-region detection control circuit.

Regarding circuit operations in the embodiment shown in FIG. 7, the same constituents as in FIG. 1 operate similarly, and the operations thereof shall be omitted from explanation. The individual-region detection control circuit 413 is supplied with the final image-part start position and final image-part end position delivered from the time integration circuit 123, so as to determine the region of the image part and the region of the imageless part from the respective positions, and it evaluates the average luminance of the image part and that of the imageless part of the video signal supplied via the input terminal 101. Subsequently, the individual-region detection control circuit 413 generates a control signal for controlling the reference level setting circuit 402, in accordance with the evaluated average luminance of the image part, and it supplies the reference level setting circuit 402 with both the control signal and the evaluated average luminance of the imageless part.

The reference level setting circuit 402 sets a reference level for distinguishing the image part from the imageless part, in accordance with the control signal delivered from the individual-region detection control circuit 413. The reference level is set at a first value when the average luminance of the image part is high, and at a second value when the same is low. The set reference level is delivered to the level comparison circuit 103. On this occasion, the reference level setting circuit 402 determines both the first and second values on the basis of the average luminance of the imageless part as delivered from the individual-region detection control circuit 413. Concretely, in a case where the average luminance of the imageless part is 0 (IRE) by way of example, the first value is set at a value which is higher than the average luminance of the imageless part, for example, at 10 (IRE), and the second value is set at a value which is lower than the first value and close to the average luminance of the imageless part, for example, at 2 (IRE). Accordingly, the reference level setting circuit 402 sets and delivers the reference level of 10 (IRE) when the average luminance of the image part is high, and it sets and delivers the reference level of 2 (IRE) when the average luminance of the image part is low.

The individual-region detection control circuit 413 sets the respective regions of the image part and imageless part from the final image-part start position and end position. In the absence of the region of the imageless part, the circuit 413 does not deliver the average luminance of the imageless part, or it delivers 0 (zero). Besides, in this case, the reference level setting circuit 402 sets the reference level at a certain fixed value.

Owing to the above operation, the average luminance of the imageless part is detected, and the value to be set as the reference level is determined on the basis of the detected average luminance, so that an accuracy for detecting the image-part position can be enhanced. Moreover, in a dark scene expressed by the video signal, a control is performed so as to heighten the imageless-part detection accuracy of the line decision circuit 121, and the erroneous detection of the boundary position can be mitigated.

By the way, the individual-region detection control circuit 413 may well be endowed with a circuit arrangement in which the video signal supplied via the input terminal 101 is submitted to low-pass filter processing before the respective average luminances of the image part and imageless part of the video signal are evaluated. With such a circuit arrangement, any noise component can be removed by the low-pass filter processing, and hence, the average luminance of the imageless part to be evaluated can be stabilized. Besides, the individual-region detection control circuit 413 may well be endowed with a circuit arrangement in which the evaluated average luminances of the imageless parts are temporally integrated over several fields. With such a circuit arrangement, detection errors can be reduced.

According to the second or third embodiment, the reference level for the distinction between the image part and the imageless part is set on the basis of the average luminance of the image part in the reference level setting circuit 302 or 402. In this regard, however, the reference value for determining whether or not the pertinent line belongs to the imageless part may well be similarly set on the basis of the average luminance of the image part in the reference value setting circuit 105. More specifically, when the average luminance of the image part is low, the distinction between the image part and the imageless part becomes difficult, so that the decision of the line as belonging to the imageless part is rendered severely by enlarging the reference value. To the contrary, when the average luminance of the image part is high, the decision of the line as belonging to the imageless part is rendered less severely by making the reference value small. With such a contrivance, erroneous detection can be mitigated even when the supplied video signal expresses a dark picture of low average luminance.

Also in the second or third embodiment, as stated in connection with the first embodiment, the line decision circuit 121 may well be a circuit which evaluates the average level of each line of the supplied video signal as illustrated in each of FIGS. 22A thru 22D by way of example, and which decides whether or not the line belongs to the imageless part, depending upon if the average level is lower than the reference value. In this case, the reference value is set in accordance with the control signal delivered from the detection control circuit 313 or the individual-region detection control circuit 413, that is, with the average luminance of the image part.

Figure 8:
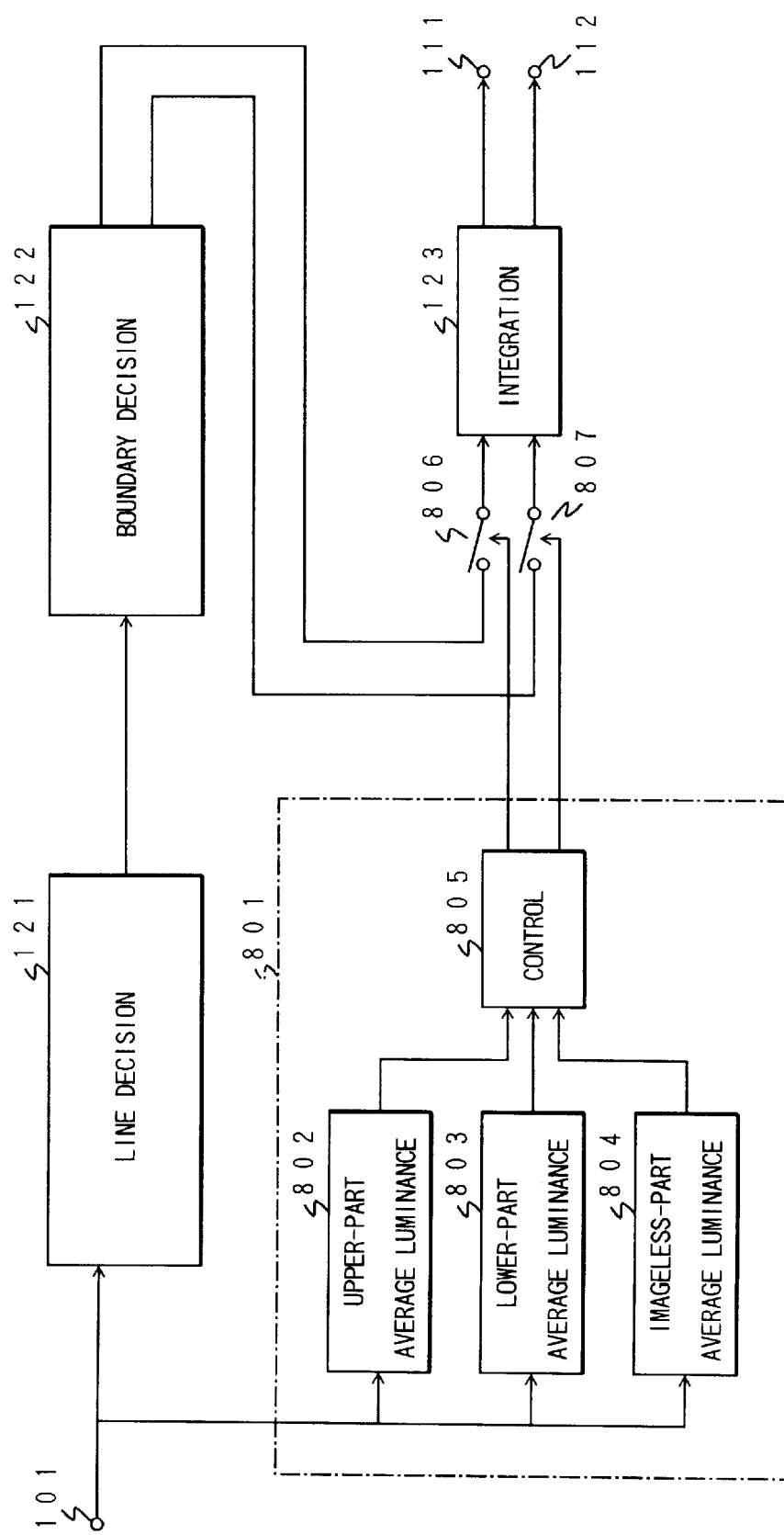
FIG. 8 is a block diagram showing a boundary position detection apparatus which is the fourth embodiment of the present invention.

Now, the fourth embodiment of the present invention will be described. FIG. 8 is a block diagram showing a boundary position detection apparatus which is the fourth embodiment of the present invention. In FIG. 8, identical reference numerals are respectively assigned to the same constituents as in FIG. 1. Besides, numeral 801 indicates an individual-region detection control circuit including an upper-part average luminance detection circuit 802 which detects the average luminance of the upside range of a picture expressed by a supplied video signal (in other words, the average luminance of the upper part of the picture), a lower-part average luminance detection circuit 803 which detects the average luminance of the downside range of the picture expressed by the supplied video signal (in other words, the average luminance of the lower part of the picture), an imageless-part average luminance detection circuit 804 which detects the average luminance of each of regions at the upper end and lower end of the picture as belong to the imageless parts of the supplied video signal and as contain no image information (in other words, the average luminance of each of both the ends of the picture), and a control circuit 805. Numerals 806 and 807 indicate switches.

Regarding circuit operations in the embodiment shown in FIG. 8, the same constituents as in FIG. 1 operate similarly, and the operations thereof shall be omitted from explanation. The individual-region detection control circuit 801 evaluates the average luminance of the upper part of the picture, that of the lower part of the picture, and that of each of both the ends of the picture expressed by the video signal supplied via the input terminal 101.

Here, the range of the upper part or lower part of the picture is exemplified in FIGS. 9A and 9B. FIG. 9A illustrates the range of the start position of the image part and that of the end position thereof. In the illustrated example, the range of the upper part of the picture (refer to FIG. 9B) extends from the line of the smallest No. in the image-part start position range, to the middle of the picture, and the range of the lower part of the picture (refer also to FIG. 9B) extends from the middle of the picture to the line of the largest No. in the image-part end position range. In addition, the ranges of both the ends of the picture consist of the upper side of the range of the upper part of the picture and the lower side of the range of the lower part thereof (refer also to FIG. 9B).

Referring back to FIG. 8, the individual-region detection control circuit 801 generates control signals for controlling the switches 806 and 807, in accordance with the average luminance of the upper part of the picture, that of the lower part of the picture, and that of each of both the ends of the picture, and it delivers the control signals to the switches 806 and 807, respectively.

In accordance with the control signal delivered from the individual-region detection control circuit 801, the switch 806 supplies the integration circuit 123 with the tentative image-part start position delivered as the output of the boundary decision circuit 122, or it is turned OFF. Concretely, in a case where the average luminance of the upper part of the picture as evaluated by the individual-region detection control circuit 801 is as low as the average luminance of each of both the ends of the picture, the switch 806 is turned OFF to prevent the tentative image-part start position from entering the integration circuit 123. To the contrary, in a case where the average luminance of the upper part of the picture as evaluated by the individual-region detection control circuit 801 is higher than the average luminance of each of both the ends of the picture, the switch 806 is turned ON to deliver the tentative image-part start position to the integration circuit 123.

Likewise, in accordance with the control signal delivered from the individual-region detection control circuit 801, the switch 807 supplies the integration circuit 123 with the tentative image-part end position delivered as the output of the boundary decision circuit 122, or it is turned OFF. Concretely, in a case where the average luminance of the lower part of the picture as evaluated by the individual-region detection control circuit 801 is as low as the average luminance of each of both the ends of the picture, the switch 807 is turned OFF to prevent the tentative image-part end position from entering the integration circuit 123. To the contrary, in a case where the average luminance of the lower part of the picture as evaluated by the individual-region detection control circuit 801 is higher than the average luminance of each of both the ends of the picture, the switch 807 is turned ON to deliver the tentative image-part end position to the integration circuit 123.

Owing to the above operation, the average luminances of the upper part the lower part and each end of the picture are detected, and the inputs of the time integration circuit 123 are turned ON or OFF in accordance with the detected values. It is therefore possible to mitigate the erroneous detection of a boundary position in the case of receiving a video signal in which the boundary position is liable to be erroneously detected. Here, the "video signal in which the boundary position is liable to be erroneously detected" points to a video signal expressing a picture which is displayed dark on only the upper side or lower side thereof.

The detailed operation of the individual-region detection control circuit 801 will now be explained with reference to FIG. 8. This individual-region detection control circuit 801 is constituted by the upper-part average luminance detection circuit 802, the lower-part average luminance detection circuit 803, the imageless-part average luminance detection circuit 804 and the control circuit 805. The upper-part average luminance detection circuit 802 evaluates the average luminance of the upper part of the picture expressed by the video signal delivered from the input terminal 101, and it delivers the evaluated average luminance of the upper part of the picture to the control circuit 805 every field. The lower-part average luminance detection circuit 803 evaluates the average luminance of the lower part of the picture expressed by the video signal delivered from the input terminal 101, and it delivers the evaluated average luminance of the lower part of the picture to the control circuit 805 every field. The imageless-part average luminance detection circuit 804 evaluates the average luminance of each of both the ends of the picture expressed by the video signal delivered from the input terminal 101, and it delivers the evaluated average luminance of each end of the picture to the control circuit 805 every field.

The control circuit 805 is supplied with the evaluated average luminances of the upper part, lower part and each end of the picture, and it generates the control signals in accordance with the respectively corresponding values, so as to deliver the generated signals to the switches 806 and 807. The control circuit 805 supplies the switch 806 with the control signal which turns ON this switch 806, on condition that the average luminance of the upper part of the picture is sufficiently high as compared with the average luminance of each end of the picture (for example, the average luminance of the upper part of the picture is 50 (IRE), whereas the average luminance of each end of the picture is 0 (IRE)). In contrast, the control circuit 805 supplies the switch 806 with the control signal which turns OFF this switch 806, on condition that the average luminance of the upper part of the picture is nearly equal to the average luminance of each end of the picture (for example, the average luminance of the upper part of the picture is 5 (IRE), whereas the average luminance of each end of the picture is 0 (IRE)). On the other hand, the control circuit 805 supplies the switch 807 with the control signal which turns ON this switch 807, on condition that the average luminance of the lower part of the picture is sufficiently high as compared with the average luminance of each end of the picture (for example, the average luminance of the lower part of the picture is 50 (IRE), whereas the average luminance of each end of the picture is 0 (IRE)). In contrast, the control circuit 805 supplies the switch 807 with the control signal which turns OFF this switch 807, on condition that the average luminance of the lower part of the picture is nearly equal to the average luminance of each end of the picture (for example, the average luminance of the lower part of the picture is 5 (IRE), whereas the average luminance of each end of the picture is 0 (IRE)).

The control circuit 805 may well include a circuit in which the average luminances, each corresponding to each end of the picture and being supplied every field, are saved for several fields. When the control signals are generated using the average luminances of each end of the picture for the several fields, the decisions are less liable to err.

Figure 10:
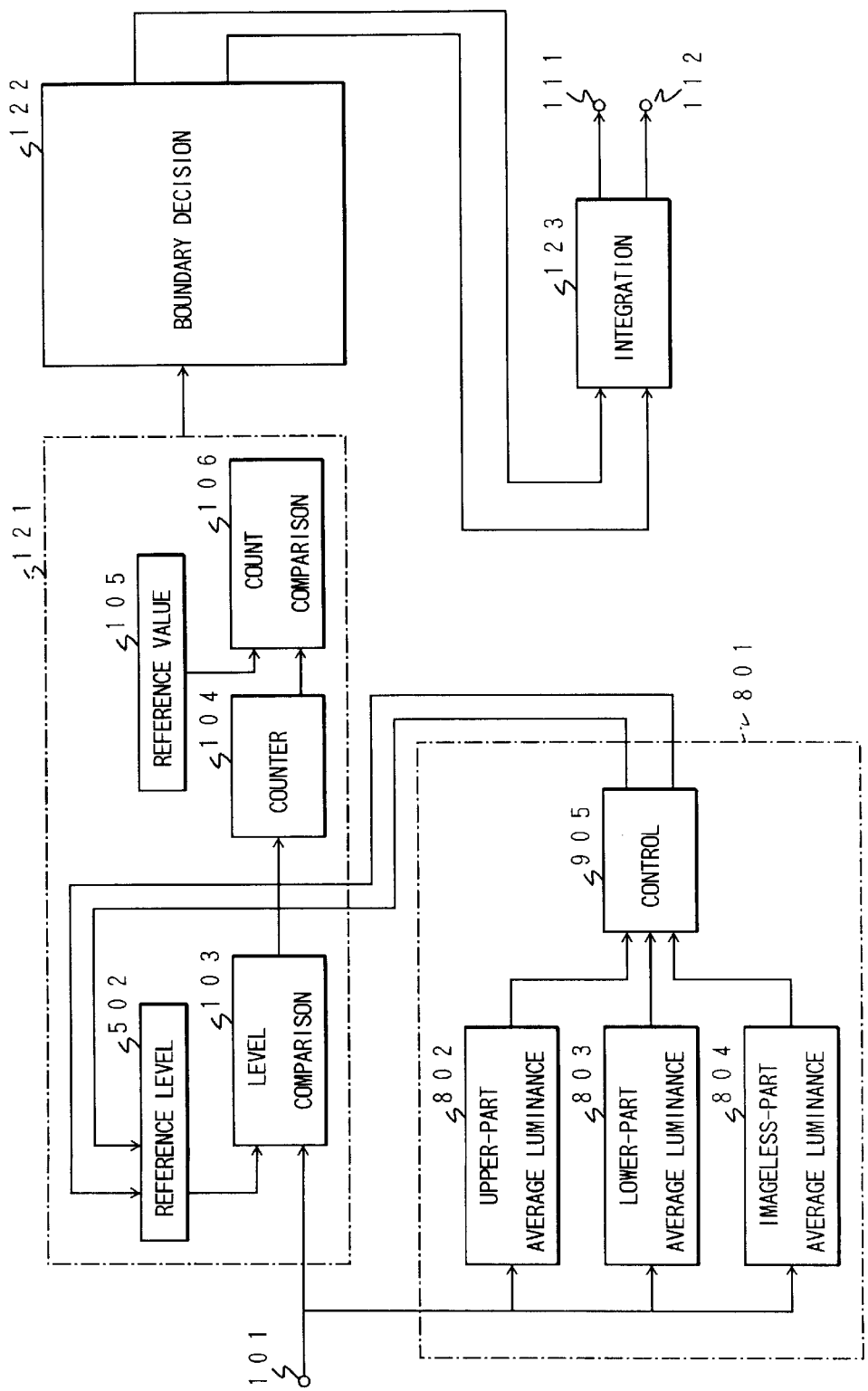
FIG. 10 is a block diagram showing a boundary position detection apparatus which is the fifth embodiment of the present invention.

Now, the fifth embodiment of the present invention will be described. FIG. 10 is a block diagram showing a boundary position detection apparatus which is the fifth embodiment of the present invention. In FIG. 10, identical reference numerals, are respectively assigned to the same constituents as in FIG. 1. Besides, numeral 502 indicates a reference level setting circuit, and numeral 905 a control circuit.

Regarding circuit operations in the embodiment shown in FIG. 10, the same constituents as in FIG. 1 or FIG. 8 operate similarly, and the operations thereof shall be omitted from explanation. The individual-region detection control circuit 801 evaluates the average luminance of the upper part of the picture, that of the lower part of the picture, and that of each of both the ends of the picture expressed by the video signal supplied via the input terminal 101. Subsequently, the individual-region detection control circuit 801 generates control signals for controlling the reference level setting circuit 502, in accordance with the average luminance of the upper part of the picture, that of the lower part of the picture, and that of each of both the ends of the picture, and it delivers the control signals to the reference level setting circuit 502.

The reference level setting circuit 502 sets a reference level for distinguishing the image part from the imageless part, in accordance with the control signal delivered from the individual-region detection control circuit 801. The reference level is set at a first value when the average luminance of the upper part or lower part of the picture is high, and at a second value when the same is low. The set reference level is delivered to the level comparison circuit 103. On this occasion, the reference level has its value determined on the basis of the average luminance of the upper part of the picture during the period of the upper half of the picture, whereas it has its value determined on the basis of the average luminance of the lower part of the picture during the period of the lower half of the picture. Besides, the reference level setting circuit 502 determines both the first and second values on the basis of the average luminance of each end of the picture as delivered from the individual-region detection control circuit 801. By way of example, in a case where the average luminance of each end of the picture is 0 (IRE), the first value is set at a value of 10 (IRE) which is higher than the average luminance of each end of the picture, and the second value is set at a value of 2 (IRE) which is lower than the first value and which is close to the average luminance of each end of the picture. Accordingly, the reference level setting circuit 502 sets and delivers the reference level of 10 (IRE) when the average luminance of the upper part or lower part of the picture is high, and it sets and delivers the reference level of 2 (IRE) when the average luminance of the upper part or lower part of the picture is low. Further, in a case where the average luminance of each end of the picture as evaluated by the individual-region detection control circuit 801 fluctuates greatly every field, the reference level setting circuit 502 does not use the average luminance of each end of the picture in order to determine the reference level, but it sets the reference level at a preset fixed value.

Owing to the above operation, the average luminances of the upper part, lower part and each end of the picture are detected, and the value to be set as the reference level is determined on the basis of the detected average luminances, so that an accuracy for detecting the image-part position can be enhanced. Moreover, in a scene in which the upper part or lower part of the picture is dark, a control is performed so as to heighten the imageless-part detection accuracy of the line decision circuit 121, and the erroneous detection of the boundary position can be mitigated.

In the circuit block arrangement disclosed as the fifth embodiment of the present invention, the reference level in the reference level setting circuit 502 is controlled using the control signals delivered from the individual-region detection control circuit 801. It is also allowed, however, to control the reference value of the reference value setting circuit 105 by the use of the control signals delivered from the individual-region detection control circuit 801.

Figure 11:
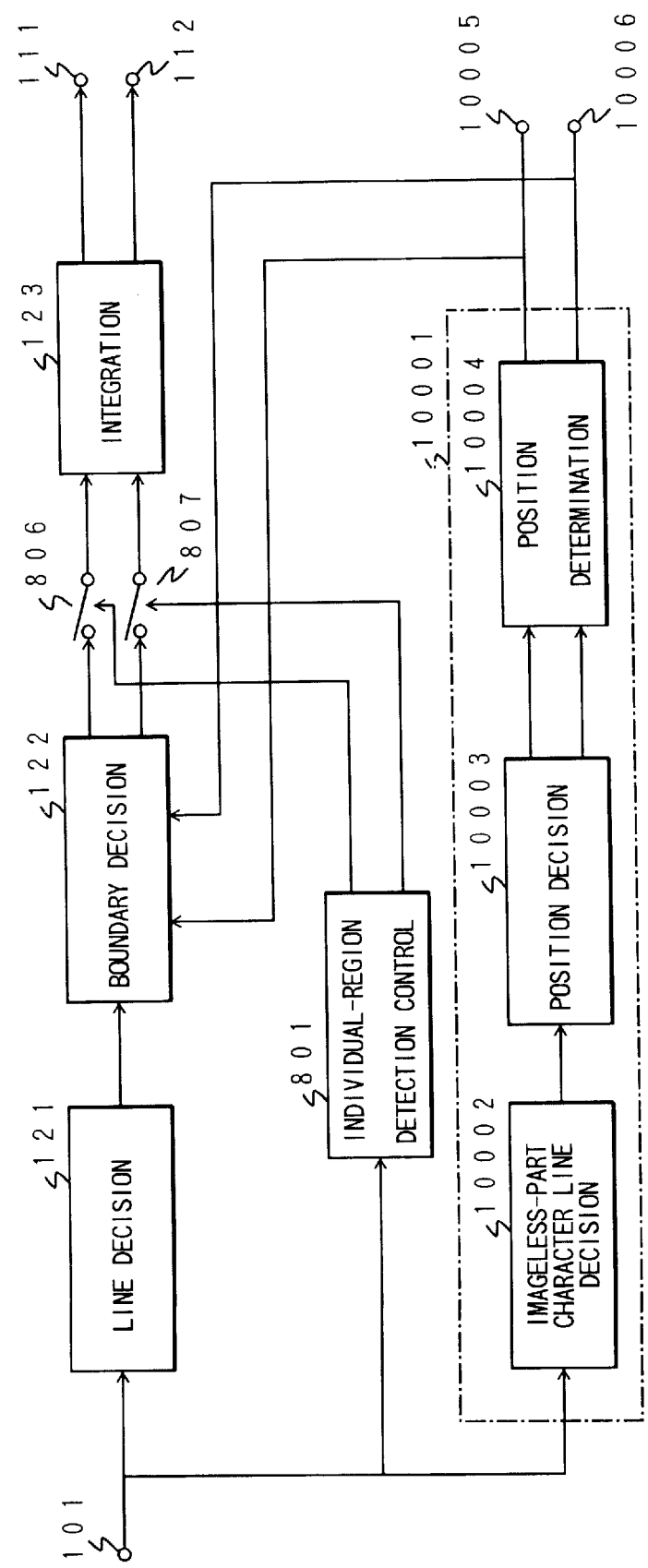
FIG. 11 is a block diagram showing a boundary position detection apparatus which is the sixth embodiment of the present invention.

Now, the sixth embodiment of the present invention will be described. FIG. 11 is a block diagram showing a boundary position detection apparatus which is the sixth embodiment of the present invention. In FIG. 11, identical reference numerals are respectively assigned to the same constituents as in FIG. 1 or FIG. 8. Besides, numeral 10001 designates a character detection circuit which includes an imageless-part character line decision circuit 10002, a position decision circuit 10003, and a position determination circuit 10004. An output terminal 10005 delivers the start position of at least one character at an imageless part, while an output terminal 10006 delivers the end position of the character at the imageless part.

Circuit operations in the embodiment shown in FIG. 11 will be explained. This embodiment consists in that the character detection circuit 10001 for detecting the positions of the character in the vertical direction of a picture (in other words, the character positions) is provided so as to prevent the image position detection circuit from erroneously detecting the character positions, by utilizing these character positions. Since the same constituents as in FIG. 1 or FIG.

8 operate similarly, the operations thereof shall be omitted from explanation. The character detection circuit 10001 detects the positions of the character in the vertical direction of the picture expressed by the video signal supplied via the input terminal 101, and it decides whether or not the detected positions are correct. It delivers the character start position to the output terminal 10005, and the character end position to the output terminal 10006. The outputs delivered from the character detection circuit 10001 are also supplied to the boundary decision circuit 122.

The boundary decision circuit 122 decides the boundary positions (image start position and image end position) in the vertical direction of the picture expressed by the video signal, on the basis of the line decision result supplied from the line decision circuit 121. It delivers the image start position to the switch 806, and the image end position to the switch 807. In a case where the decided boundary position falls within the range of the character positions supplied from the character detection circuit 10001, the boundary decision circuit 122 regards the pertinent boundary position as having detected the character position, and it does not deliver this boundary position.

As stated above, the character detection circuit 10001 is provided for detecting the positions of the character in the vertical direction (that is, the character positions), and no outputs are delivered to the switches 806 and 807 when the image positions are equal to the character positions. Thus, the character is prevented from being erroneously decided as the image part. Moreover, when the erroneous detection is mitigated, the integrating time interval of the integration circuit 123 can be shortened, and the responsibility of the boundary position detection apparatus can be improved.

Here, the detailed circuit operation of the character detection circuit 10001 will be explained with reference to FIG. 11. In this embodiment, the character detection circuit 10001 is configured of the three blocks; the imageless-part character line decision circuit 10002, position decision circuit 10003 and position determination circuit 10004. The imageless-part character line decision circuit 10002 decides if the video signal delivered from the input terminal 101 belongs to the imageless part and to the character, every line, and it delivers the decided result to the position decision circuit 10003. The position decision circuit 10003 decides the boundaries of the character and the imageless part in the vertical direction, every field on the basis of the decided results at the respective lines as delivered from the imageless-part character line decision circuit 10002, and it delivers the decided boundaries to the position determination circuit 10004 as tentative imageless-part character positions (that is, a tentative imageless-part character start position and a tentative imageless-part character end position). The position determination circuit 10004 collects statistics of the tentative imageless-part character start positions and tentative imageless-part character end positions delivered from the position decision circuit 10003, over several fields, so as to determine correct imageless-part character positions (imageless-part character start position and imageless-part character end position). The imageless-part character start position is delivered to the output terminal 10005, while the imageless-part character end position is delivered to the output terminal 10006. In a case where the imageless-part character positions are not delivered from the position decision circuit 10003 for a time period longer than several minutes, the position determination circuit 10004 judges the absence of the imageless-part character and does not deliver the imageless-part character positions.

Figure 12:
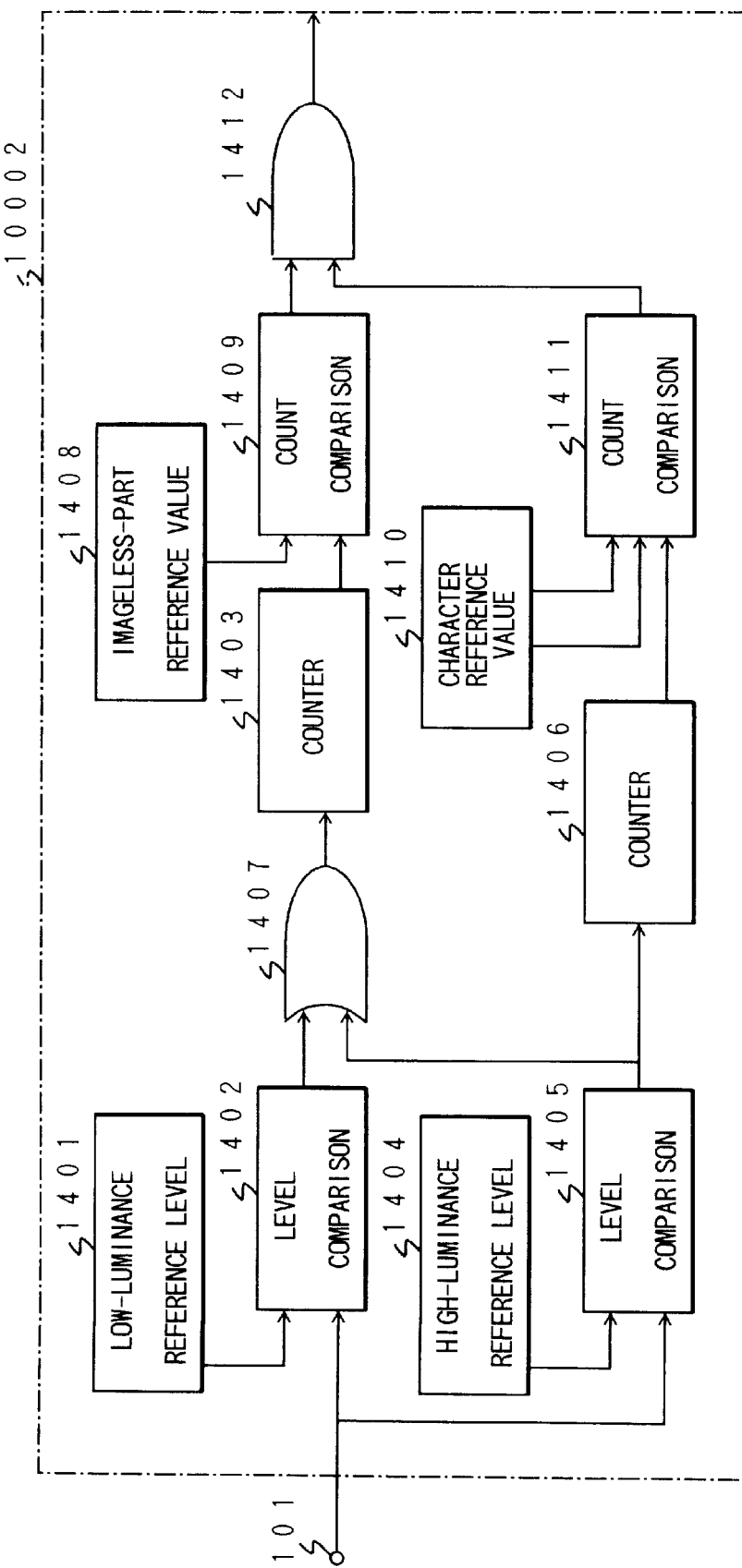
FIG. 12 is a block diagram showing a circuit arrangement for an imageless-part character line decision circuit depicted in FIG. 11.

Next, the practicable configuration and operation of the imageless-part character line decision circuit 10002 will be explained in detail with reference to FIG. 12. Here in this embodiment, the imageless-part character line decision circuit 10002 is configured of a low-luminance reference level setting circuit 1401, level comparison circuits 1402 and 1405, a high-luminance reference level setting circuit 1404, counters 1403 and 1406, an OR circuit 1407, an imageless-part reference value setting circuit 1408, count comparison circuits 1409 and 1411, an AND circuit 1412 and a character reference value setting circuit 1410.

Among these constituent circuits, the low-luminance reference level setting circuit 1401 sets a reference level for the distinction between the image part and the imageless part, at a certain fixed value, for example, 10 (IRE), and it delivers the set reference level to the level comparison circuit 1402. Likewise, the high-luminance reference level setting circuit 1404 sets a reference level for the distinction between the character and the imageless part, at a certain fixed value, for example, 80 (IRE), and it delivers the set reference level to the level comparison circuit 1405.

The level comparison circuit 1402 checks if the signal levels of the video signal successively supplied as digital data are lower than the reference level delivered from the reference level setting circuit 1401. It delivers a high ('H') level in case of the signal level lower than the reference level, or a low ('L') level in case of the signal level not lower than the reference level, every predetermined sampling period, thereby deciding whether or not the digital data belongs to the imageless part. Likewise, the level comparison circuit 1405 checks if the signal levels of the video signal successively supplied as digital data are higher than the reference level delivered from the reference level setting circuit 1404. It delivers the high ('H') level in case of the signal level higher than the reference level, or the low ('L') level in case of the signal level not higher than the reference level, every predetermined sampling period, thereby deciding whether or not the digital data belongs to the character.

The OR circuit 1407 is supplied with the comparison values from the level comparison circuits 1402 and 1405. It delivers the 'H' level when at least either of the supplied comparison values is the pulse of the 'H' level, and the 'L' level when both the supplied comparison values are the pulses of the 'L' level.

The counter 1403 counts the number of the 'H' level pulses delivered from the OR circuit 1407, every line, and it delivers the counted result every line. Incidentally, the count value of the counter 1403 is reset during the horizontal flyback period of the video signal. Likewise, the counter 1406 counts the number of the 'H' level pulses delivered from the level comparison circuit 1405, every line, and it delivers the counted result every line. Incidentally, the count value of the counter 1406 is reset during the horizontal flyback period.

The count comparison circuit 1409 makes the comparison between a reference value delivered from the imageless-part reference value setting circuit 1408 and the count value of each line delivered from the counter 1403. It delivers the 'H' level in case of the count value larger than the reference value, or the 'L' level in case of the count value smaller than the reference value, every line, thereby deciding whether or not the digital data belongs to the imageless part. Here, the reference value which is set by the imageless-part reference value setting circuit 1408 is a criterion which serves to determine whether or not the pertinent line belongs to the imageless part, in dependency on the total number of the digital data belonging to the imageless part. By way of example, the reference value is set at 90 (%) of the total count number of the digital data of each line. Likewise, the count comparison circuit 1411 compares the count value of each line delivered from the counter 1406, with two reference values delivered from the character reference value setting circuit 1410. It delivers the 'H' level in case of the count value lying within the range of the two reference values, or the 'L' level in case of the count value lying outside the range of the two reference values, every line, thereby deciding whether or not the digital data belongs to the character part. Here, the two reference values which are set by the character reference value setting circuit 1410 form a criterion which serves to determine whether or not the pertinent line belongs to the character, in dependency on if the total number of the digital data belonging to the character lies within the predetermined range. By way of example, one of the two reference values is set at 10 (%) of the total count number of the digital data of each line, and the other at 50 (%) of the total count number.

The AND circuit 1412 takes the "AND" (logical product) between the decided result of the count comparison circuit 1409 indicating if the line belongs to the imageless part and the decided result of the count comparison circuit 1411 indicating if the line belongs to the character. It delivers the 'H' level only when the pertinent line belongs both to the imageless part and to the character.

The practicable configuration and operation of the position decision circuit 10003 may be similar to those of the practicable example of the boundary decision circuit 122 shown in FIG. 1, and shall not be tediously explained.

Next, a practicable operating example of the position determination circuit 10004 will be explained with reference to FIG. 13. The upper part of FIG. 13 illustrates displayed pictures which succeed several fields, while the lower part illustrates the waveforms of the parts of characters in the displayed pictures. The displayed pictures (a) and (f) in the figure include no characters, whereas the displayed pictures (b), (c), (d) and (e) include the characters. Incidentally, several fields which arise between the displayed pictures (d) and (e) are omitted from illustration.

The characters of the imageless part have the feature that they are not displayed on a display screen at all times. They are displayed at the intervals of several seconds to several minutes in some cases ((b) thru (e) in FIG. 13), and are not displayed in the other cases ((a) and (f) in the figure). The position decision circuit 10003 delivers the detected tentative character positions to the position determination circuit 10004 in the presence of the characters, whereas it delivers no outputs in the absence of the characters. Therefore, the position determination circuit 10004 takes statistics of the character positions delivered from the position decision circuit 10003, in each period for which the characters are displayed ((b) thru (e) in FIG. 13), and it judges the character positions of the highest frequence in appearance, as the correct positions. This position determination circuit 10004 further takes statistics of the correct character positions thus obtained, and it delivers the character positions appearing in, at least, a predetermined number per unit time, finally as the imageless-part character positions. By way of example, the unit time is 5 (minutes), and the number of the character positions is, at least, 15.

It is also considered that the tentative imageless-part character positions of each field to be delivered from the position decision circuit 10003 will shift one or two lines between in an odd-numbered field and an even-numbered field. Therefore, the position determination circuit 10004 may well determine the final imageless-part character positions by ignoring the difference of one or two lines in the tentative imageless-part character positions.

The embodiment described here has the construction in which the inputs of the integration circuit 123 are turned ON or OFF, depending upon the presence or absence of the characters. It is also allowed, however, to employ a construction in which the integrating time interval of the integration circuit 123 is changed, for example, it is lengthened in the presence of the characters. Alternatively, the erroneous detection of the characters may well be avoided in such a way that the decisional criterion of the line decision circuit 121 is made severer, depending upon the presence or absence of the characters.

Now, the seventh embodiment of the present invention will be described. FIG. 14 is a block diagram showing a boundary position detection apparatus which is the seventh embodiment of the present invention. In FIG. 14, identical reference numerals are respectively assigned to the same constituents as in FIG. 1 or FIG. 11. Besides, numeral 11001 designates a character detection circuit which includes an image-part character line decision circuit 11002, a position decision circuit 11003, switches 11004 and 11005, a position determination circuit 11006, and a control circuit 11009. An output terminal 11007 delivers the start position of at least one character at an image part, while an output terminal 11008 delivers the end position of the character at the image part.

Likewise to the sixth embodiment of the present invention, the seventh embodiment consists in that the character detection circuit for detecting the positions of the character in the vertical direction of a picture (in other words, the character positions) is provided so as to prevent the image position detection circuit from erroneously detecting the character positions, by utilizing the detected character positions. Further, the character of the image part is similarly detected.

Figure 15A:
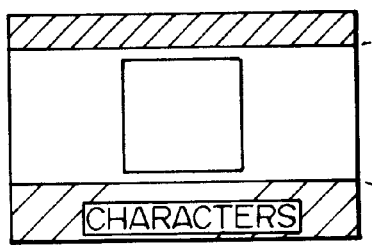
FIGS. 15A thru 15D are explanatory diagrams showing examples in each of which a picture based on a video signal conforming to an aspect ratio of 4:3 is displayed by a television receiver having a screen aspect ratio of 16:9.
Figure 15B:
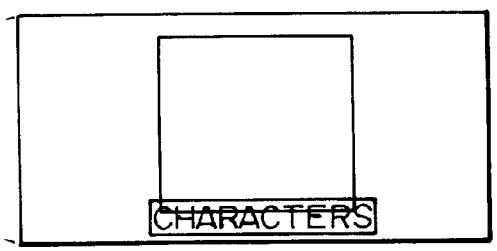
Figure 15C:
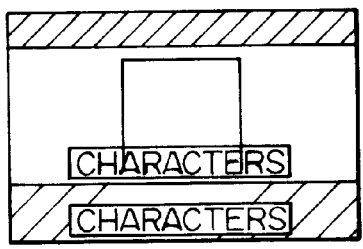
Figure 15D:
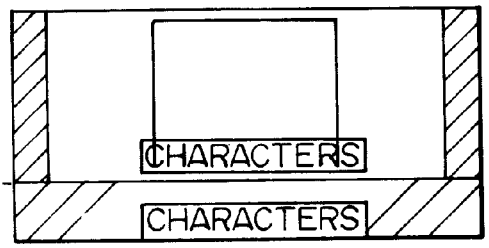

The reason why the character of the image part is detected, will be elucidated below. As stated before, FIGS. 38G and 38H illustrate the examples in each of which the video signal conforming to the screen aspect ratio of 4:3 and including the characters as shown in FIG. 38F is displayed in conformity with the screen aspect ratio of 16:9. With a signal processing system which has the subtitles moving circuit as disclosed in the prior art, the part of characters as shown in FIG. 15A can be extracted and then synthesized at the position of an image part as shown in FIG. 15B. However, in a case where characters exist at the image part as shown in FIG. 15C, the subtitles of an imageless part moved by the subtitles moving circuit are superposed on the characters of the image part, resulting in a picture which is very difficult to see. Therefore, it may be considered that the subtitles moving circuit can move only the characters of the imageless part, only in a case where no character exists at the image part. Accordingly, in the case where the characters have been found to exist also at the image part by the detection of the image-part characters, the end position of the imageless-part characters must be decided as that of the image part so as to enlarge the pertinent picture including the characters, as shown in FIG. 15D.

Regarding circuit operations in the embodiment shown in FIG. 14, the same constituents as in FIG. 1, FIG. 8 and FIG. 11 operate similarly, and the operations thereof shall be omitted from explanation.

The detailed circuit operation of the character detection circuit 11001 according to the seventh embodiment will be explained with reference to FIG. 14. The character detection circuit 11001 is configured of the imageless-part character line decision circuit 10002, position decision circuit 10003, position determination circuit 10004, image-part character line decision circuit 11002, position decision circuit 11003, position determination circuit 11006, switches 11004 and 11005, and control circuit 11009. The individual circuits etc. operate as stated below. The image-part character line decision circuit 11002 decides if the video signal delivered from the input terminal 101 belongs to the image part and to the character, every line, and it delivers the decided result to the position decision circuit 11003. The position decision circuit 11003 decides the boundaries of the character and the image part in the vertical direction, every field on the basis of the decided results at the respective lines as delivered from the image-part character line decision circuit 11002, and it delivers the decided tentative image-part character start position to the switch 11004 and the decided tentative image-part character end position to the switch 11005.

The switch 11004 supplies the position determination circuit 11006 with the tentative image-part character start position delivered from the position decision circuit 11003. The switch 11005 supplies the position determination circuit 11006 with the tentative image-part character end position delivered from the position decision circuit 11003. In addition, the switches 11004 and 11005 are turned ON or OFF in accordance with a control signal which is delivered from the control circuit 11009. When turned ON, the switches 11004 and 11005 supply the position determination circuit 11006 with the tentative image-part character start and end positions delivered from the position decision circuit 11003, respectively. When turned OFF, they produce no outputs.

The control circuit 11009 judges if the characters are currently existent, from the tentative imageless-part character start position and tentative imageless-part character end position delivered from the position decision circuit 10003, and the imageless-part character start position and imageless-part character end position delivered from the position determination circuit 10004. In the presence of the characters, the control circuit 11009 produces the control signal which turns ON both the switches 11004 and 11005, and in the absence of the characters, it produces the control signal which turns OFF both the switches 11004 and 11005.

The position determination circuit 11006 collects statistics of the tentative image-part character start positions delivered from the switch 11004 and tentative image-part character end positions delivered from the switch 11005, over several fields, so as to determine correct image-part character positions (image-part character start position and image-part character end position). The image-part character start position is delivered to the output terminal 11007, while the image-part character end position is delivered to the output terminal 11008.

The boundary decision circuit 122 determines the tentative image-part start position and tentative image-part end position from the line decision result supplied from the line decision circuit 121. However, in a case where the boundary decision circuit 122 is not supplied with the image-part character positions from the position determination circuit 11006 (that is, the image part contains no character) and where the tentative image-part boundary positions are equal to the imageless-part character positions delivered from the position determination circuit 10004, this boundary decision circuit 122 does not deliver the tentative image-part boundary positions to the switches 806 and 807. Besides, insofar as the boundary decision circuit 122 is supplied with the image-part character positions from the position determination circuit 11006, it delivers the tentative image-part start position to the switch 806 and the tentative image-part end position to the switch 807 even in a case where the tentative image-part start and end positions are equal to the imageless-part character positions delivered from the position determination circuit 10004.

As stated above, the subtitles moving facility cannot be used in the presence of the characters at the image part. Therefore, the characters of the imageless part are not omitted from the displayed picture by detecting the end position of the imageless-part characters as that of the image part and then enlarging the picture in accordance with the detected value.

Figure 16:
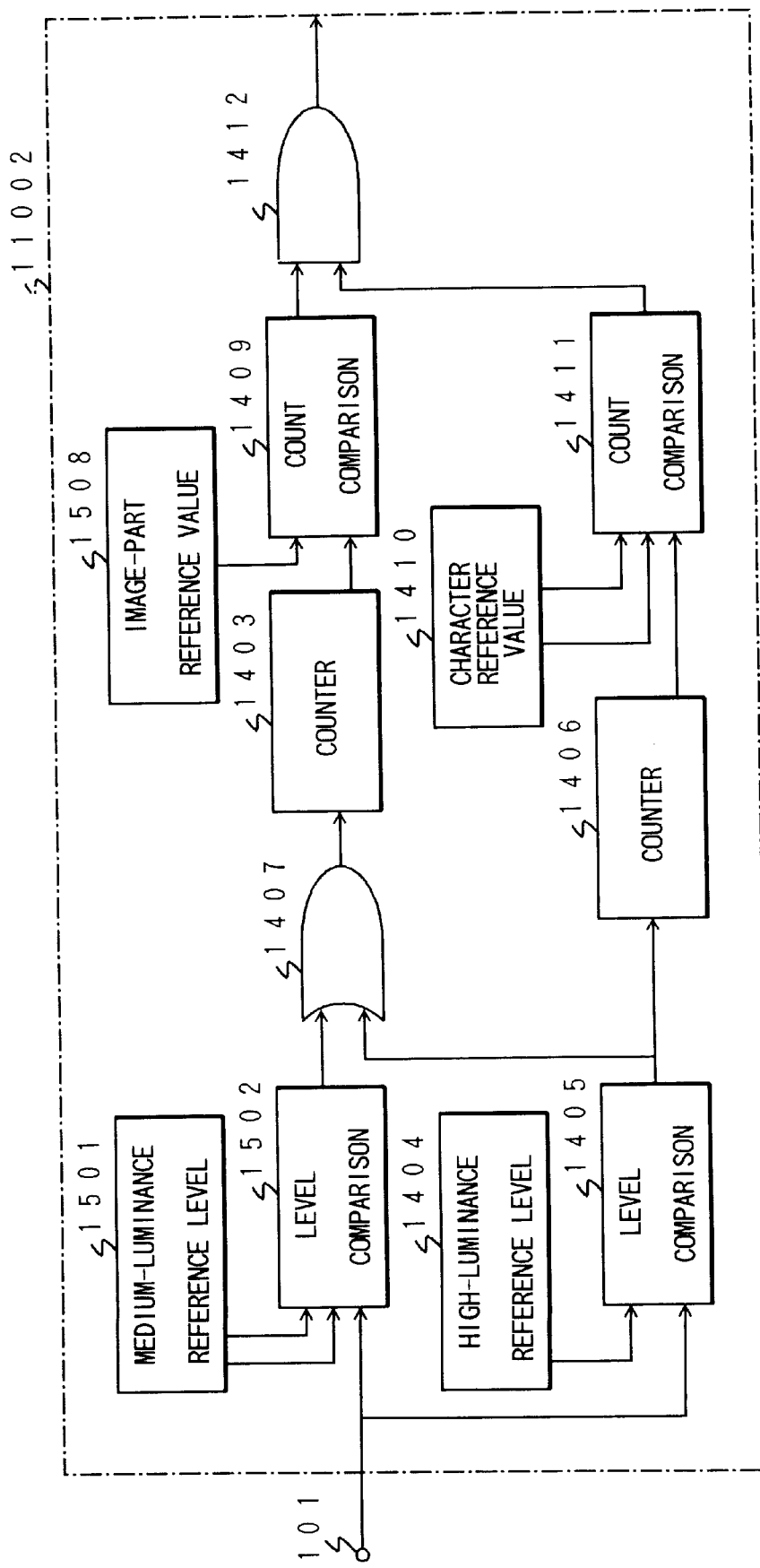
FIG. 16 is a block diagram showing a circuit arrangement for an image-part character line decision circuit depicted in FIG. 14.

Next, the practicable configuration and operation of the image-part character line decision circuit 11002 will be explained in detail with reference to FIG. 16.

Here in this embodiment, the image-part character line decision circuit 11002 is configured of a medium-luminance reference level setting circuit 1501, level comparison circuits 1502 and 1405, a high-luminance reference level setting circuit 1404, counters 1403 and 1406, an OR circuit 1407, an image-part reference value setting circuit 1508, count comparison circuits 1409 and 1411, an AND circuit 1412 and a character reference value setting circuit 1410.

Among these constituent circuits, the medium-luminance reference level setting circuit 1501 sets reference levels for the distinction between the image part and the imageless part, at certain fixed values, for example, 10 (IRE) and 80 (IRE), and it delivers the set reference levels to the level comparison circuit 1502.

The level comparison circuit 1502 checks if each of the signal levels of the video signal successively supplied as digital data lie between the two reference levels delivered from the medium-luminance reference level setting circuit 1501. It delivers a high ('H') level in case of the signal level lying between the two reference levels, or a low ('L') level in case of the signal level not lying between the two reference levels, every predetermined sampling period, thereby deciding whether or not the digital data belongs to the image part.

The OR circuit 1407 is supplied with the comparison values from the level comparison circuits 1502 and 1405. It delivers the 'H' level when at least either of the supplied comparison values is the pulse of the 'H' level, and the 'L' level when both the supplied comparison values are the pulses of the 'L' level.

The counter 1403 counts the number of the 'H' level pulses delivered from the OR circuit 1407, every line, and it delivers the counted result every line. Incidentally, the count value of the counter 1403 is reset during the horizontal flyback period of the video signal. Likewise, the counter 1406 counts the number of the 'H' level pulses delivered from the level comparison circuit 1405, every line, and it delivers the counted result every line. Incidentally, the count value of the counter 1406 is reset during the horizontal flyback period.

The count comparison circuit 1409 makes the comparison between a reference value delivered from the image-part reference value setting circuit 1508 and the count value of each line delivered from the counter 1403. It delivers the 'H' level in case of the count value larger than the reference value, or the 'L' level in case of the count value smaller than the reference value, every line, thereby deciding whether or not the digital data belongs to the image part. Here, the reference value which is set by the image-part reference value setting circuit 1508 is a criterion which serves to determine whether or not the pertinent line belongs to the image part, in dependency on the total number of the digital data belonging to the image part. By way of example, the reference value is set at 90 (%) of the total count number of the digital data of each line.

The AND circuit 1412 takes the "AND" (logical product) between the decided result of the count comparison circuit 1409 indicating if the line belongs to the image part and the decided result of the count comparison circuit 1411 indicating if the line belongs to the character. It delivers the 'H' level only when the pertinent line belongs both to the image part and to the character. In this way, the AND circuit 1412 decides if the pertinent line belongs to the image-part character, and it delivers the decided result.

Here will be explained another example in which two reference values forming a criterion for determining whether or not the pertinent line belongs to the image-part character, are set in the character reference value setting circuit 1410. By way of example, the positions of the image-part character may be determined by extracting the information items of the imageless-part character and deriving signals which have conditions close to the information items, from the region of the image part. Concretely, the outputs of the counter 1406 for the respective lines are derived during the period of the lines which have been decided to belong to the determined imageless-part character. The maximum count number and the minimum count number are obtained from among the derived outputs of the counter 1406, and the two reference values of the character reference value setting circuit 1410 are determined from the maximum and minimum count numbers. That is, each line whose total value of the high luminance signals of the imageless-part character lies within the range of the total values of the high luminance signals of the imageless-part character at the respective lines is searched for within the range of the image-part region. Thus, a detection accuracy for the image-part character is enhanced.

The practicable configuration and operation of the position decision circuit 11003 may be similar to those of the practicable example of the boundary decision circuit 122 shown in FIG. 1, and shall not be tediously explained. Also, the practicable configuration and operation of the position determination circuit 11006 may be similar to those of the practicable example of the position determination circuit 10004, and they shall not be tediously explained.

Figure 17:
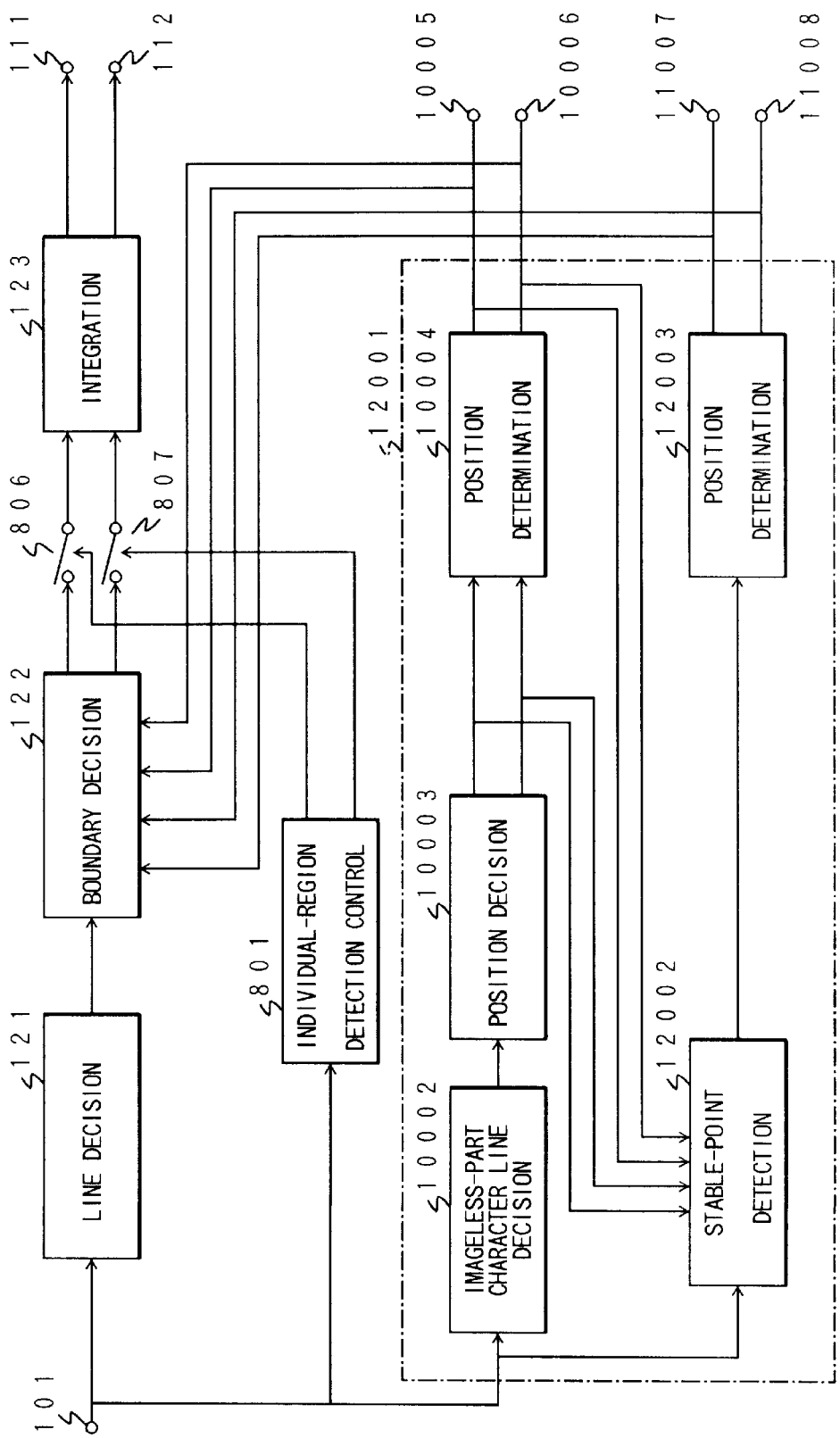
FIG. 17 is a block diagram showing a boundary position detection apparatus which is the eighth embodiment of the present invention.

Now, the eighth embodiment of the present invention will be described. FIG. 17 is a block diagram showing a boundary position detection apparatus which is the eighth embodiment of the present invention. In FIG. 17, identical reference numerals are respectively assigned to the same constituents as in FIG. 1, FIG. 8, FIG. 11 or FIG. 14. Besides, numeral 12001 designates a character detection circuit which includes a stable-point detection circuit 12002 and a position determination circuit 12003.

The circuit operation of the embodiment shown in FIG. 17 will be explained. Likewise to the sixth or seventh embodiment of the present invention, the eighth embodiment consists in that the character detection circuit for detecting the positions of the character of the imageless part in the vertical direction of a picture (in other words, the character positions) is provided so as to prevent the image position detection circuit from erroneously detecting the character positions, by utilizing the detected character positions. Further, the positions of the character of the image part are similarly detected. The image-part character positions are detected by the stable-point detection circuit 12002 and the position determination circuit 12003.

In this embodiment, the same constituents as in FIG. 1, FIG. 8, FIG. 11 or FIG. 14 operate similarly, and the operations thereof shall not be tediously explained.

In the presence of the imageless-part character positions delivered from the position determination circuit 10004, the stable-point detection circuit 12002 sets a detection region at the part of lines overlying the imageless-part characters, on the basis of the delivered imageless-part character positions. By way of example, in a case where the imageless-part character start position is line #200 and where the imageless-part character end position is line #220, the detection region is set to be a region which extends, for example, four times the height (20 lines) of the imageless-part characters (that is, a region which starts at line #120 and which ends at line #200). Subsequently, the stable-point detection circuit 12002 decides if the amplitude of each pixel remains unchanged, during that period of the video signal within the detection region for which the luminance of the video signal is a predetermined value (for example, 80 (IRE)) or above and for which the imageless-part character positions are supplied (the period for which the tentative imageless-part character positions are delivered from the position decision circuit 10003). This stable-point detection circuit 12002 supplies the position determination circuit 12003 with the signal amplitude level of the pertinent pixel in a case where the aforementioned decisional condition is satisfied, and with zero in a case where the decisional condition is not satisfied. During that period of the video signal for which the imageless-part character positions are not supplied, the stable-point detection circuit 12002 supplies the position determination circuit 12003 with the amplitude level of each pixel in a case where the luminance of the video signal within the detection region is the predetermined value (for example, 80 (IRE)) or above, and with zero in a case where the luminance is below the predetermined value.

The position determination circuit 12003 judges if the pixel belongs to the characters of the image part, from that output high-luminance pixel of the stable-point detection circuit 12002 whose amplitude level remains unchanged during the display of the imageless-part characters, and the output high-luminance pixel without the coincident display of the imageless-part characters. More specifically, in the case of the high-luminance pixel whose amplitude level remains unchanged during the display of the imageless-part characters and whose amplitude level differs from the amplitude level having been exhibited one field before the display of the imageless-part characters, the pertinent pixel is decided to belong to the characters of the image part. Even in the case of the high-luminance pixel whose amplitude level remains unchanged during the display of the imageless-part characters, when the amplitude level thereof is the same as the amplitude level having been exhibited one field before the display of the imageless-part characters, the pertinent pixel may possibly belong to image information, and hence, it is not decided to belong to the image-part characters. The position determination circuit 12003 determines or defines the region of the image-part characters from the decided pixels belonging to the image-part characters. By way of example, in a case where the distance between the adjacent pixels decided to belong to the image-part characters is smaller than the width of the imageless-part characters in the vertical directior, the pixels lying between the adjacent pixels are deemed to belong to the image-part characters, and the region of the pixels belonging to the image-part characters is expanded, until the positions of the image-part characters are finally determined from the region where the pixels belonging to the image-part characters are existent. Eventually, the position determination circuit 12003 delivers the image-part character start position to the output terminal 11007 and the image-part character end position to the output terminal 11008.

As stated before, the subtitles moving facility cannot be used in the presence of the characters at the image part. Therefore, the end position of the imageless-part characters is detected as that of the image part, and the picture is enlarged in accordance with the detected value. Thus, the characters of the imageless part are not omitted from the displayed picture. Moreover, the character positions of the image part are decided from the high-luminance pixels which develop simultaneously with the appearance of the imageless-part characters, so that the image information is not erroneously decided as the characters.

Here will be explained a processing method in which, in a television receiver having the screen aspect ratio is 16:9, a picture based on a video signal conforming to the screen aspect ratio of 4:3 is automatically enlarged using the boundary positions, image-part character positions and imageless-part character positions detected, reference being had to FIG. 18.

FIG. 18 illustrates an example of a processing algorithm for enlarging the picture. Steps 1 thru 4 in the figure indicate the conditions of branches, while steps 5 thru 9 indicate concrete processes.

In operation, the step 1 is a routine which is branched depending upon if an imageless part exists in the picture expressed by the supplied video signal. The flow of the precessing proceeds to the step 2 in the presence of the imageless part, and to the step 6 in the absence of them. By way of example, the presence or absence of the imageless part may be decided depending upon if the average luminance of each of both the ends of the picture as evaluated by the individual-region detection control circuit 801 exhibits a stable value for a long time. Alternatively, the absence of the imageless part may well be decided when the boundary positions are not delivered.

Subsequently, at the step 6, the enlargement process is not executed because of the absence of the imageless part. The step 2 is a routine which is branched depending upon if characters exist at the imageless part. The processing flow proceeds to the step 3 in the presence of the imageless-part characters, and to the step 7 in the absence of them. At the step 7, the picture is enlarged at the maximum enlargement ratio without omitting the signal levels of the image-part region in the video signal, on the basis of the detected boundary positions (image-part start position and image-part end position). Owing to this process, a picture conforming to the aspect ratio of 16:9 is displayed without any imageless part.

The step 3 is a routine which is branched depending upon if a subtitles moving facility is provided, or if the subtitles moving facility provided is forcibly turned ON or OFF. The step 3 is followed by the step 8 in a case where the subtitles moving facility is not provided or where it is forcibly turned OFF. On the other hand, the step 3 is followed by the steps 4 et seq. in a case where the subtitles moving facility is provided or where it is forcibly turned ON. Since the subtitles moving facility cannot be utilized, the step 8 enlarges and displays a range from the image-part start position to the imageless-part character end position, on the whole 16:9 screen of the television receiver so as not to omit the imageless-part characters.

The step 4 is a routine which is branched depending upon if characters exist at the image part. The processing flow proceeds to the step 5 in the presence of the image-part characters, and to the step 9 in the absence of them. The step 5 enlarges and displays the range from the image-part start position to the imageless-part character end position, on the whole 16:9 screen. The step 9 enlarges a range from the image-part start position to the image-part end position, at the maximum enlargement ratio at which the signal levels of the image part are not omitted, and it also moves the imageless-part characters and inserts them into any desired position of the image part, owing to the subtitles moving facility. Thus, the picture can be enlarged at the maximum enlargement ratio without omitting the imageless-part characters.

As thus far explained, according to the algorithm shown in FIG. 18, whatever pictures may be expressed by the supplied video signal, the pictures have their optimum display processes decided automatically and are enlarged. Accordingly, the user of a video reproduction system need not set an enlargement ratio suited to the input video signal, on each occasion, and the handling of the system becomes very convenient.

Figure 19:
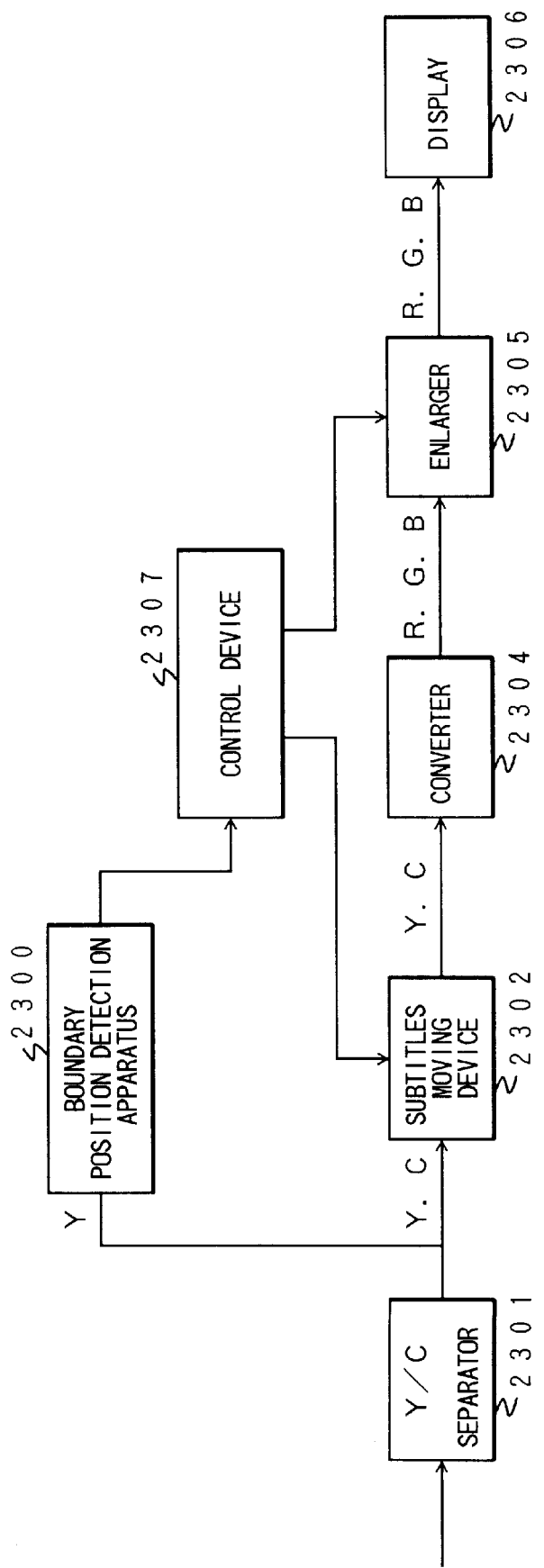
FIG. 19 is a block diagram showing the construction of a television receiver in an embodiment of the present invention.

FIG. 19 illustrates the construction of a television receiver which performs the movement of subtitles and the control of the enlargement ratio as stated above.

Referring to the figure, numeral 2300 designates a boundary position detection apparatus which is supplied with a luminance signal, and which detects the boundary between each imageless part and an image part and the positions of characters of the image part and the imageless part on the basis of the luminance signals. A Y/C separator circuit 2301 separates a supplied video signal into the luminance signal (Y signal) and a color signal (C signal). A subtitles moving device 2302 moves the subtitles of the imageless part. A converter circuit 2304 converts the luminance signal and the color signal into R, G and B signals. An enlarger circuit 2305 enlarges a picture expressed by the video signal. A display unit 2306 conforms to the aspect ratio of 16:9, and it displays the enlarged picture indicated by the R, G and B signals delivered from the enlarger circuit 2305. A control device 2307 controls the movement of the subtitles and the enlargement of the picture in such a way that the subtitles moving device 2302 and the enlarger circuit 2305 are controlled by, for example, the algorithm shown in FIG. 18, in accordance with the detected results of the boundary position detection apparatus 2300. Incidentally, the movement of the subtitles can be implemented by any of conventional techniques for moving pictures. By way of example, the subtitles moving device 2302 can be constructed of that portion for moving detected subtitles which is included in the apparatus disclosed in the official gazette of Japanese Patent Application Laid-open No. 321387/1992 mentioned before.

Figure 20:
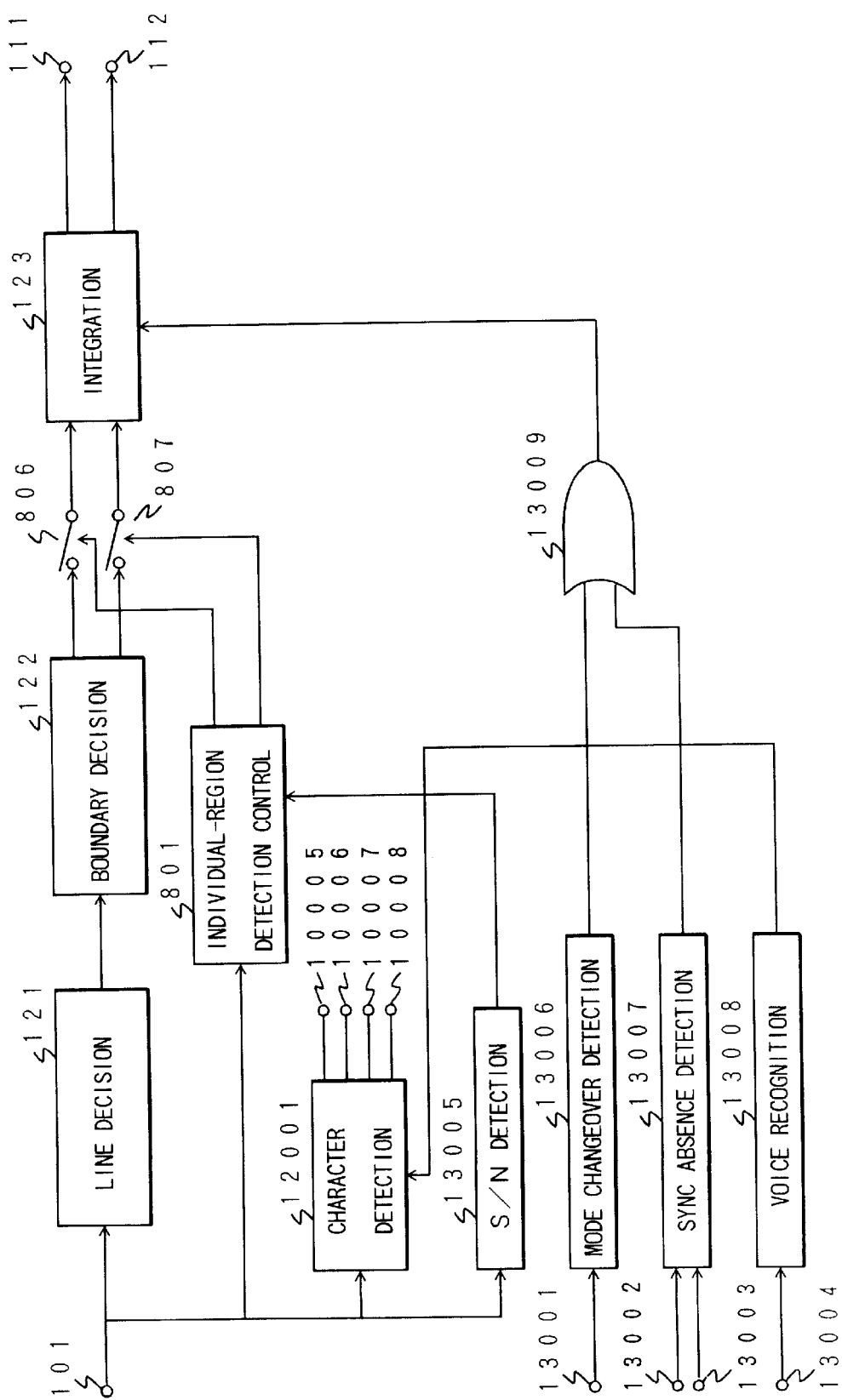
FIG. 20 is a block diagram showing a boundary position detection apparatus which is the ninth embodiment of the present invention.

Now, the ninth embodiment of the present invention will be described. FIG. 20 is a block diagram showing a boundary position detection apparatus which is the ninth embodiment of the present invention. In FIG. 20, identical reference numerals are respectively assigned to the same constituents as in FIG. 1, FIG. 8, FIG. 11, FIG. 14 or FIG. 17. Besides, numerals 13001, 13002, 13003 and 13004 indicate input terminals. Numeral 13005 indicates an S/N detection circuit, numeral 13006 a mode changeover detection circuit, numeral 13007 a sync absence detection circuit, numeral 13008 a voice recognition circuit, and numeral 13009 an OR circuit.

The circuit operation of the embodiment shown in FIG. 20 will be explained. In this embodiment, the same constituents as in FIG. 1, FIG. 8, FIG. 11, FIG. 14 or FIG. 17 operate similarly, and the operations thereof shall not be tediously explained.

The S/N detection circuit 13005 detects the S/N (signal-to-noise ratio) of the video signal supplied via the input terminal 101, and delivers the detected S/N to the individual-region detection control circuit 801.

The individual-region detection control circuit 801 evaluates the average luminance of the upper part of the picture, that of the lower part of the picture, and that of each of both the ends of the picture, and it generates the control signals for controlling the switches 806 and 807, in accordance with the average luminance values. It delivers the control signals to the switches 806 and 807, respectively. In a case where the average luminance of the upper part of the picture as evaluated by the individual-region detection control circuit 801 is as low as the average luminance of each of both the ends of the picture, the switch 806 is turned OFF to prevent the tentative image-part start position from entering the integration circuit 123. To the contrary, in a case where the average luminance of the upper part of the picture as evaluated by the individual-region detection control circuit 801 is higher than the average luminance of each of both the ends of the picture, the switch 806 is turned ON to deliver the tentative image-part start position to the integration circuit 123.

Besides, the individual-region detection control circuit 801 changes-over the output control signals in accordance with the detected S/N of the S/N detection circuit 13005. In a case where the detected S/N is inferior, the control circuit 801 turns OFF the switches 806 and 807 irrespective of the average luminances, to thereby prevent the tentative image-part positions from entering the integration circuit 123.

The mode changeover detection circuit 13006 is supplied from the input terminal 13001 with a mode signal which indicates whether the current signal delivered via the input terminal 101 is a TV signal from a tuner or an external video signal from a video input terminal. It delivers an 'H' (high) level when the mode signal has changed-over, and an 'L' (low) level when not, for several fields.

The sync absence detection circuit 13007 is supplied with the horizontal sync signal of the video signal from the input terminal. 13002 and with the vertical sync signal from the input terminal 13003, and it decides if the respective sync signals are existent. It delivers the 'L' level in the presence of the sync signals, and the 'H' level in the absence of them.

The OR circuit 13009 takes the OR (logical sum) between the mode changeover signal delivered from the mode changeover detection circuit 13006 and the sync absence decision signal delivered from the sync absence detection circuit 13007. It produces the 'H' level in a case where at least either of the mode changeover signal and the sync absence decision signal is the pulse of the 'H' level.

The integration circuit 123 temporally integrates the tentative image-part start positions delivered from the switch 806 and the tentative image-part end positions delivered from the switch 807, and it delivers the final image-part start position and image-part end position, respectively. Besides, in a case where the signal delivered from the OR circuit 13009 is the pulse of the 'L' level, the integration circuit 123 executes the ordinary time integration operation. On the other hand, in a case where the signal delivered from the OR circuit 13009 is the pulse of the 'H' level, the integration circuit 123 clears the time integration operation and integrates the tentative start and end positions from the beginning again. Thus, the detection apparatus can have its responsibility improved in the case where the mode of the supplied video signal has changed-over or where the sync signals have become nonexistent.

The voice recognition circuit 13008 is supplied with a voice signal from the input terminal 13004, and it decides if the voice signal expresses the voice of man. The decided result is supplied to the character detection circuit 12001.

In a case where the input signal delivered from the voice recognition circuit 13008 indicates that the voice signal has been decided to express the man's voice, the possibility of the appearance of characters on that occasion is high. Therefore, the character detection circuit 12001 lowers the high-luminance reference level by way of example, so as to become easy of detecting the characters. On the other hand, in a case where the input signal delivered from the voice recognition circuit 13008 indicates that the voice signal has not been decided to express the man's voice, the possibility of the appearance of characters on that occasion is low. Therefore, the character detection circuit 12001 heightens the high-luminance reference level by way of example, so as to become difficult of detecting the characters.

As stated above, the inputs of the integration circuit 123 are turned ON or OFF in accordance with the S/N, whereby this integration circuit 123 can be prevented from delivering the image-part boundary positions in the case of the interior S/N. Moreover, since the time integration circuit 123 is cleared by the changeover of the modes or the absence of the sync signals, the changes of the video signal can be quickly followed up. Furthermore, since the voice of man is decided so as to control the character detection in accordance with the decided value, the characters synchronizing with the voice can be correctly detected.

According to the foregoing embodiments, the average luminance of an image region is detected in a picture which includes imageless parts at its upper and lower parts, and the integrating time interval of time integration means, the reference level of reference level setting means, the reference value of reference value setting means, or the like is changed in accordance with the detected result of the average luminance. Thus, erroneous detection can be made less influential, and the erroneous detection itself can be reduced. Therefore, the boundary positions of the image part and the imageless parts in the vertical direction of the picture can be precisely detected in any video signal such as a video signal of low signal amplitudes expressive of a dark picture.

Now, the tenth embodiment of the present invention will be described.

Figure 21:
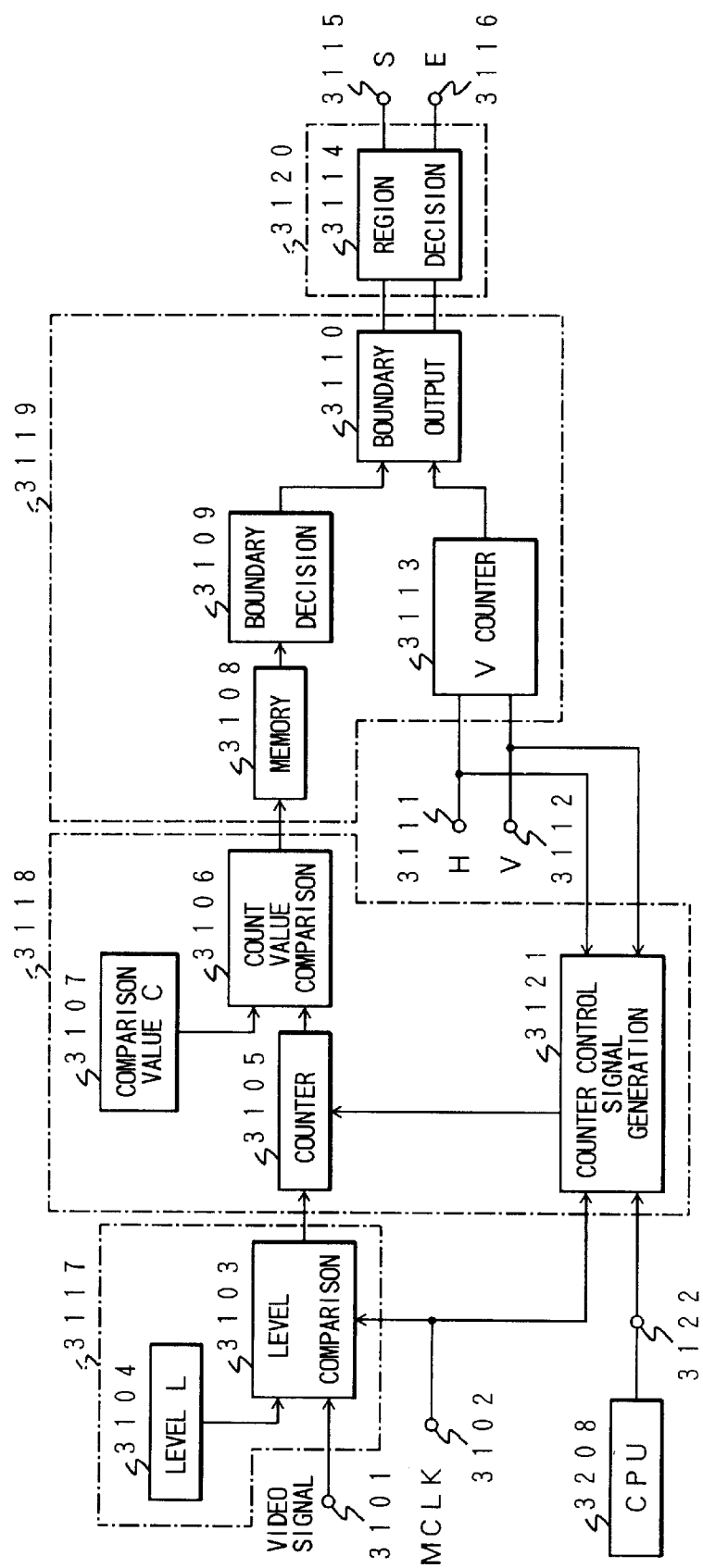
FIG. 21 is a block diagram showing a pictorial feature detection apparatus in an embodiment of the present invention.

FIG. 21 is a block diagram showing a pictorial feature detection apparatus which is the tenth embodiment. Referring to the figure, numeral 3101 designates a video signal input terminal, numeral 3102 a clock signal input terminal, numeral 3103 a level comparison circuit, numeral 3104 a comparison level setting portion, numeral 3105 a counter, numeral 3106 a count value comparison circuit, numeral 3107 a comparison value setting portion, numeral 3108 a memory portion, numeral 3109 a boundary decision circuit, numeral 3110 a boundary output circuit, numeral 3111 a horizontal sync signal input terminal, numeral 3112 a vertical sync signal input terminal, numeral 3113 a vertical sync signal counter (hereinbelow, called the "V counter"), numeral 3114 a region decision circuit, numeral 3115 a position S (start position) output terminal, numeral 3116 a position E (end position) output terminal, numeral 3117 an amplitude direction decision portion, numeral 3118 a horizontal direction decision portion, numeral 3119 a vertical direction decision portion, numeral 3120 a temporal direction decision portion, numeral 3121 a counter control signal generation circuit, numeral 3122 a control signal input terminal, and numeral 3208 a CPU (central processing unit).

In the tenth embodiment, a supplied video signal is decided as to if it is the signal of an imageless part (imageless region) containing no image information, successively in the order of the amplitude direction, horizontal direction, vertical direction and temporal direction of the video signal, and the boundary position between the imageless part and an image region containing image information is detected. For this purpose, the pictorial feature detection apparatus comprises the amplitude direction decision portion 3117, horizontal direction decision portion 3118, vertical direction decision portion 3119 and temporal direction decision portion 3120, and the CPU 3208 which is a control portion for controlling the decision portions 3117–3120.

The amplitude direction decision portion 3117 decides whether or not the supplied video signal is the signal belonging to the imageless part. Herein, when the supplied video signal has a signal level which is lower than a luminance level L of predetermined reference value, it is decided to be the signal belonging to the imageless part. On the other hand, when the supplied video signal has a signal level which is not lower than the luminance level L, it is decided to be not the signal belonging to the imageless part, that is, to be a signal belonging to the image region. The amplitude direction decision portion 3117 includes the comparison level setting portion 3104 in which the luminance level L is set and stored, and the level comparison circuit 3103 which compares the luminance level of the video signal delivered from the video signal input terminal 3101, with the luminance level L set in the comparison level setting portion 3104.

The horizontal direction decision portion 3118 decides whether or not a horizontal scanning period (horizontal scanning lines/line) belongs to the imageless part, every horizontal scanning period (every horizontal scanning line) from the number of data which have been decided to belong to the imageless part by the amplitude direction decision portion 3117. Herein, when the number of the data decided to belong to the imageless part by the amplitude direction decision portion 3117 is larger than a set value C of predetermined distribution quantity (hereinbelow, called the "comparison value C") per horizontal scanning period (per horizontal scanning line), the pertinent horizontal scanning period (horizontal scanning line) is decided to be the horizontal scanning period (horizontal scanning lines/line) belonging to the imageless part. For this purpose, the horizontal direction decision portion 3118 includes the counter 3105 by which the number of the data decided to belong to the imageless part by the amplitude direction decision portion 3117 is counted every horizontal scanning period, the comparison value setting portion 3107 in which the comparison value C is set and stored, the count value comparison circuit 3106 which compares the count value of each horizontal scanning period delivered from the counter 3105, with the comparison value C delivered from the comparison value setting portion 3107, and the counter control signal generation circuit 3121 which generates a clock signal and an operation control signal for setting the count operation period of the counter 3105.

The vertical direction decision portion 3119 decides the boundary position in the vertical direction between the horizontal scanning period (horizontal scanning line) decided to belong to the imageless part by the horizontal direction decision portion 3118 and another horizontal scanning period (horizontal scanning line), that is, a horizontal scanning period (horizontal scanning line) belonging to the image region. In other words, it decides the boundary position between the image region and the imageless part in the vertical direction. For this purpose, the vertical direction decision portion 3119 includes the memory portion 3108 in which a compared result being the output of the count value comparison circuit 3106 is stored, the boundary decision circuit 3109 which decides the boundary position between the image region and the imageless part, the V counter 3113 by which the number of pulses of a horizontal sync signal H delivered from the horizontal sync signal input terminal 3111 is counted with a starting point at a vertical sync signal V delivered from the vertical sync signal input terminal 3112, and the boundary output circuit 3110 which delivers the boundary position on the basis of the decided result of the boundary decision circuit 3109 and the output of the V counter 3113.

It is also considered that the boundary position between the image region and the imageless part as based on the respective decisions of the amplitude direction decision portion 3117, horizontal direction decision portion 3118 and vertical direction decision portion 3119 will be erroneously detected due to noise or the small difference between the luminances of the image region and the imageless part. Therefore, the temporal direction decision portion 3120 forms the final judgement in such a way that the boundary positions of the image region and the imageless part as obtained by the respective decisions of the amplitude direction decision portion 3117, horizontal direction decision portion 3118 and vertical direction decision portion 3119 are integrated in the temporal direction (field direction). For this purpose, the temporal direction decision portion 3120 includes the region decision circuit 3114 which renders a decision by integrating the boundary decision results in the temporal direction.

Incidentally, the temporal direction decision portion 3120 can be omitted in such a case where a detected result of high accuracy can be expected of the boundary position between the image region and the imageless part as obtained by the respective decisions of the amplitude direction decision portion 3117, horizontal direction decision portion 3118 and vertical direction decision portion 3119, or where the detection of very high accuracy is not required.

Next, the operation of the pictorial feature detection apparatus will be explained in detail with reference to FIG. 21.

In the amplitude direction decision portion 3117, the level comparison circuit 3103 compares the signal level of the video signal delivered from the video signal input terminal 3101, with the level L delivered from the comparison level setting portion 3104, when the state of a clock signal MCLK delivered from the clock input terminal 3102 has changed. On condition that the signal level of the delivered video signal is lower than the level L, the level comparison circuit 3103 judges the delivered video signal as belonging to the imageless part and produces a 'high' level. To the contrary, on condition that the signal level of the delivered video signal is higher than the level L, the circuit 3103 judges the delivered video signal as belonging to the image region and produces a 'low' level. Although the level L to be delivered from the comparison level setting portion 3104 may well have a fixed value, it can also have a variable value. In this case, the value of the level L may well be set by the CPU 3208. Incidentally, the comparison level setting portion 3104 can be implemented by a microcomputer. The clock signal MCLK is previously stipulated as a clock signal at a frequency which is sufficiently higher than that of the horizontal sync signal H.

In the horizontal direction decision portion 3118, the counter 3105 is operated on the basis of the clock signal and operation control signal which are supplied from the counter control signal generation circuit 3121. It counts the number of the data decided to belong to the imageless part by the level comparison circuit 3103, and it delivers the count value per horizontal scanning period, to the count value comparison circuit 3106 every horizontal scanning period. As the count value per horizontal scanning period is higher, the pertinent horizontal scanning period (horizontal scanning line) has a higher possibility of belonging to the imageless part. The counter control signal generation circuit 3121 delivers the clock signal MCLK as the clock signal of the counter 3105, and resets the counter 3105 every horizontal scanning period as the function of the operation control signal.

When the count value of each horizontal scanning period delivered from the counter 3105 is larger than the comparison value C delivered from the comparison value setting portion 3107, the count value comparison circuit 3106 decides the pertinent horizontal scanning period (horizontal scanning line) to belong to the imageless part and produces the high level, and when not, the comparison circuit 3106 decides the pertinent horizontal scanning period to belong to the image region and produces the low level. Although the comparison value C being a criterion on this occasion may well have a fixed value, it can also have a variable value. In this case, the value of the level C may well be set by the CPU 3208. Incidentally, the comparison value setting portion 3107 can be implemented by a microcomputer.

Here, the counter control signal generation circuit 3121 performs the control so that the counter 3105 may supply the count value comparison circuit 3106 with the count value of each horizontal scanning period every horizontal scanning period. The present invention, however, is not restricted to the above control. By way of example, the counter control signal generation circuit 3121 may well reset the counter 3105 every several horizontal scanning periods (every two horizontal scanning periods, every three horizontal scanning periods, or every more horizontal scanning periods), thereby causing the counter 3105 to deliver the count value of the several horizontal scanning periods. In this case, the count value comparison circuit 3106 decides the several horizontal scanning periods collectively, as to if they belong to the imageless part. Alternatively, the counter control signal generation circuit 3121 may well operate the counter 3105 at the intervals of several horizontal scanning periods (two horizontal scanning periods, three horizontal scanning periods, or more horizontal scanning periods), thereby causing the counter 3105 to deliver the count value of each horizontal scanning period to the count value comparison circuit 3106 at the intervals of the several horizontal scanning periods.

Next, in the vertical direction decision portion 3119, the memory portion 3108 stores therein the compared results being the outputs of the count value comparison circuit 3106, as the data for a certain time period, e.g., for several horizontal scanning periods. Incidentally, the memory portion 3108 can be implemented by a shift register, a RAM (random access memory), a microcomputer or the like.

The boundary decision circuit 3109 decides the boundary position between the image region and the imageless part on the basis of the data stored in the memory portion 3108.

Figure 22A:
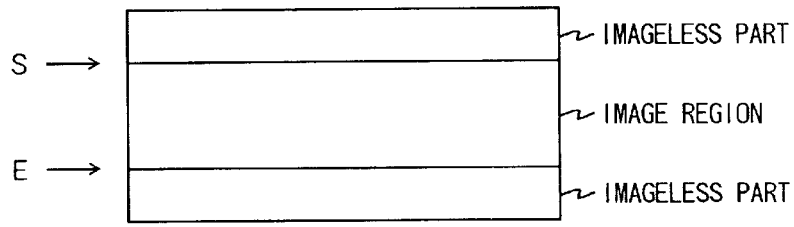
FIGS. 22A thru 22D are explanatory diagrams showing examples of the boundary position between an image region and an imageless part, in the cases of displaying pictures on a screen.
Figure 22B:
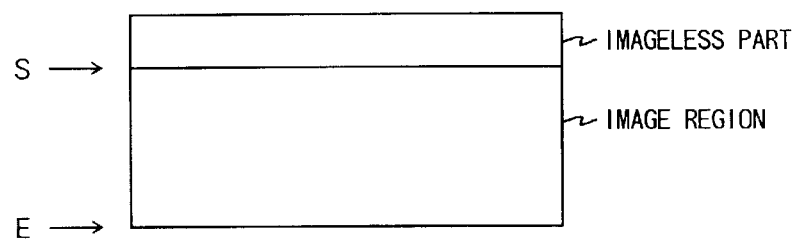
Figure 22C:
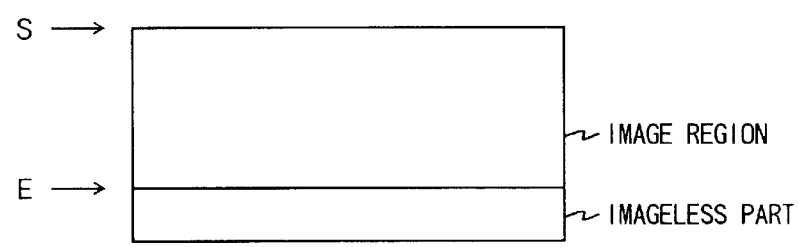
Figure 22D:
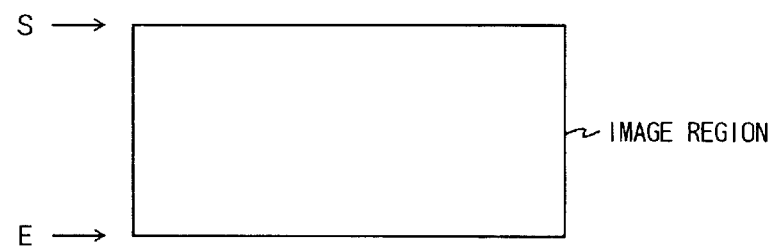

Before the elucidation of the decision of the boundary position between the image region and the imageless part, examples of the boundary positions in the case of displaying pictures on a screen will be explained with reference to FIGS. 22A thru 22D. FIG. 22A illustrates the picture in which the imageless parts exist over and under the image region, FIG. 22B the picture in which the imageless part exists only on the upper side of the image region, FIG. 22C the picture in which the imageless part exists only on the lower side of the image region, and FIG. 22D the picture in which only the image region exists without the imageless part. In each of these figures, a position S and a position E are the boundary positions between the image region and the imageless part. The position S is a horizontal scanning line position at which the image region starts, while the position E is a horizontal scanning line position at which the image region ends. By the way, in a case where the positions S and E are respectively denoted in terms of the values of horizontal scanning line Nos., they may well be respectively expressed by values which indicate the nonexistence of the imageless part within a picture, as regards the picture in which only the image region exists without the imageless part as shown in FIG. 22D.

Accordingly, the boundary decision circuit 3109 decides the respective positions S and E as the boundary positions between the image region and the imageless part on the basis of the data stored in the memory portion 3108.

There will now be explained a practicable example of a method of deciding the boundary position between the image region and the imageless part in the boundary decision circuit 3109.

The data items each corresponding to one horizontal scanning period (one horizontal scanning line) are stored in the memory portion 3108. More specifically, the data of the high level is stored for the horizontal scanning period which has been decided to belong to the imageless part by the count value comparison circuit 3106, whereas the data of the low level is stored for the horizontal scanning period which has been decided to belong to the image region. The boundary decision circuit 3109 accepts such stored data corresponding to, for example, every ten horizontal scanning lines, from the memory portion 3108, successively from the upper end of the picture toward the lower end thereof. Herein, upon the occurrence of a case where, among the successively accepted data for the ten horizontal scanning lines, the data for eight horizontal scanning lines have the low level, the position of that one of the ten horizontal scanning lines which corresponds to the low level data firstly is decided to be the position S of the upper end of the image region. Likewise, upon the occurrence of a case where, among the successively accepted data for the ten horizontal scanning lines, the data for eight horizontal scanning lines have the high level, the position of that one of the ten horizontal scanning lines which corresponds to the high level data firstly is decided to be the position E of the lower end of the image region.

Although the majority decision based on the eight horizontal scanning lines among the ten horizontal scanning lines has been exemplified here, the number of the data to be accepted into the boundary decision circuit 3109 and the set values of the majority decision can be changed at will.

Apart from the majority rule explained above, the boundary decision circuit 3109 may well decide the boundary position of the image region and the imageless part from the consecutiveness of the data of the several horizontal scanning lines stored in the memory portion 3108. As a practicable example, let's consider a situation where the content of certain data has changed in the case of viewing the data stored in the memory portion 3108, successively from the upper end of the picture to the lower end thereof. On condition that the data for five consecutive horizontal scanning lines as reckoned from the certain data having undergone the change of the content exhibit no change of contents, the position of the horizontal scanning line corresponding to the certain data is decided to be the boundary position between the image region and the imageless part.

Although the consecutiveness of the data for the five horizontal scanning lines has been exemplified here, the number of the horizontal scanning lines to be set for the consecutive data contents can be changed at will.

Incidentally, the boundary decision circuit 3109 and the region decision circuit 3114 can be respectively implemented by, for example, microcomputers.

Next, the V counter 3113 counts the number of the pulses of the horizontal sync signal H delivered from the horizontal sync signal input terminal 3111, with the starting point at the vertical sync signal V delivered from the vertical sync signal input terminal 3112, and it delivers the count value.

The boundary output circuit 3110 is supplied with the decided result of the boundary decision circuit 3109 and the output of the V counter 3113. Then, it supplies the region decision circuit 3114 with the Nos. of the horizontal scanning lines corresponding respectively to the position S and position E shown in any of FIGS. 22A–22D, the Nos. being reckoned from the vertical sync signal V.

Next, in the temporal direction decision portion 3120, the region decision circuit 3114 integrates the decided results delivered from the boundary output circuit 3110, in the temporal direction. Thus, it decides the boundary positions again by checking the stability of and frequence in the boundary positions, the correctness of the boundary positions, etc. In this way, it is permitted to avoid erroneous detection which is ascribable to noise or to the small difference between the luminances of the image region and imageless part of the input video signal.

The position S and position E which have been judged as the boundaries between the image region and the imageless parts by the region decision circuit 3114, are respectively delivered to the position S output terminal 3115 and position E output terminal 3116.

Although, in FIG. 21, signals indicative of the positions S and E to be delivered from each of the boundary output circuit 3110 and region decision circuit 3114 are illustrated so as to be sent in parallel, the two output signals may well be serial outputs.

Owing to such processing, the boundary between the image region and the imageless part can be decided.

Figure 23:
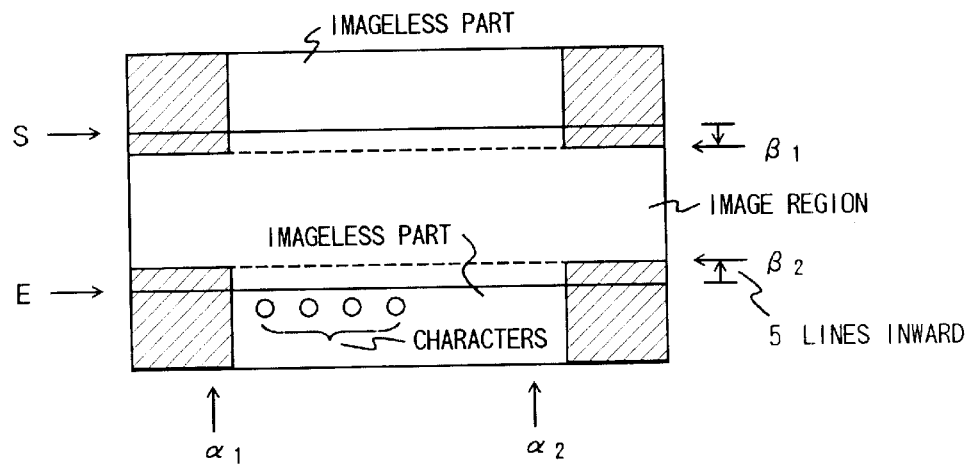
FIG. 23 is an explanatory diagram showing a case where a picture containing subtitles in an imageless part is displayed on a screen.

Meanwhile, in a case where the imageless part includes subtitles as shown in FIG. 23, signals of high signal level (high luminance level) exist at the character part of the subtitles. Therefore, the character part is not decided to belong to the imageless part by the level comparison circuit 3117 and forms an obstacle to the decision of the imageless part. In this regard, there will be explained the operation of the counter 3105 and the control of the counter control signal generation circuit 3121 in the horizontal direction decision portion 3118 as are effective in the presence of the subtitles within the imageless part.

By way of example, in the case where the subtitles exist at the imageless part, the counter 3105 is operated only at parts hatched in FIG. 23, and it is not operated at the other part. More specifically, the counter 3105 is operated in a range from the upper end of the picture to the position β1 thereof and a range from the position β2 of the picture to the lower end thereof, and for those of horizontal scanning periods which correspond to a domain from the left end of the picture to the position α1 thereof and a domain from the position α2 of the picture to the right end thereof. Accordingly, the counter 3105 counts the number of the data decided to belong to the imageless part by the level comparison circuit 3103, in the specified range during the specified domain of each horizontal scanning period, every horizontal period, and it delivers the count value to the count value comparison circuit 3106.

Figure 24:
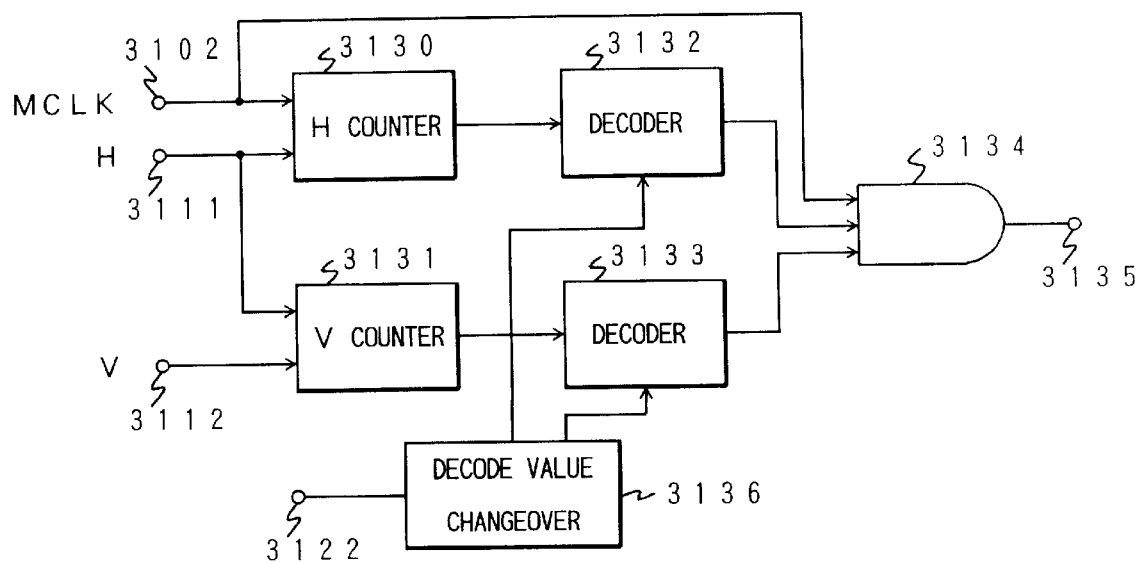
FIG. 24 is a block diagram of a counter control signal generator circuit (3121) which is included in the embodiment depicted in FIG. 21.

A block diagram of the counter control signal generation circuit 3121 in this case is illustrated in FIG. 24. Referring to the figure, the counter control signal generation circuit 3121 includes a counter ("H counter") 3130 which counts the number of the pulses of the clock signal MCLK per horizontal scanning period, a counter ("IV counter") 3131 which counts the number of the pulses of the horizontal sync signal H, with the starting point at the vertical sync signal V delivered from the vertical sync signal input terminal 3112, decoders 3132 and 3133 which decode the count values of the respective counters 3130 and 3131, an AND circuit 3134, a counter control signal output terminal 3135 from which the control signal is delivered to the counter 3105, and a decode value changeover circuit 3136 by which values to be set in the decoders 3132 and 3133 are changed-over. The decode value changeover circuit 3136 sets the values corresponding to the positions α1 and α2 shown in FIG. 23, in the decoder 3132, and it sets the values corresponding to the positions β1 and β2, in the decoder 3133.

As shown in FIG. 23 by way of example, the decode value changeover circuit 3136 sets the positions β1 and β2 several lines inward of the picture with respect to the boundary positions S and E detected in the last field. Assuming the several lines to be five lines, the position β1 can have a value obtained by adding the five lines to the horizontal scanning line position at which the image region starts, while the position β2 can have a value obtained by subtracting the five lines from the horizontal scanning line position at which the image region ends. Besides, in a case where no boundary position was detected in the last field, the boundary position detection can be performed after each of the positions β1 and β2 applied in the detection of the last field is shifted inward of the picture one line (or several lines). Accordingly, before the boundary positions are detected, the decisional values to be set shift inward one line every field. When the boundary positions have been detected, the values which are inward the five lines with respect to the detected boundary positions as stated above can be utilized as the set values. In this way, the positions β1 and β2 can be set depending upon the boundary positions detected in the last field. Besides, the positions α1 and α2 may be set beforehand. Alternatively, in case of further detecting the boundary positions in the vertical direction of the picture, the positions α1 and α2 may well have their values altered in succession similarly to the positions β1 and β2.

Referring to FIG. 24, the V counter 3131 counts the number of the pulses of the horizontal sync signal H delivered from the horizontal sync signal input terminal 3111, with the starting point at the vertical sync signal V delivered from the vertical sync signal input terminal 3112. The decoder 3133 decodes the count value of the counter 3131, and it produces the high level for the count values from 0 (zero) to a value correspondent to the position β1 and for the count values from a value correspondent to the position β2 to the maximum value.

On the other hand, the H counter 3130 counts the number of the pulses of the clock signal MCLK delivered from the clock signal input terminal 3102, with the starting point at the horizontal sync signal V delivered from the horizontal sync signal input terminal 3111. The decoder 3132 decodes the count value of the counter 3130, and it produces the high level for the count values from 0 (zero) to a value correspondent to the position α1 and for the count values from a value correspondent to the position α2 to the maximum value.

The AND circuit 3134 is supplied with the output signals of the decoders 3132 and 3133. On condition that both the two supplied signals are at the high level, the clock signal MCLK entered from the clock signal input terminal 3102 is delivered to the counter control signal output terminal 3135.

In addition, the control signal input terminal 3122 is supplied with an output signal from the CPU 3208. The CPU 3208 sets the time period for the boundary position detection, in other words, the operating period of the counter 3105 on the basis of, for example, the picture information of the last field obtained from the boundary position detection circuit. This CPU 3208 delivers the control signal to the control signal input terminal 3122.

The decode value changeover circuit 3136 sets the decode values of the respective decoders 3132 and 3133 in accordance with the signal delivered from the control signal input terminal 3122.

In this way, the counter control signal generation circuit 3121 controls the counter 3105, whereby in the presence of the subtitles within the imageless part, the counter 3105 can be operated at only the parts hatched in FIG. 23. Since, with this contrivance, the data of the character part of the subtitles are not counted by the counter 3105, the presence of the subtitles within the imageless part as forms the obstacle to the decision of the imageless part can be coped with on occasion, and the imageless part can be detected at high accuracy. By the way, in this case, the comparison value C is preset to be smaller than the maximum count value of the counter 3105 because it is compared with each of the count values of the hatched parts.

Meanwhile, the comparison value setting portion 3107 in the horizontal direction decision portion 3118 may well be constructed as stated below.

Figure 25:
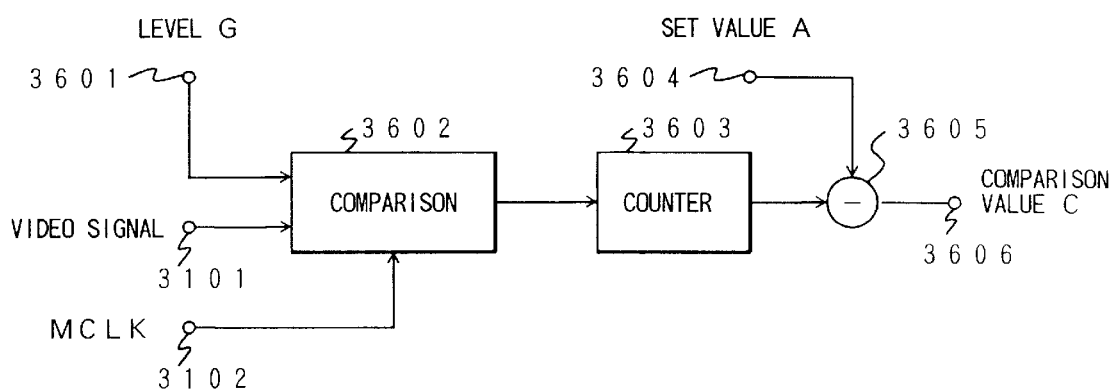
FIG. 25 is a block diagram showing a practicable example of comparison value setting means (3107) which is included in the embodiment depicted in FIG. 21.

FIG. 25 is a block diagram showing a practicable example of the comparison value setting portion 3107 depicted in FIG. 21. In the case explained before, the fixed value is delivered as the comparison value C from the comparison value setting portion 3107. On the other hand, with the circuit arrangement of the example shown in FIG. 25, a "set value A" having been set beforehand is directly delivered as the comparison value C in the absence of the subtitles within the imageless part, and a value obtained by subtracting the data of the character part from the "set value A" is delivered as the comparison value C in the presence of the subtitles within the imageless part. Herein, the "set value A" is set at a magnitude which is obtained by multiplying the number of all the data of one horizontal scanning period by a certain proportion. Further, a "set value G" is afforded in order to decide whether or not the subtitles exist at the imageless part, depending upon the luminance level of the video signal. The subtitles are decided to exist, on condition that the luminance level is higher than the "set value G".

Next, the practicable construction and operation of the circuit arrangement shown in FIG. 25 will be explained.

Referring to FIG. 25, numeral 3601 designates a level G input terminal, numeral 3602 a comparison circuit, numeral 3603 a counter, numeral 3604 a set value A input terminal, numeral 3605 a subtracter, and numeral 3606 a comparison value output terminal. The same numerals as in FIG. 21 indicate the identical terminals, respectively.

The comparison circuit 3602 compares the signal level of the video signal delivered from the video signal input terminal 3101, with the level G delivered from the level G input terminal 3601, when the state of the clock signal MCLK delivered from the clock input terminal 3102 has changed. When the signal level of the delivered video signal is higher than the level G, the comparison circuit 3602 judges the presence of the subtitles and produces the high level, and when not, the circuit 3602 produces the low level.

The level G to be delivered from the level G input terminal 3601 may be set at a level often containing the data of the character part, for example, at a level on the order of 90 (IRE) ("IRE" is the unit of the luminance level).

The counter 3603 counts the number of the high level pulses of the output signal of the comparison circuit 3602, and delivers the count value of one horizontal scanning period every horizontal scanning period. In a case where the supplied video signal corresponds to the horizontal scanning period belonging to the imageless part, the count value indicates the number of the data of the character part during one horizontal scanning period.

The subtracter 3605 subtracts the count value being the output of the counter 3603, from the set value A delivered from the set value input terminal 3604, and it delivers the resulting value to the comparison value output terminal 3606 as the comparison value C. Thus, when the subtitles are contained, the value with the number of the data of the character part subtracted from the set value A is set as the comparison value C, with which the count value of the counter 3105 is compared.

The magnitude of the comparison value C is set in this way, whereby even the presence of the subtitles within the imageless part as forms the obstacle to the decision of the imageless part can be coped with, and the imageless part can be detected at high accuracy.

Besides, in detecting the imageless part which contains the subtitles, a method in which the position of the subtitles is detected simultaneously with the detection of the imageless part may be employed lest the region of the subtitles lying at the imageless part should be erroneously detected as the image region. In this case, a subtitles detection circuit for detecting the subtitles can be further provided.

The region decision circuit 3114 renders the decision on the boundary position between the imageless part and the image region as delivered from the boundary output circuit 3110. Herein, the subtitles position detected by the subtitles detection circuit is added as one of the conditions of the decision, whereby the erroneous detection of the boundary position between the image region and the imageless part as attributed to the subtitles can be avoided.

Now, the eleventh embodiment of the present invention will be described as an embodiment in the case where the subtitles detection circuit is further provided and where the subtitles position detected by this circuit is added as one of the conditions of the region decision in the region decision circuit.

Figure 26:
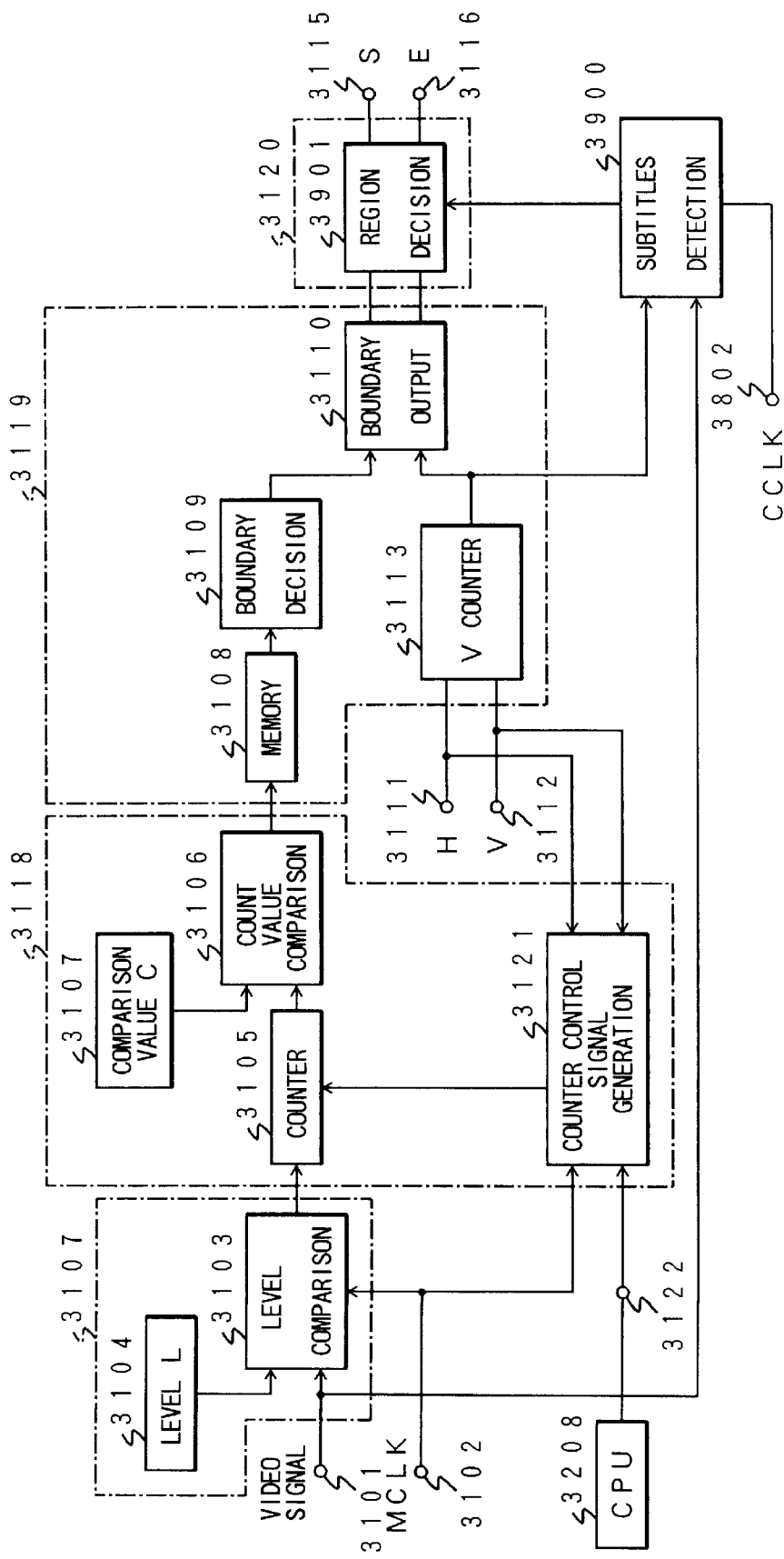
FIG. 26 is a block diagram showing a pictorial feature detection apparatus in another embodiment of the present invention.

FIG. 26 is a block diagram showing the eleventh embodiment of an imageless-part detection apparatus. The same numerals as in FIG. 21 indicate the identical constituents, respectively. In FIG. 26, numeral 3900 indicates the subtitles detection circuit, and numeral 3901 the region decision circuit.

Referring to FIG. 26, the region decision circuit 3901 is supplied with the output signals from the boundary output circuit 3110 and the subtitles detection circuit 3900, and it integrates the boundary positions between the image region and the imageless parts as delivered from the boundary output circuit 3110, in the temporal direction (field direction). Thus, it decides the boundary positions again by checking the stability of and frequence in the boundary positions, the correctness of the boundary positions, etc. every field. Besides, in this embodiment, as one of the checks for the correctness of the boundary positions, the boundary positions between the image region and the imageless parts as delivered from the boundary output circuit 3110 are compared with the subtitles position being the detection result of the subtitles detection circuit 3900, thereby deciding if the boundary positions between the image region and the imageless parts are not erroneously detected due to the presence of the subtitles.

Figure 27:
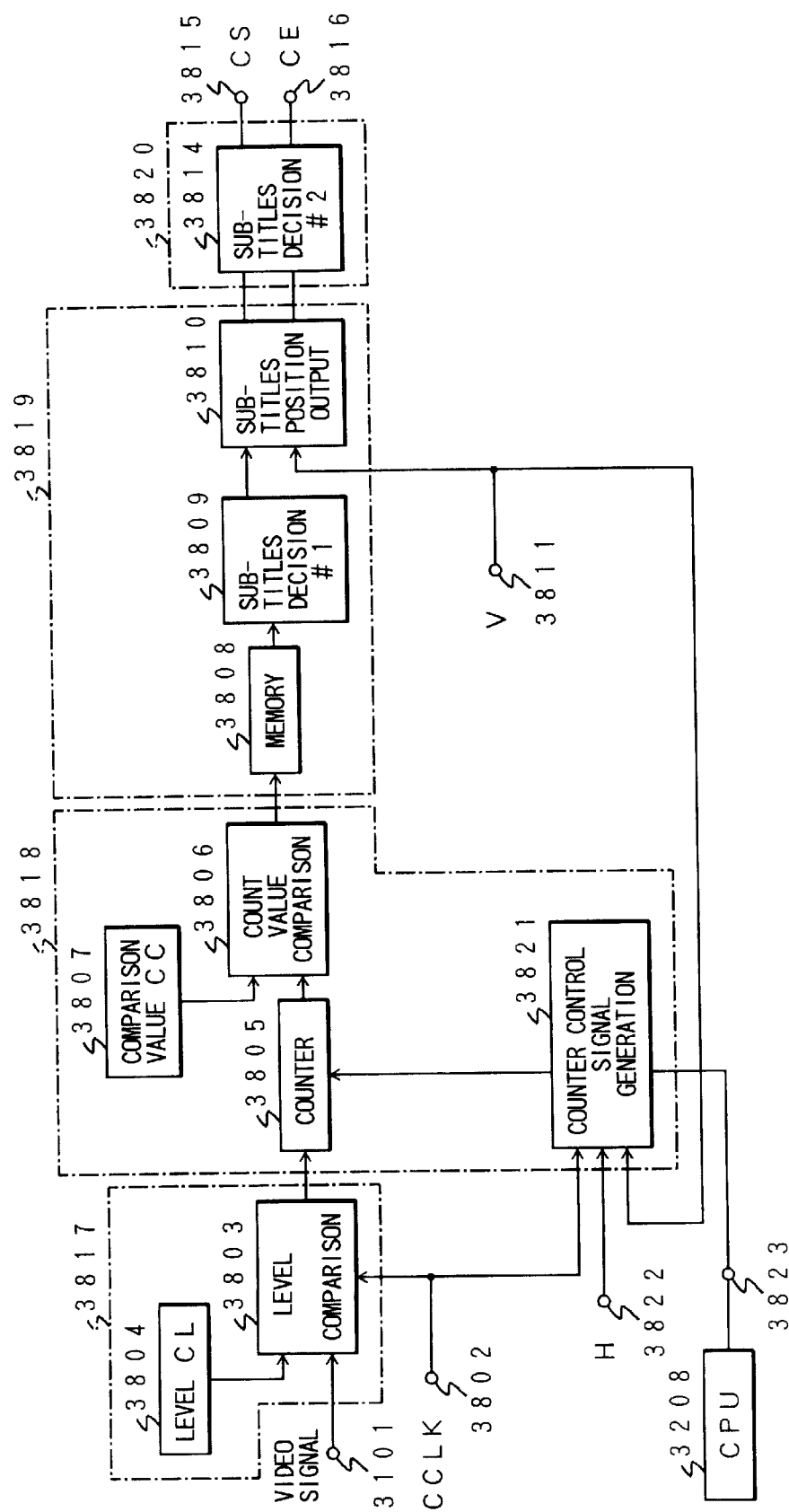
FIG. 27 is a block diagram showing a practicable example of subtitles detection means (3900) which is included in the embodiment depicted in FIG. 26.

A block diagram showing a practicable example of the subtitles detection circuit 3900 is illustrated in FIG. 27. The subtitles detection circuit 3900 can be realized by a construction similar to that of the imageless-part detection apparatus shown in FIG. 21. This circuit 3900 detects the subtitles position in such a way that the supplied video signal is decided as to whether or not it is the signal of the subtitles part, successively in the order of the amplitude direction, horizontal direction, vertical direction and temporal direction of the video signal. For this purpose, the subtitles detection circuit 3900 similarly comprises an amplitude direction decision portion 3817, a horizontal direction decision portion 3818, a vertical direction decision portion 3819 and a temporal direction decision portion 3820.

Referring to FIG. 27, numeral 3802 designates a clock signal input terminal, numeral 3803 a level comparison circuit, numeral 3804 a comparison level setting portion, numeral 3805 a counter, numeral 3806 a count value comparison circuit, numeral 3807 a comparison value setting portion, numeral 3808 a memory portion, numeral 3809 a subtitles decision #1 circuit, numeral 3810 a subtitles position output circuit, numeral 3811 a V counter output signal input terminal, numeral 3814 a subtitles decision #2 circuit, numeral 3815 a position CS (character start) output terminal, and numeral 3816 a position CE (character end) output terminal. Besides, numeral 3822 indicates a horizontal sync signal input terminal, numeral 3823 a control signal input terminal, and numeral 3821 a counter control signal generation circuit. The same numerals as in FIG. 21 indicate the identical constituents, respectively.

Next, the operation of the subtitles detection circuit 3900 will be concretely explained with reference to FIG. 27.

In the amplitude direction decision portion 3817, the level comparison circuit 3803 compares the signal level of the video signal delivered from the video signal input terminal 3101, with a level CL delivered from the comparison level setting portion 3804, when the state of a clock signal CCLK delivered from the clock input terminal 3802 has changed. On condition that the signal level of the delivered video signal is higher than the level CL, the level comparison circuit 3803 judges the delivered video signal as belonging to the subtitles part and produces a 'high' level. On any other occasion, the circuit 3803 produces a 'low' level. Although the level CL to be delivered from the comparison level setting portion 3804 may well have a fixed value, it can also have a variable value. In this case, the value of the level CL may be set at a level often containing the data of the character part, for example, at a level on the order of 90 (IRE). Incidentally, the comparison level setting portion 3804 can be implemented by a microcomputer.

In the horizontal direction decision portion 3818, the counter 3805 counts the number of the data decided to belong to the subtitles part by the level comparison circuit 3803, and it delivers the count value per horizontal scanning period, to the count value comparison circuit 3806 every horizontal scanning period. As the count value per horizontal scanning period is higher, the pertinent horizontal scanning period (horizontal scanning line) has a higher possibility of belonging to the subtitles part.

When the count: value of each horizontal scanning period delivered from the counter 3805 is larger than a comparison value CC delivered from the comparison value setting portion 3807, the count value comparison circuit 3806 decides the pertinent horizontal scanning period (horizontal scanning line) to belong to the subtitles part and produces the high level, and when not, the comparison circuit 3806 produces the low level. The comparison value CC being a criterion on this occasion may well have a fixed value indicative of a quantity of distribution with which the subtitles part decision can be rendered, but it can also have a variable value. Incidentally, the comparison value setting portion 3807 can be implemented by a microcomputer.

Here, the counter 3805 is operated so as to supply the count value comparison circuit 3806 with the count value of each horizontal scanning period every horizontal scanning period. The present invention, however, is not restricted to the above operation. By way of example, the counter 3805 may well deliver the count value of several horizontal scanning periods every several horizontal scanning periods (every two horizontal scanning periods, every three horizontal scanning periods, or every more horizontal scanning periods). In this case, the count value comparison circuit 3806 decides the several horizontal scanning periods collectively, as to if they belong to the subtitles part. Alternatively, the counter 3805 may well be operated at the intervals of several horizontal scanning periods (two horizontal scanning periods, three horizontal scanning periods, or more horizontal scanning periods), so as to deliver the count value of each horizontal scanning period to the count value comparison circuit 3806 at the intervals of the several horizontal scanning periods.

Next, in the vertical direction decision portion 3819, the memory portion 3808 stores therein the compared results being the outputs of the count value comparison circuit 3806, as the data for a certain time period, e.g., for several horizontal scanning periods.

The subtitles decision #1 circuit 3809 decides the start position and end position of the subtitles on the basis of the data stored in the memory portion 3808.

Figure 28A:
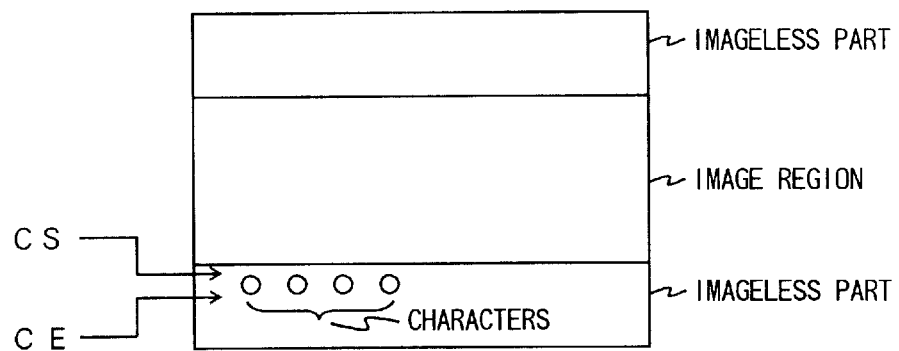
FIGS. 28A thru 28C are explanatory diagrams each showing a case where a picture containing subtitles is displayed on a screen.
Figure 28B:
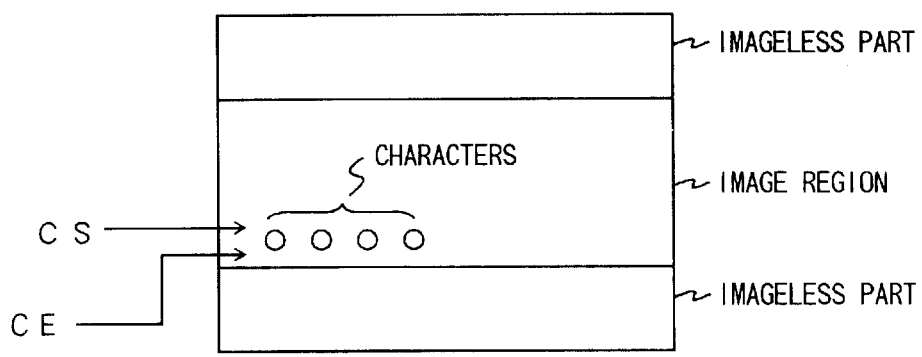
Figure 28C:
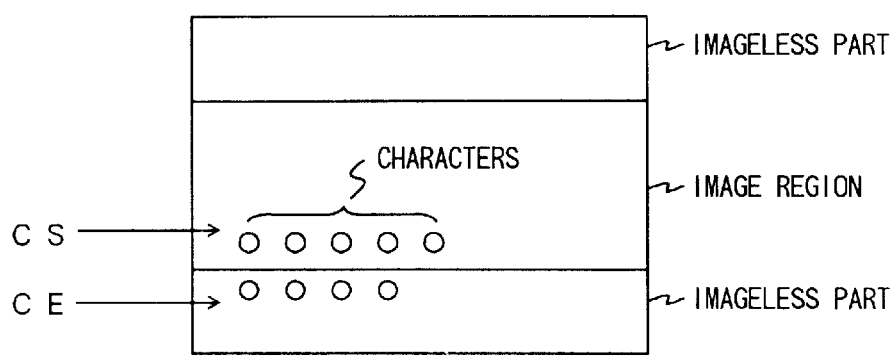

Here, examples of the subtitles positions in the case of displaying pictures on a screen are depicted in FIGS. 28A thru 28C. FIG. 28A illustrates the picture in which the subtitles exist at the lower imageless part, FIG. 28B the picture in which the subtitles exist in the image region, and FIG. 28C the picture in which the subtitles exist extending over the image region and the lower imageless part. In each of these figures, a position CS is a horizontal scanning line position at which the subtitles start, while a position CE is a horizontal scanning line position at which the subtitles end. By the way, the same applies to a picture in which the subtitles exist at the upper imageless part, a picture in which the subtitles exist extending over both the upper imageless part and the image region, etc., though the pictures are not illustrated here.

The subtitles decision #1 circuit 3809 decides the start and end positions of the subtitles as the respective positions CS and CE on the basis of the data stored in the memory portion 3808.

Regarding a method with which the subtitles decision #1 circuit 3809 decides the subtitles positions, the start and end positions of the subtitles can be decided in the same way as the method with which the boundary decision circuit 3109 in the imageless-part detection apparatus decides the boundary positions between the imageless parts and the image region. That is, the start and end positions are decided in accordance with the majority rule based on the data stored in the memory portion 3808, the consecutiveness of the data, and so forth.

The subtitles position output circuit 3810 is supplied with the decided result of the subtitles decision #1 circuit 3809 and a V counter output signal from the V counter output signal input terminal 3811. Then, it supplies the subtitles decision #2 circuit 3814 with the Nos. of the horizontal scanning lines corresponding respectively to the position CS and position CE shown in any of FIGS. 28A–28C, the Nos. being reckoned from the vertical sync signal.

In the temporal direction decision portion 3820, the subtitles decision #2 circuit 3814 integrates the decided results delivered from the subtitles position output circuit 3810, in the temporal direction. Thus, it decides the subtitles positions again by checking the stability of and frequence in the subtitles positions, the correctness of the subtitles positions, etc. In this way, it is permitted to avoid erroneous detection which is ascribable to noise or to the small difference between the luminances of the subtitles region and any other region of the input video signal.

The start position CS of the subtitles and the end position CE thereof as decided by the subtitles decision #2 circuit 3814, are respectively delivered to the position CS output terminal 3815 and position CE output terminal 3816.

Although, in FIG. 27, signals indicative of the positions CS and CE to be delivered from each of the subtitles position output circuit 3810 and subtitles decision #2 circuit 3814 are illustrated so as to be sent in parallel, the two output signals may well be serial outputs.

According to the above expedient, the subtitles positions to be detected are not restricted to the subtitles existing at the imageless part, but they can be detected wherever the subtitles exist in the pictures.

With the imageless-part detection apparatus shown in FIG. 26, accordingly, the region decision circuit 3901 can decide the boundary positions of the image region on the basis of the imageless part positions delivered from the boundary output circuit 3110 and the subtitles positions delivered from the subtitles detection circuit 3900. Thus, the erroneous detection of the boundary positions between the image region and the imageless parts as attributed to the subtitles can be avoided.

Figure 29:
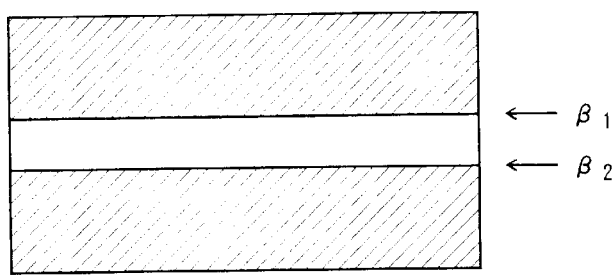
FIG. 29 is an explanatory diagram showing detection ranges in the operation of detecting subtitles.

Further, in the subtitles position detection circuit (3900) shown in FIG. 27, it is also allowed to operate the counter 3805 only at parts hatched in FIG. 29, and to prevent this counter 3805 from operating at the other part. More specifically, since the subtitles are usually existent at the upper part or lower part of the picture, the detection thereof can be limited only to the hatched parts shown in FIG. 29. In this case, the counter 3805 is operated in a range from the upper end of the picture to the position β1 thereof and a range from the position β2 of the picture to the lower end thereof. Accordingly, the counter 3805 counts the number of the data decided to belong to the subtitles part by the level comparison circuit 3803, in the specified range every horizontal scanning period, and it delivers the count value to the count value comparison circuit 3806.

Figure 30:
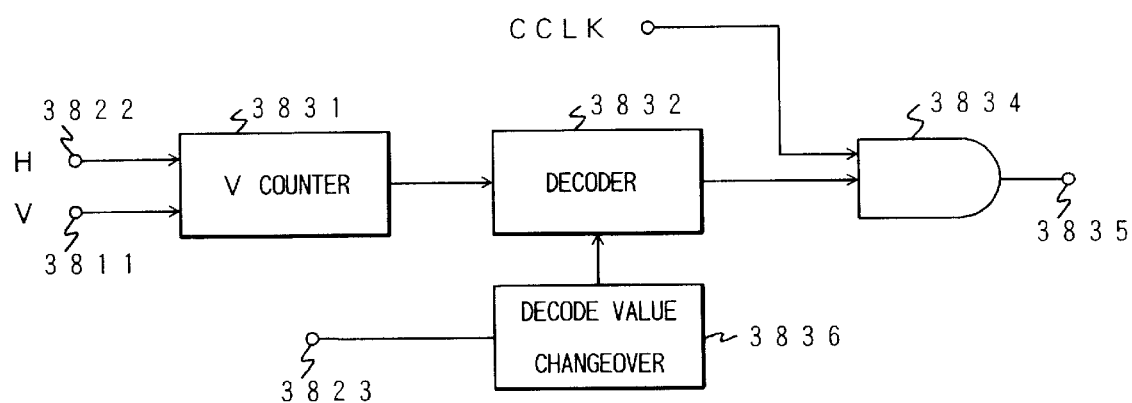
FIG. 30 is a block diagram of a counter control signal generator circuit (3821) which is included in the example depicted in FIG. 27.

A block diagram of the counter control signal generation circuit 3821 (in FIG. 27) in this case is illustrated in FIG. 30.

Referring to this figure, the counter control signal generation circuit 3821 includes a counter ("V counter") 3831 which counts the number of the pulses of the horizontal sync signal H, with the starting point at the vertical sync signal V delivered from the vertical sync signal input terminal 3811, a decoder 3832 which decodes the count value of the counter 3831, an AND circuit 3834, a counter control signal output terminal 3835 from which a control signal is delivered to the counter 3805, and a decode value changeover circuit 3836 by which values to be set in the decoder 3832 are changed-over. The decode value changeover circuit 3836 sets the values corresponding to the positions β1 and β2, in the decoder 3832.

As shown in FIG. 29 by way of example, the decode value changeover circuit 3836 sets the positions β1 and β2 several lines inward of the picture with respect to the boundary positions detected in the last field.

Referring to FIG. 30 again, the V counter 3831 counts the number of the pulses of the horizontal sync signal H delivered from the horizontal sync signal input terminal 3822, with the starting point at the vertical sync signal V delivered from the vertical sync signal input terminal 3811. The decoder 3832 decodes the count value of the counter 3831, and it produces the high level for the count values from 0 (zero) to a value correspondent to the position β1 and for the count values from a value correspondent to the position β2 to the maximum value.

On condition that the output of the decoder 3832 is at the high level, the AND circuit 3834 supplies the counter control signal output terminal 3835 with the clock signal CCLK entered from the clock signal input terminal 3802 (in FIG. 27).

In addition, the control signal input terminal 3823 (in FIG. 27) is supplied with an output signal from the CPU 3208. The CPU 3208 sets the time period for the subtitles position detection, in other words, the operating period of the counter 3805 on the basis of, for example, the picture information of the last field obtained from the subtitles position detection circuit 3900. This CPU 3208 delivers the control signal to the control signal input terminal 3823.

The decode value changeover circuit 3836 sets the decode values of the decoder 3832 in accordance with the signal delivered from the control signal input terminal 3823.

In this way, the counter control signal generation circuit 3821 controls the counter 3805, whereby in the presence of the subtitles within the imageless part, the counter 3805 can be operated at only the parts hatched in FIG. 29.

Figure 31:
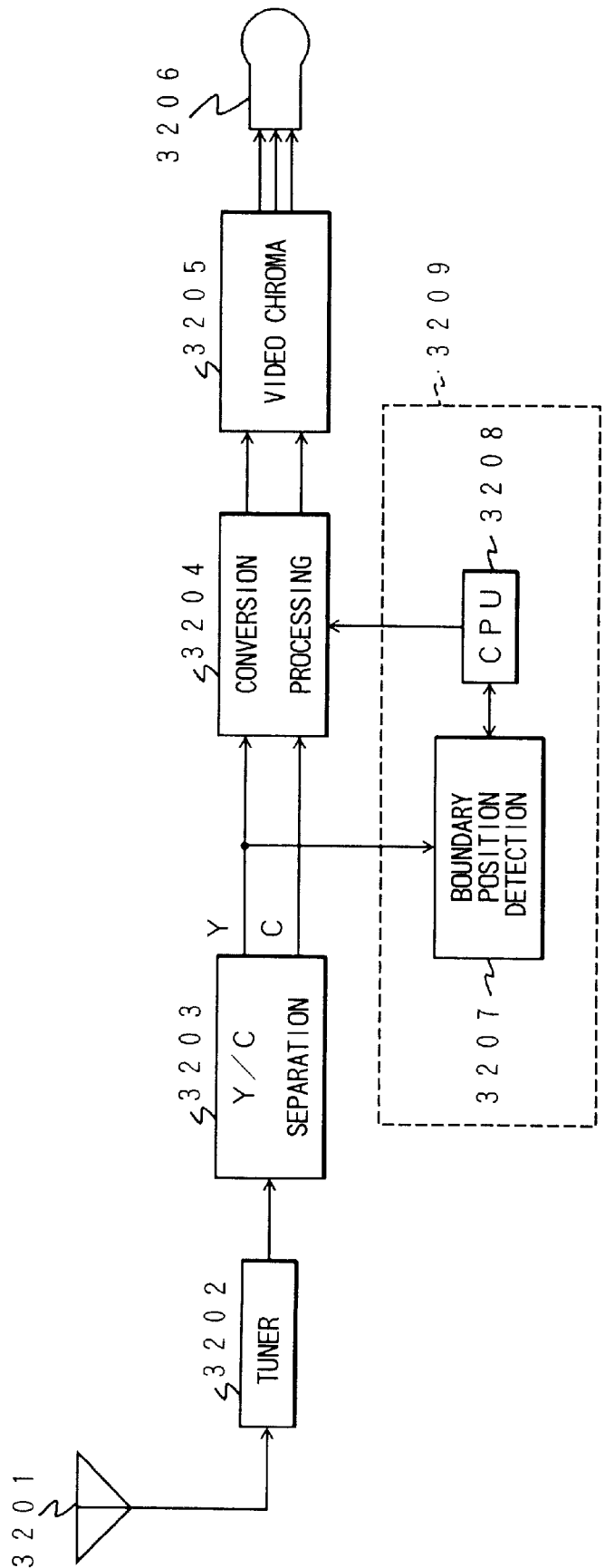
FIG. 31 is a block diagram showing the picture quality adjustment device of a television receiver in an embodiment.

There will now be described an embodiment of a television receiver which is furnished with the feature detection apparatus of the tenth or eleventh embodiment stated above. FIG. 31 illustrates a block diagram of the television receiver. Referring to the figure, numeral 3201 designates an antenna, numeral 3202 a tuner, numeral 3203 a luminance signal/color signal separation circuit (Y/C separation circuit), numeral 3204 a conversion processing circuit, numeral 3205 a video chroma circuit, numeral 3206 a cathode-ray tube, numeral 3207 a boundary position detection circuit, numeral 3208 a CPU, and numeral 3209 the pictorial feature detection apparatus.

The television receiver operates as stated below.

A radio wave received by the antenna 3201 is tuned and demodulated by the tuner 3202, from which a video signal of base band is delivered. The demodulated base-band video signal is supplied to the Y/C separation circuit 3203 so as to be separated into a luminance signal and a color signal.

The boundary position detection circuit 3207 detects the boundary between an image region and an imageless region from the luminance signal separated by the Y/C separation circuit 3203, in accordance with a control signal delivered from the CPU 3208. It delivers the detected result to the CPU 3208.

The CPU 3208 prepares conversion characteristics for controlling a picture, on the basis of the detected result of the boundary position detection circuit 3207 so as to separately adjust the picture qualities of the image region and the imageless region. The prepared conversion characteristics are delivered to the conversion processing circuit 3204.

The conversion processing circuit 3204 executes conversion processing by subjecting the delivered luminance signal and color signal to the picture-quality adjustments of brightness, contrast, color densities, tint etc., in accordance with the control signal delivered from the CPU 3208. The luminance signal and color signal thus converted are supplied to the video chroma circuit 3205. Herein, each of the image region and the imageless region may well be further divided into a plurality of domains so as to adjust the picture qualities of the respective domains. Regarding the adjustments of the picture qualities, by way of example, an average luminance level is detected in each of the regions, which of several preset levels the average luminance level belongs to is judged, and the contrast in the region is adjusted. It is also possible to perform any of known controls such as the brightness control, gamma correction control, contour correction control, YNR control and CNR control.

The video chroma circuit 3205 converts the delivered luminance signal and color signal into R, G and B signals, which are supplied to the cathode-ray tube 3206.

Owing to the above operation, the picture qualities of the image region and imageless region displayed on a screen can be adjusted independently of each other.

There will now be described an embodiment in the case where, in a "wide" television receiver, an aspect ratio is detected by utilizing an imageless-part detection apparatus, and subtitles are moved to any desired position within a picture, are erased and are enlarged by utilizing the subtitles detection result of a subtitles detection circuit.

The HDTV (high-definition television) test broadcast has been started, and video sources for a laterally long screen have increased, so that television receivers of laterally long screen have come into wide use. Although the "wide" (16:9) television receiver usually has the facility of displaying the optimum picture on the wide screen, the changeover of screen display sizes must be manually effected by a user in most cases. Therefore, the use needs to set the optimum screen size every video source, which is a very troublesome operation. In this embodiment, there will be explained an automatic aspect-ratio control system in which the aspect ratio is automatically controlled by detecting it from an input signal, and an automatic subtitles system by which subtitles to come outside the display screen in case of enlarging a picture are automatically moved inside the display screen. Further, there will be explained an automatic picture control system in which the contrast, black level and gamma characteristics of a picture are controlled by detecting the features of an input signal.

Figure 32:
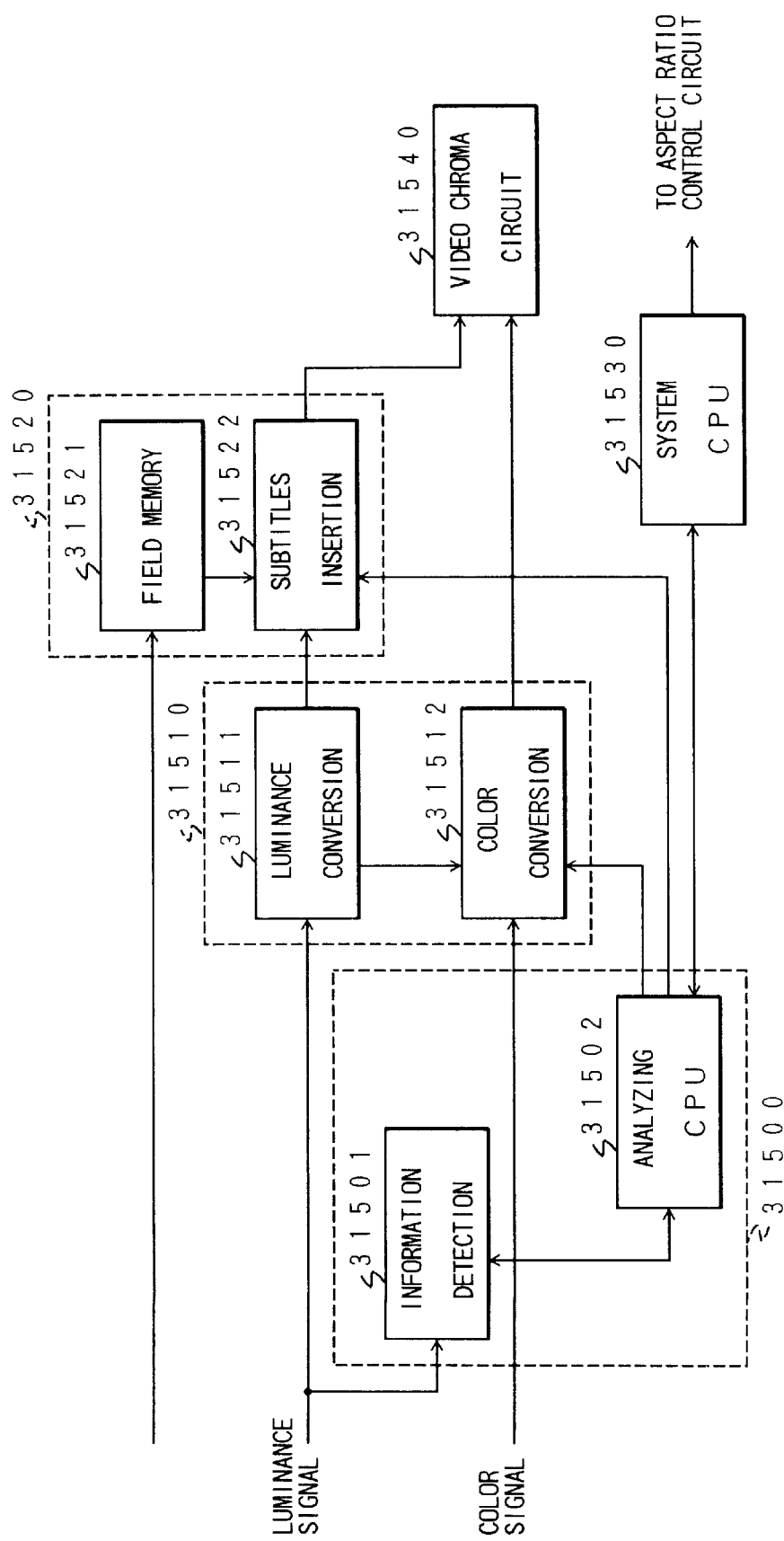
FIG. 32 is a block diagram of a "wide" television receiver.

FIG. 32 illustrates a block diagram of the "wide" television receiver having the above facilities.

Referring to FIG. 32, the "wide" television receiver comprises an imageless-part detection apparatus 31500, an automatic picture-quality correction apparatus 31510, a subtitles control apparatus 31520, and a system CPU 31530.

In the figure, the imageless-part detection apparatus 31500 operates as an aspect-ratio analysis block.

The aspect-ratio analysis block includes an information detection portion 31501 being an aspect-ratio detection circuit, and an analyzing CPU 31502. The information detection portion 31501 can be constructed as shown in the block diagram of FIG. 21 or FIG. 26 referred to before, and it detects the start position and end position of the image region from the input video source as explained before. The analyzing CPU 31502 determines the start position and end position of the image on the basis of the detected results of the detection portion 31501. In accordance with the determination of the analyzing CPU 31502, the system CPU 31530 detects the aspect ratio of a picture size and enlarges a picture expressed by the video signal.

Figure 33:
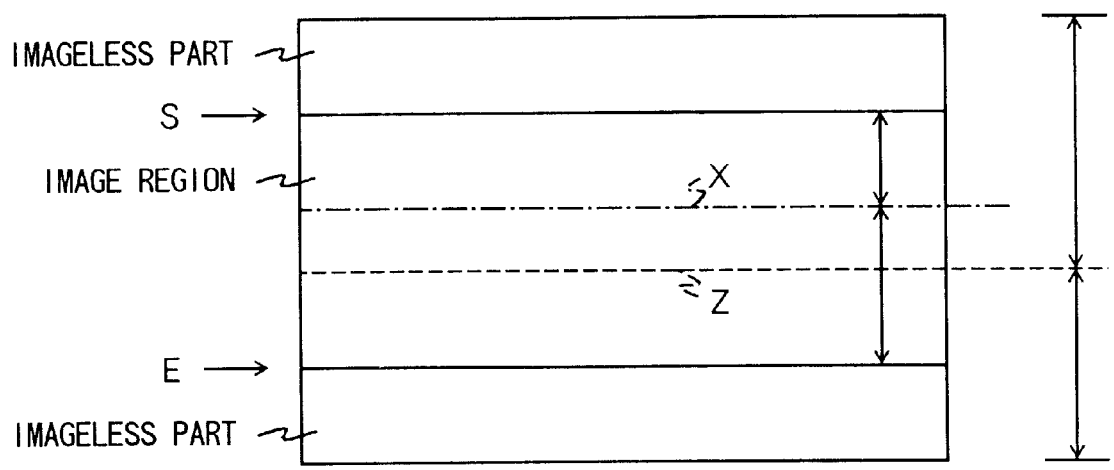
FIG. 33 is an explanatory diagram showing a case where a picture containing imageless parts of unequal widths above and below an image part is displayed on a screen.

Meanwhile, in case of enlarging the picture in the vertical direction thereof, the position of a center horizontal scanning line in the image region needs to be known. On this occasion, the position of the center horizontal scanning line in the image region (hereinbelow, called the "position X") can be easily found as shown in FIG. 33, by utilizing the detected results of the boundary positions between the image region and the imageless regions as afforded by the imageless-part detection apparatus 31500. FIG. 33 is an explanatory diagram showing a situation where the picture having the imageless parts of unequal widths over and under the image region is displayed on the screen. In FIG. 33, a position S and a position E indicate the horizontal scanning line position at which the image region starts and the horizontal scanning line position at which the image region ends, respectively, as in the cases shown in FIGS. 22A–22D. Besides, letter Z denotes the position of a center horizontal scanning line in the picture. In terms of values which indicate the Nos. of horizontal scanning lines as reckoned with reference to a vertical sync signal, the position X can be expressed using the values of the positions S and E, as follows:

$X=(S+E)/2$

Accordingly, when the video signal is delayed by the use of a memory device so as to bring the position X into agreement with the position Z, the image region can be located centrally of the screen, in other words, it can be made vertically symmetric with respect to the position Z. Consequently, in the case of enlarging the picture in the vertical direction, the picture can be enlarged without any omission at both the upper and lower parts thereof.

More specifically, in such a case, the imageless-part detection apparatus 31500 may be so constructed that the delay magnitude of the video signal to bring the position X into agreement with the position Z is calculated from the detected results of the boundary positions (namely, the positions S and E) between the image region and the imageless parts, and that a control signal is generated for the calculated delay magnitude. Thus, the enlargement of the picture in the vertical direction is controlled with the control signal.

Referring back to FIG. 32, the subtitles control apparatus 31520 automatically detects subtitles existent at the imageless part, from the input signal of letter box shape, and it writes subtitles information into a field memory 31521. As stated before, the subtitles detection can be performed by the subtitles detection circuit (3900) shown in FIG. 27. After the aspect ratio has been detected by the aspect ratio analysis block 31500, the image region is enlarged. Then, a subtitles edit portion 31522 included in the subtitles control apparatus 31520 reads out the contents of the field memory 31521 and moves the subtitles into the image region. A situation in this case is illustrated in FIG. 34. Besides, the subtitles control apparatus 31520 may well function to reduce and enlarge the subtitles themselves. The reduction of the subtitles can be effected by thinning out the contents of the field memory 31521 in reading out the subtitles information stored in this memory. On the other hand, the enlargement of the subtitles can be effected by interpolating data between the data of the subtitles information in reading out the subtitles information stored in the field memory 31521. Regarding the data interpolations, there are a method in which one of adjacent data is used as the interpolative data, a method in which data obtained by averaging the adjacent data is used as the interpolative data, and so forth.

Further, in the automatic picture-quality correction apparatus 31510, information on a luminance level distribution is obtained by a luminance level distribution detection circuit with which a luminance conversion circuit 31511 is furnished. Subsequently, the luminance conversion circuit 31511 and a color conversion circuit 31512 perform a nonlinear conversion which is suited to the input signal. As stated before, the automatic picture-quality adjustments proceed in such a way that each of the image region and the imageless regions are divided into a plurality of domains, and that the picture qualities of the respective domains are adjusted. On this occasion, the input signal is converted into a signal which affords a picture easy to see and which utilizes the dynamic range of a cathode-ray tube effectively, in accordance with a nonlinear conversion curve which is set in conformity with fuzzy inference by the analyzing CPU 31502. FIGS. 35A and 35B illustrate an example of the nonlinear curve for converting the input signal. In this example, the luminance level distribution of the input signal somewhat concentrates at a medium luminance. Therefore, a control is performed so as to decrease the quantity of the distribution of the medium luminance and to expand the luminance distribution on both the sides of a low luminance and a high luminance in correspondence with the decrease. Thus, a picture of appropriate contrast ratio can be presented.

Figure 36:
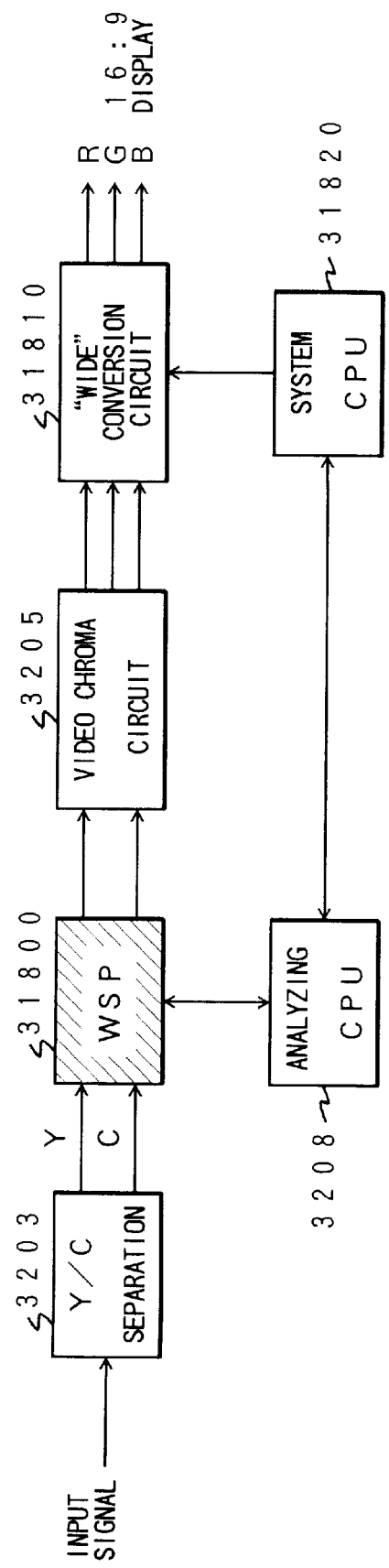
FIG. 36 is a block diagram showing the entirety of a television system.
Figure 37A:
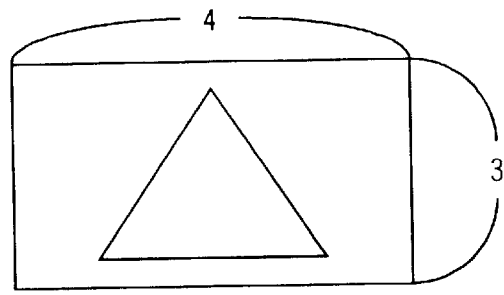
FIGS. 37A thru 37C are diagrams showing examples in which a picture based on a video signal conforming to an aspect ratio of 4:3 is displayed by a television receiver having a screen aspect ratio of 16:9.
Figure 37B:
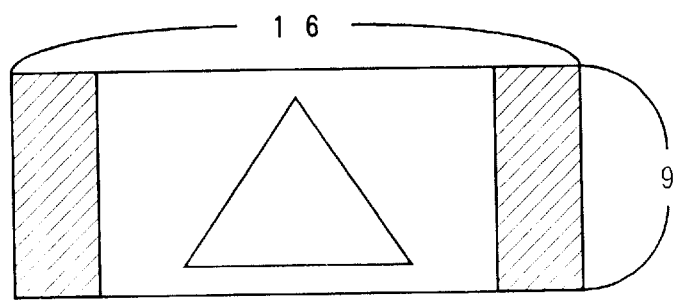
Figure 37C:
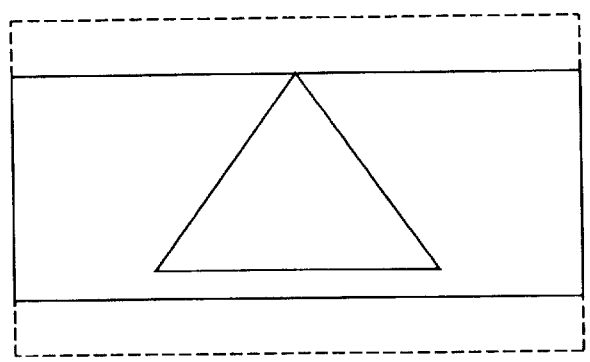
Figures 39, 41:
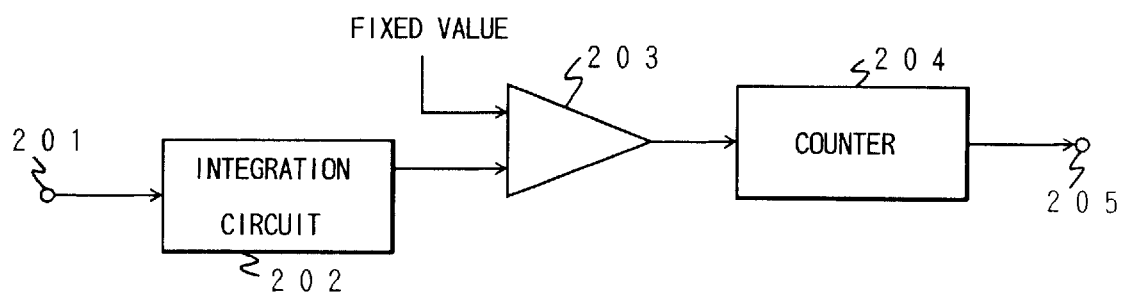
FIG. 39 is a block diagram showing the essential portions of a subtitles region detection apparatus which is a prior-art example.
FIG. 41 is an explanatory diagram showing domains whose picture qualities can be adjusted independently of one another by the picture quality adjustment device depicted in FIG. 40.
Figure 40:
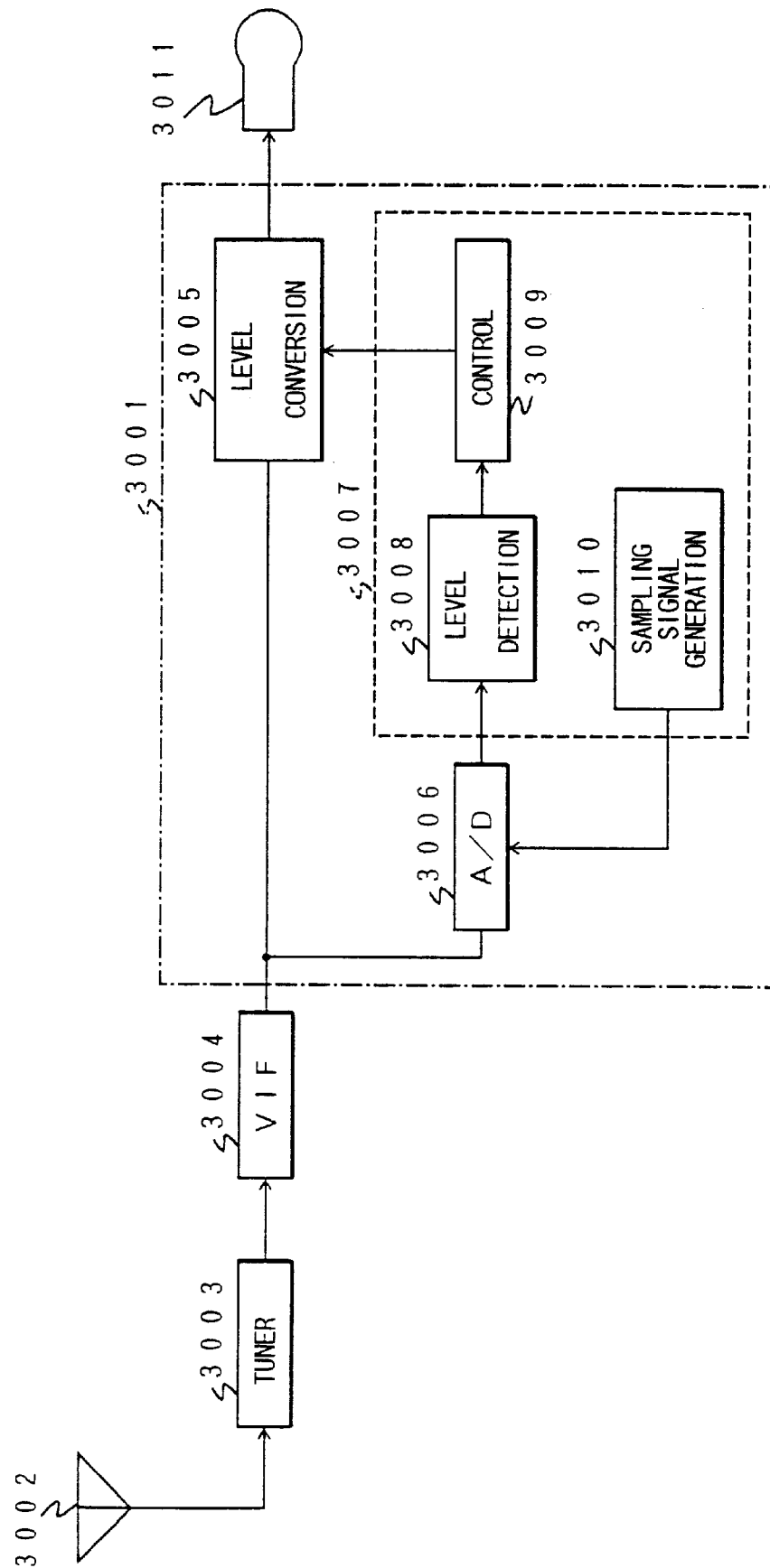
FIG. 40 is a block diagram showing the picture quality adjustment device of a television receiver in the prior art.

The system of this embodiment can be implemented by a CMOS-LSI (CMOS type large-scale integrated circuit) which is 0.8 ($\mu$m) thick, and which is controlled by a single field memory of 1 (Mb). FIG. 36 illustrates a block diagram of the entirety of the television system in this embodiment. Referring to the figure, a WSP 31800 is a wide signal processing system (LSI). Each of direct view type and projection type "wide" TV receivers can be offered by installing the LSI 31800.

In this way, the picture expressed by the input video signal is automatically converted into the picture size suited to the "wide" television receiver. Moreover, the image region and the imageless region can be separately subjected to the picture quality adjustments. Furthermore, the position of the subtitles can be moved.

According to the tenth embodiment, et seq., in the case where the picture having the imageless part/parts on the upper side or/and the lower side of the image region is expressed by the supplied video signal, the boundary position between the image region and the imageless part can be detected from the video signal, and the position of the subtitles can also be detected. Accordingly, the picture qualities of the image region and the imageless part can be adjusted independently of each other by using the results of the detections. Besides, the image region can be moved to any desired position within the display screen. Further, in the case where the picture is to be enlarged in the vertical direction thereof, it can be enlarged without any omission at the upper and lower parts thereof.

The tenth embodiment, et seq., bring forth effects as stated below. In a case where a supplied video signal expresses, e.g., a picture in which imageless parts exist over and under an image region, the boundary positions between the image region and the imageless parts can be detected from the video signal. Besides, the position of subtitles can be detected. In addition, a picture expressed by the video signal can be automatically converted into a picture size suited to a "wide" television receiver. Moreover, the image region and the imageless regions can be separately subjected to picture quality adjustments. Furthermore, the position of the subtitles can be moved.

What is claimed is:

1. A pictorial feature detection apparatus wherein a boundary position between an image region containing image information and an imageless region containing no image information is detected from a video signal which includes the imageless region, comprising:

amplitude direction decision means for deciding if the video signal corresponds to a signal belonging to said imageless region, a plurality of times per horizontal scanning line of the video signal, on the basis of signal levels of said video signal;

horizontal direction decision means for deciding, for every at least one horizontal scanning line of the video signal, whether a horizontal scanning line corresponds to a signal belonging to the image region or to a signal belonging to the imageless region, on the basis of decided results of the amplitude direction decision means; and vertical direction decision means for detecting adjacent to one another including at least two horizontal scanning lines each of which is decided by the horizontal direction decision means as a line corresponding to a signal belonging to the image region and including at least one horizontal scanning line which is decided by the horizontal direction decision means as a line corresponding to a signal belonging to the imageless region, and for deciding at least one of the plurality of horizontal scanning lines as the boundary position, wherein said amplitude direction decision means decides said video signal to correspond to the signal belonging to said imageless region, on condition that the signal level of said video signal is lower than a predetermined reference level, and said horizontal direction decision means decides the line to belong to said imageless region, on condition that the number of the signals decided to belong to said imageless region by said amplitude direction decision means is larger than a preset comparison value C.

2. A pictorial feature detection apparatus as defined in claim 1, further comprising setting means for setting at least either of said reference level in said amplitude direction decision means and the preset comparison value C in said horizontal direction decision means.

3. A pictorial feature detection apparatus as defined in claim 1, wherein said vertical direction decision means includes:

memory means for storing the decided results of said horizontal direction decision means therein;

boundary decision means for reading out said decided results stored in said memory means and deciding said boundary position; and position output means for delivering said boundary position decided by said boundary decision means in terms of a line number of one of said plurality of horizontal scanning lines.

4. A pictorial feature detection apparatus as defined in claim 1, wherein said horizontal direction decision means renders the decision on the basis of the decided results of said amplitude direction decision means at predetermined parts of one horizontal scanning period.

5. A pictorial feature detection apparatus as defined in claim 4, wherein said horizontal direction decision means decides the line to belong to said imageless region, on condition that the number of the signals decided to belong to said imageless region by said amplitude direction decision means at the predetermined parts of said one horizontal scanning period is larger than a preset value.

6. A pictorial feature detection apparatus as defined in claim 1 wherein said vertical direction decision means decides a first line of the plurality of horizontal scanning lines as the boundary position.

7. A pictorial feature detection apparatus as defined in claim 1 wherein said vertical direction decision means decides at least one of the plurality of horizontal scanning lines as the boundary position, when the plurality of horizontal scanning lines is located in a predetermined area.

8. A pictorial feature detection apparatus as defined in claim 1 wherein said vertical direction decision means does not decide at least one of the plurality of horizontal scanning lines as the boundary position, when the plurality of horizontal scanning lines is located out of a predetermined area.

9. A pictorial feature detection apparatus wherein a boundary position between an image region containing image information and an imageless region containing no image information is detected from a video signal which includes the imageless region, comprising:

amplitude direction decision means for deciding if the video signal corresponds to a signal belonging to said imageless region, a plurality of times per horizontal scanning period on the basis of signal levels of said video signal;

horizontal direction decision means for deciding, for every at least one horizontal scanning period of the video signal, whether a scanning line in the horizontal scanning period corresponds to a signal belonging to the imageless region, on the basis of decided results of the amplitude direction decision means;

vertical direction decision means for deciding the boundary position between said image region and said imageless region in a vertical direction of a picture expressed by said video signal, by using decided plural results of said horizontal direction decision means; and, temporal direction decision means for delivering a result obtained through integration of results decided by said vertical direction decision means, the integration being executed in a temporal direction, as a detected result of said boundary position between said image region and said imageless region.

10. A pictorial feature detection apparatus wherein a boundary position between an image region containing image information and an imageless region containing no image information is detected from a video signal which includes an imageless region, said apparatus comprising:

amplitude direction decision means for deciding if the video signal corresponds to a signal belonging to said imageless region, a plurality of times per horizontal scanning period, on the basis of signal levels of said video signal;

horizontal direction decision means for deciding, for every at least one horizontal scanning period of the video signal, whether a scanning line in the horizontal scanning period corresponds to a signal belonging to the imageless region, on the basis of decided results of the amplitude direction decision means;

vertical direction decision means for deciding, on the basis of decided results of said horizontal direction decision means as to a plurality of lines adjacent to one another, whether the boundary position is contained in the plurality of lines, and for deciding at least one of the plurality of lines as the boundary position when the boundary position is contained in the plurality of lines;

subtitles detection means for detecting from said video signal a position of a signal containing subtitles information, in the vertical direction of the picture; and decision means for deciding if said boundary position is correct, on the basis of the detection of said subtitles detection means.

11. A pictorial feature detection apparatus wherein a boundary position between an image region containing image information and an imageless region containing no image information is detected from a video signal which includes the imageless region, comprising:

amplitude direction decision means for deciding if the video signal corresponds to a signal belonging to said imageless region, a plurality of times per horizontal scanning period on the basis of signal levels of said video signal, wherein said amplitude direction decision means decides said video signal to correspond to the signal belonging to said imageless region, on condition that the signal level of said video signal is lower than a predetermined reference level;

horizontal direction decision means for deciding which of a signal belonging to the image region and a signal belonging to the imageless region a line of the horizontal scanning period corresponds to, at least one time every horizontal scanning period of said video signal on the basis of decided results of said amplitude direction decision means, wherein said horizontal direction decision means decides the line to belong to said imageless region, on condition that the number of the signals decided to belong to said imageless region by said amplitude direction decision means is larger than a preset comparison value C;

vertical direction decision means for deciding the boundary position between said image region and said imageless region in a vertical direction of a picture expressed by said video signal, on the basis of a decided result of said horizontal direction decision means;

subtitles detection means for detecting subtitles on condition that said signal level of said video signal is higher than a predetermined level for detecting the subtitles; and comparison value setting means for setting as a new preset comparison value C a value which is obtained by subtracting the number of signals detected as corresponding to said subtitles by said subtitles detection means, from the preset comparison value C held in said horizontal direction decision means.

12. A pictorial feature detection apparatus wherein a subtitles region containing subtitles information is detected from a video signal which contains the subtitles information, said apparatus comprising:

amplitude direction decision means for deciding if the video signal corresponds to a signal containing said subtitles information, a plurality of times per horizontal scanning period, on the basis of signal levels of said video signal, said amplitude direction decision means deciding that said video signal corresponds to the signal containing said subtitles information on condition that the signal level of said video signal is higher than a predetermined reference level;

horizontal direction decision means for deciding if a line of the horizontal scanning period corresponds to a signal to which said subtitles information belongs, at least one time every horizontal scanning period of the video signal, on the basis of decided results of said amplitude direction decision means, said horizontal direction decision means deciding that the line belongs to said subtitles region on condition that the number of the signals decided to contain said subtitles information by said amplitude direction decision means in said line of said horizontal scanning period is larger than a preset value;

vertical direction decision means for deciding, on the basis of decided results of said horizontal direction decision means as to a plurality of lines which are adjacent to one another, whether a boundary position between the subtitles region and an image region containing image information in a vertical direction of a picture expressed by said video signal is contained in the plurality of lines, and for deciding at least one of plurality of lines as the boundary position when the boundary position is contained in the plurality of lines.

13. A pictorial feature detection apparatus as defined in claim 12, further comprising setting means for setting at least either of said reference level in said amplitude direction decision means and the preset comparison value C in said horizontal direction decision means.

14. A pictorial feature detection apparatus as defined in claim 12, wherein said horizontal direction decision means renders the decision on the basis of the decided results of said amplitude direction decision means at predetermined parts of one horizontal scanning period.

15. A pictorial feature detection apparatus as defined in claim 12, wherein said horizontal direction decision means decides the line to belong to said subtitles region on condition that the number of the signals decided to contain said subtitles information by said amplitude direction decision means at the predetermined parts of said one horizontal scanning period is larger than a preset value.

16. A pictorial feature detection apparatus wherein a subtitles region containing subtitles information is detected from a video signal which contains the subtitles information, comprising:

amplitude direction decision means for deciding if the video signal corresponds to a signal containing said subtitles information, a plurality of times per horizontal scanning period on the basis of signal levels of said video signal;

horizontal direction decision means for deciding if a line of the horizontal scanning period corresponds to a signal to which said subtitles information belongs, at least one time every horizontal scanning period of said video signal on the basis of decided results of said amplitude direction decision means;

vertical direction decision means for deciding a boundary position between the subtitles region and an image region containing image information in a vertical direction of a picture expressed by said video signal, on the basis of a decided result of said horizontal direction decision means; and, temporal direction decision means for delivering a result obtained through integration of results decided by said vertical direction decision means, the integration being executed in a temporal direction, as a detected result of said boundary position between the image region and said subtitles region.

\* \* \* \* \*